United States Patent [19]
Kanda et al.

[11] Patent Number: 5,761,058
[45] Date of Patent: Jun. 2, 1998

[54] POWER CONVERTER APPARATUS FOR A DISCHARGE LAMP

[75] Inventors: Takashi Kanda; Yoshinobu Murakami; Masahiro Naruo; Kazuo Yoshida; Tomoyuki Nakano; Naoki Ohnishi; Tomoaki Mannami; Masahito Ohnishi, all of Kadoma, Japan

[73] Assignee: Matsushita Electric Works, Ltd., Osaka, Japan

[21] Appl. No.: 683,958

[22] Filed: Jul. 19, 1996

[30] Foreign Application Priority Data

Jul. 26, 1995 [JP] Japan ................... 7-190894

[51] Int. Cl.[6] .................................... H02M 3/18
[52] U.S. Cl. ..................... 363/60; 315/205; 307/110
[58] Field of Search ................ 307/110; 315/205, 315/241 R, DIG. 7; 363/43, 59, 60

[56] References Cited

U.S. PATENT DOCUMENTS

| | | | |
|---|---|---|---|
| 3,867,643 | 2/1975 | Baker et al. | 363/43 |
| 4,238,820 | 12/1980 | Naaijer | 363/43 |
| 4,415,961 | 11/1983 | Harmon | 363/43 |
| 5,444,310 | 8/1995 | Kataoka et al. | 307/110 |
| 5,483,433 | 1/1996 | Yang | 363/43 |
| 5,610,807 | 3/1997 | Kanda et al. | 363/43 |

*Primary Examiner*—Jeffrey L. Sterrett
*Attorney, Agent, or Firm*—Burns, Doane, Swecker & Mathis, L.L.P.

[57] ABSTRACT

A power converter apparatus in which a switched capacitor circuit includes one or more sets of cells connected in series each having a capacitor as a voltage supply source and a bridge circuit for inverting the polarities of the capacitor, the switched capacitor circuit is connected to a load, there is provided a means for parallelly charging the capacitors of the cells with a D.C. voltage source, any number of the cell capacitors are connected in series with any polarity to control supply of an A.C. output to the load. Whereby the power converter apparatus using the switched capacitor circuit can supply A.C. power with less distortion to the load without increasing the withstand voltage of the switching elements and without any need for provision of large inductors or capacitors.

26 Claims, 47 Drawing Sheets

BYPASSING Cm

BYPASSING Cm 5,761,058

1

POWER CONVERTER APPARATUS FOR A DISCHARGE LAMP

BACKGROUND OF THE INVENTION

The present invention relates to a power converter apparatus which uses a switched capacitor circuit, to convert a D.C. voltage to a high frequency A.C. voltage and which is useful, for example, as a power supply of a device for stably lighting a discharge lamp.

There have conventionally been proposed various types of DC-DC converter apparatuses which utilize a switched capacitor circuit to obtain a plurality of D.C. outputs from a single D.C. power source.

For example, U.S. Pat. No. 5,444,310 assigned to the same assignee as the present application discloses a circuit which alternately performs at a high frequency the charging operation of minute capacitors with a D.C. power source through a switch and the operation of supplying power from the minute capacitors to a discharge lamp as a load via switching elements. Also disclosed in the above Application is a circuit which alternately performs at a high frequency the operation of supplying power from the D.C. power source to a series circuit of the minute capacitors and discharge lamp load via the switch and the operation of supplying power having a polarity opposite to the above from the minute capacitors via the switch to the discharge lamp. Since these circuits can stably light the discharge lamp by switching the connections of the minute capacitors to boost or reduce the voltage with the current limiting effect, the circuit can eliminate the need for provision of any transformer and be made small in size and weight. However, there still remains in the prior art such a problem that the high-frequency pulsative power is supplied to the discharge lamp load, which causes more electromagnetic noise, and a low crest factor results in a short operational life of the discharge lamp.

Also disclosed in U.S. Pat. No. 5,610,807 assigned to the same assignee as the present application is a circuit in which groups of capacitors are charged with different voltages and sequentially discharged to capacitors connected in parallel to a load circuit via minute capacitors to supply nearly-sinusoidal waveform voltage to the load circuit. Since a filter circuit of an inductor and a capacitor with a time constant corresponding to the switching period of the capacitors can supply the nearly-sinusoidal smooth waveform voltage to the load, the above circuit can realize reduction of electromagnetic noise and employment of a small-size filter. Meanwhile, this circuit requires a lot of switching elements having a withstand voltage equal to the maximum output voltage. Thus, when it is desired to light such a discharge lamp load as to be fed with a specially high voltage, this also requires a lot of switching elements having a high withstand voltage, thus involving a problem that the area of a semiconductor chip made of such switching elements disadvantageously becomes large.

SUMMARY OF THE INVENTION

It is therefore a major object of the present invention to provide a power converter apparatus which can overcome the above problems in the prior art and, even when applied, e.g., to a discharge-lamp lighting device, which can suppress increase in the area of a semiconductor chip through a multiplicity of high-voltage switching elements while preventing reduction in the life of the discharge lamp.

In accordance with the present invention, the above object is attained by a power converter apparatus wherein each of

2 cells is made up of a capacitor as a voltage supply and a bridge circuit for inverting the polarity of the capacitor, at least one or more sets of the cells are connected in series with a switched capacitor circuit, a load is connected to output terminals of the switched capacitor circuit, characterized in that the bridge circuits are controlled to cause the capacitors to be charged with a D.C. voltage source in parallel relationship, and to cause the capacitor to be connected in series as discharged to supply voltages corresponding to the values of an A.C. voltage to a load.

Other objects and advantages of the present invention will become clear as the following description of the invention advances as detailed with reference to preferred embodiments shown in the accompanying drawings.

While the present invention will now be described with reference to the embodiments shown, it will be appreciated that the intention is not to limit the invention only to these embodiments but rather to cover all alternations, modifications and equivalent arrangements possible within the scope of appended claims.

DESCRIPTION OF THE PREFERRED EMBODIMENTS

Figure 1:
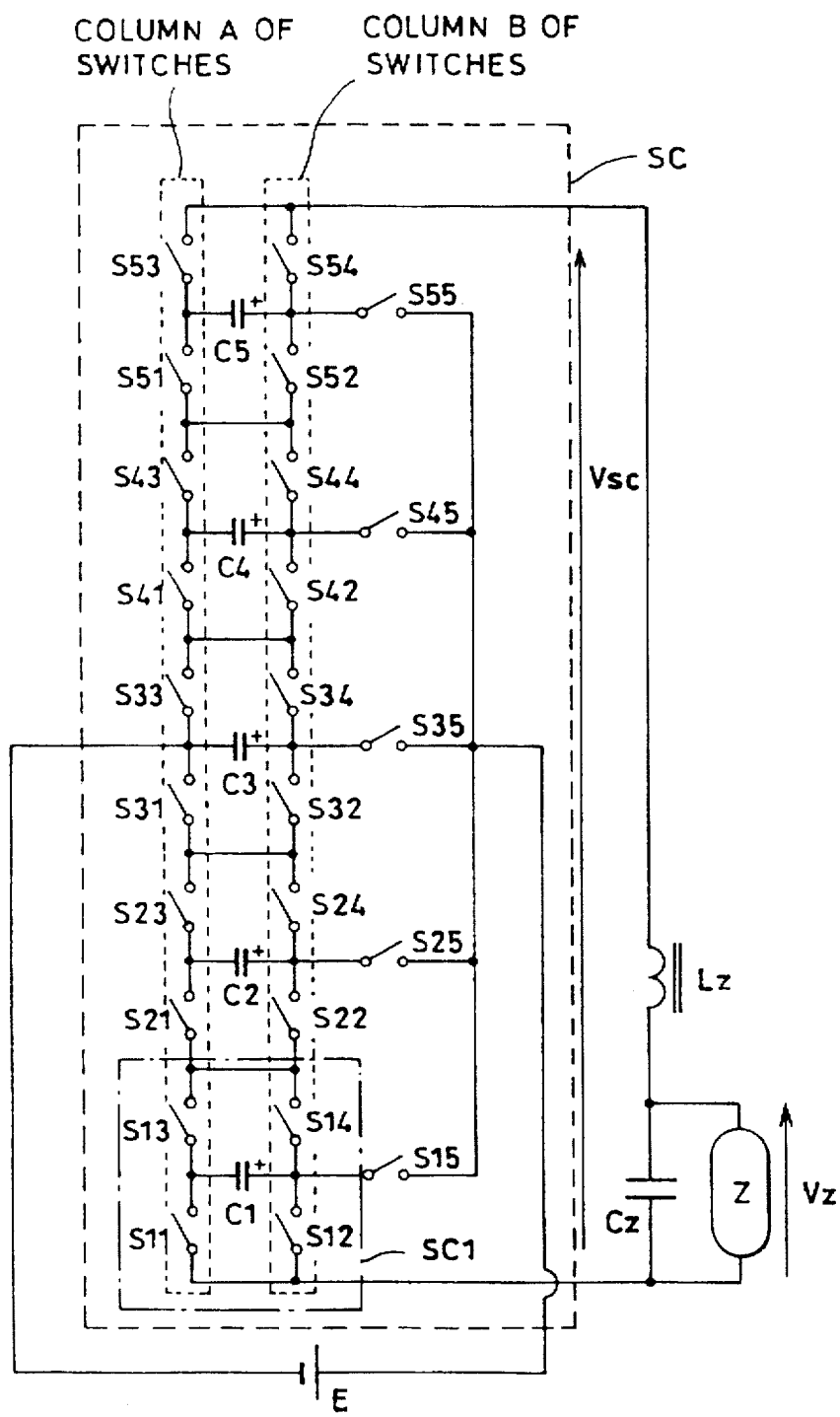
FIG. 1 is a circuit diagram of a power converter in accordance with a first embodiment of the present invention.

Referring first to FIG. 1, there is shown a circuit diagram of a first embodiment of the present invention, which comprises a switched capacitor circuit SC. In the present embodiment, five capacitors C1, . . . and C5 are connected in parallel to a D.C. power source E to be charged, so that, when any number of such capacitors are series-discharged with any polarity, the switched capacitor circuit SC can supply voltages −5E, −4E, −3E, −2E, −E, 0, E, 2E, 3E, 4E and 5E to a load. More specifically, connected to an output of the switched capacitor circuit SC is a filter circuit having an inductor Lz and a capacitor Cz, a load Z being connected in parallel to the capacitor Cz.

In more detail, the switched capacitor circuit SC is made up of a series circuit of five switched capacitor cells SCm (m=1, 2, 3, 4 and 5) and discharging circuits thereof. Each switched capacitor cell SCm includes switching elements Sm1, Sm2, Sm3 and Sm4 as well as a capacitor Cm connected to a junction point of the switching elements Sm3 and Sm1 also to a junction point of the switching elements Sm4 and Sm2, thereby collectively forming a bridge circuit. In the respective cells, the junction points between the switching elements Sm1 and Sm2 are connected to the junction points between the switching elements Sm3 and Sm4 (m≠n), whereby the cells are connected in series. An output of the switched capacitor circuit SC is extracted from ones of the switched capacitor cells SC1, SC2, . . . and SC5 of the series circuit located at both ends of the series circuit. More specifically, a load circuit is connected between the junction point of the switching elements S11 and S12 and the junction point of the switching elements S53 and S54.

In the parallel charging circuits of the respective switched capacitor cells SCm, the switching elements Sm5 are connected between one ends of the capacitors Cm and the junction points of the switching elements Sm4 and Sm2, and one ends of the switching elements S15, S25, . . . and S55 not connected to the capacitors C1, C2, . . . and C5 are collectively connected to a common plus terminal of the D.C. power source E. Connected to a minus terminal of the D.C. power source E is a series circuit (which will sometimes be referred to as the switch column A, hereinafter) of the switching elements S11, S13, S21, . . . , S43, S51 and S53 at its any point. In the illustrated example, the minus terminal of the D.C. power source E is connected to a junction point of the switching elements S33 and S31 as a middle point of the series circuit of the switching elements. When the switching elements S12, S14, S22, . . . , S52 and S54 (which will sometimes be referred to as the switch column B, hereinafter) are turned OFF, the switch column A is all turned ON, and the switching elements S15, S25, . . . and S55 are turned ON; the capacitors C1, . . . and C5 are parallelly charged with the power source voltage E, with one ends of these capacitors connected to the switch column B having plus polarities.

Figure 2:
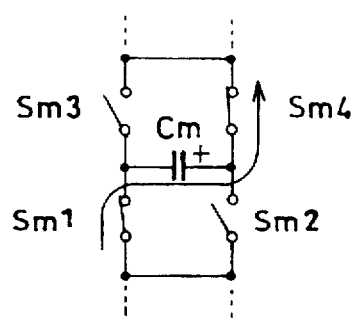
FIGS. 2, 3 and 4 are circuit diagrams for explaining the operation of the first embodiment of the present invention.
Figure 3:
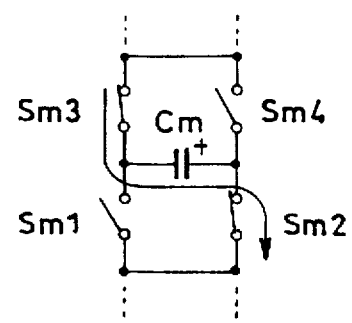
Figure 4:
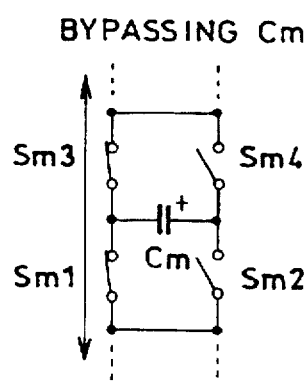
Figure 4:
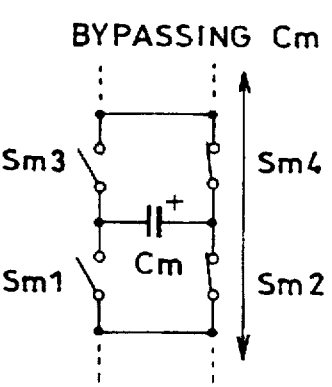

Explanation will be made as to the operation of the circuit of the present embodiment by referring to FIGS. 2 to 4. The switching elements in the respective bridge circuits of the switched capacitor cells are basically configured so that the switching elements Sm1 and Sm2 forming a complementary pair operate so as not to be turned ON at the same time, while the switching elements Sm3 and Sm4 forming a complementary pair operate so as not to be turned ON at the same time. First, when the switching elements Sm1 and Sm4 are turned ON and the switching elements Sm2 and Sm3 are turned OFF as shown in FIG. 2, the capacitor Cm is connected to the load in its plus direction. When the switching elements Sm2 and Sm3 are turned ON and the switching elements Sm1 and Sm4 are turned OFF as shown in FIG. 3, the capacitor Cm is connected to the load in its minus direction opposite to FIG. 2. When the switching elements Sm1 and Sm3 are turned ON and the switching elements Sm2 and Sm4 are turned OFF, or when the switching elements Sm2 and Sm4 are turned ON and the switching elements Sm1 and Sm3 are turned OFF as shown in FIG. 4; the load current fails to pass through the capacitor Cm and bypasses the switching elements. That is, the capacitor Cm is cut off from the load.

Figure 5:
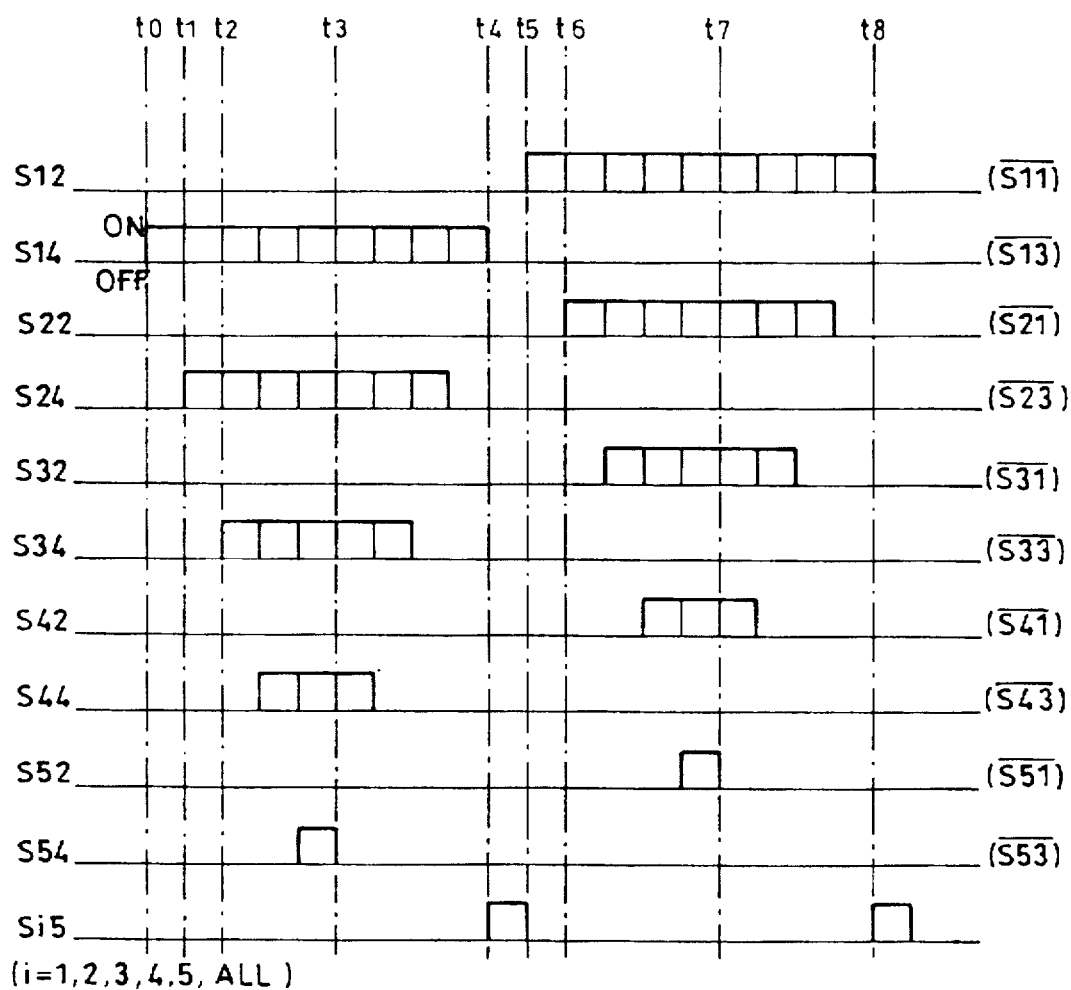
FIG. 5 is a timing chart for explaining the operations of switching elements in the first embodiment of the present invention.
Figure 6:
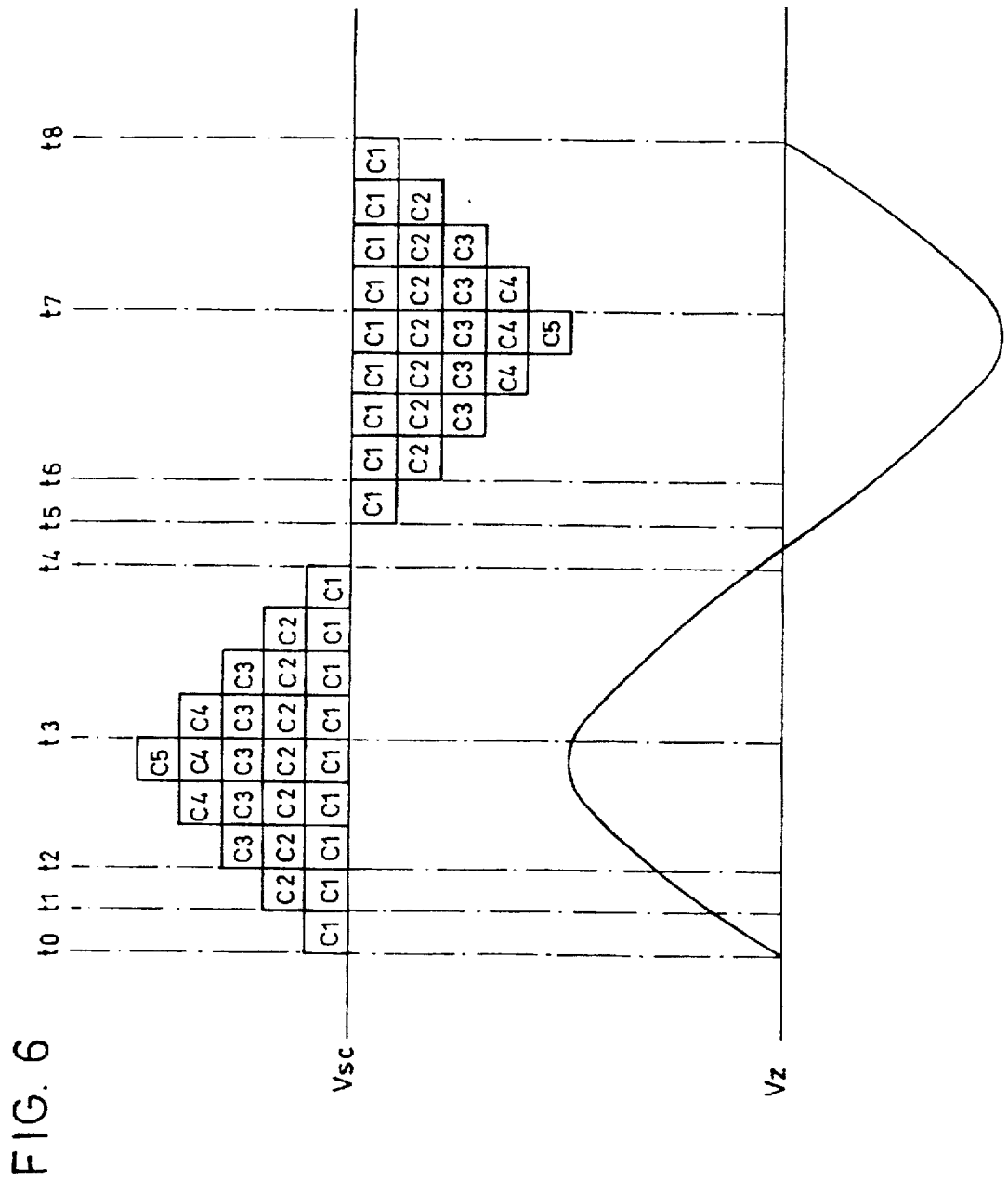
FIG. 6 is a diagram showing a waveform of an output voltage of the first embodiment of the present invention.

Explanation will next be made as to how to control supply of an A.C. voltage to the load, with reference to FIGS. 5 and 6. Assume now such an initial state that the capacitors C1, ... and C5 are all equally charged with the voltage E, the switch column A is all turned ON and the switch column B is all turned OFF. At a time t0, when the switching element S13 is turned OFF and the switching element S14 is turned ON, the capacitor C1 is connected to the load in the plus direction, with a path of the switching element S11, capacitor C1, switching elements S14, S21, S23, S31, S33, S41, S43, S51 and S53, which results in that an output Vsc of the switched capacitor circuit SC becomes +E. At a time t1, when the switching element S23 is turned OFF and the switching element S24 is turned ON, the capacitors C1 and C2 are connected in series with the load in the plus direction, with a path of the switching element S11, capacitor C1, switching elements S14, S21, capacitor C2, switching elements S24, S31, S33, S41, S43, S51 and S53, which results in that the output of the switched capacitor circuit SC becomes +2E. When the capacitors C3, C4 and C5 are also sequentially connected in series with the load in the plus direction under the similar control, the output of the switched capacitor circuit SC sequentially increments to +3E, +4E and +5E stepwise. At a time t3, when the switching element S54 is turned OFF and the switching element S53 is turned ON, the capacitor C5 is cut off from the load current path, so that the output of the switched capacitor circuit SC drops to +4E. Similarly, when the capacitors C4, C3, C2 and C1 are sequentially cut off from the load current path, the output of the switched capacitor circuit SC stepwise drops to +3E, +2E, +E and 0. At a time t4, when all the capacitors are cut off from the load current path, the switch column A is fully turned ON and the switch column B is fully turned OFF; the switching elements S15, ... and S55 are turned ON so that the capacitors C1, ... and C5 are parallelly charged with the power source voltage E.

At a time t5 at which the charging of the capacitors C1, ... and C5 is completed, when the switching elements S15, ... and S55 are turned OFF, the switching element S11 is turned OFF and the switching element S12 is turned ON; this causes the capacitor C1 to be connected to the load in the minus direction with a path of the switching element S12, capacitor C1, switching elements S13, S21, S23, S31, S33, S41, S43, S51 and S53, with the result that the output of the switched capacitor circuit SC becomes -E. When the capacitors C2, C3, C4 and C5 are sequentially connected in series with the load in the minus direction under the similar control, this causes the output of the switched capacitor circuit SC to sequentially vary stepwise to -2E, -3E, -4E and -5E. When the output Vsc of the switched capacitor circuit SC becomes -5E, the capacitor C5 is cut off from the current path at a time t7 so that the output of the switched capacitor circuit SC becomes -4E. Likewise, when the capacitors C4, C3, C2 and C1 are cut off from the current path, the output of the switched capacitor circuit SC returns to zero at a time t8. The aforementioned operations at the times t0 to t8 result in that the switched capacitor circuit SC applies to the load an A.C. voltage having step-like amplitudes of -5E to 5E. When the inductor Lz and capacitor Cz in the load part smooths the stepped waveform corresponding to one step as the output of the switched capacitor circuit SC into a smoothed waveform through their filtering function, the switched capacitor circuit SC can supply such a smooth A.C. voltage Vz as shown in FIG. 6 to the load Z.

Although the above explanation has been made in the connection with the case where the stage number of switched capacitor cells is 5 in the foregoing embodiment, the stage number may be set at an arbitrary number. In this connection, the small the stage number is the simpler the circuit arrangement is; whereas, the larger the stage number is the higher the boosting ratio of the output voltage to the input power source voltage is, enabling fine waveform control.

Figure 7:
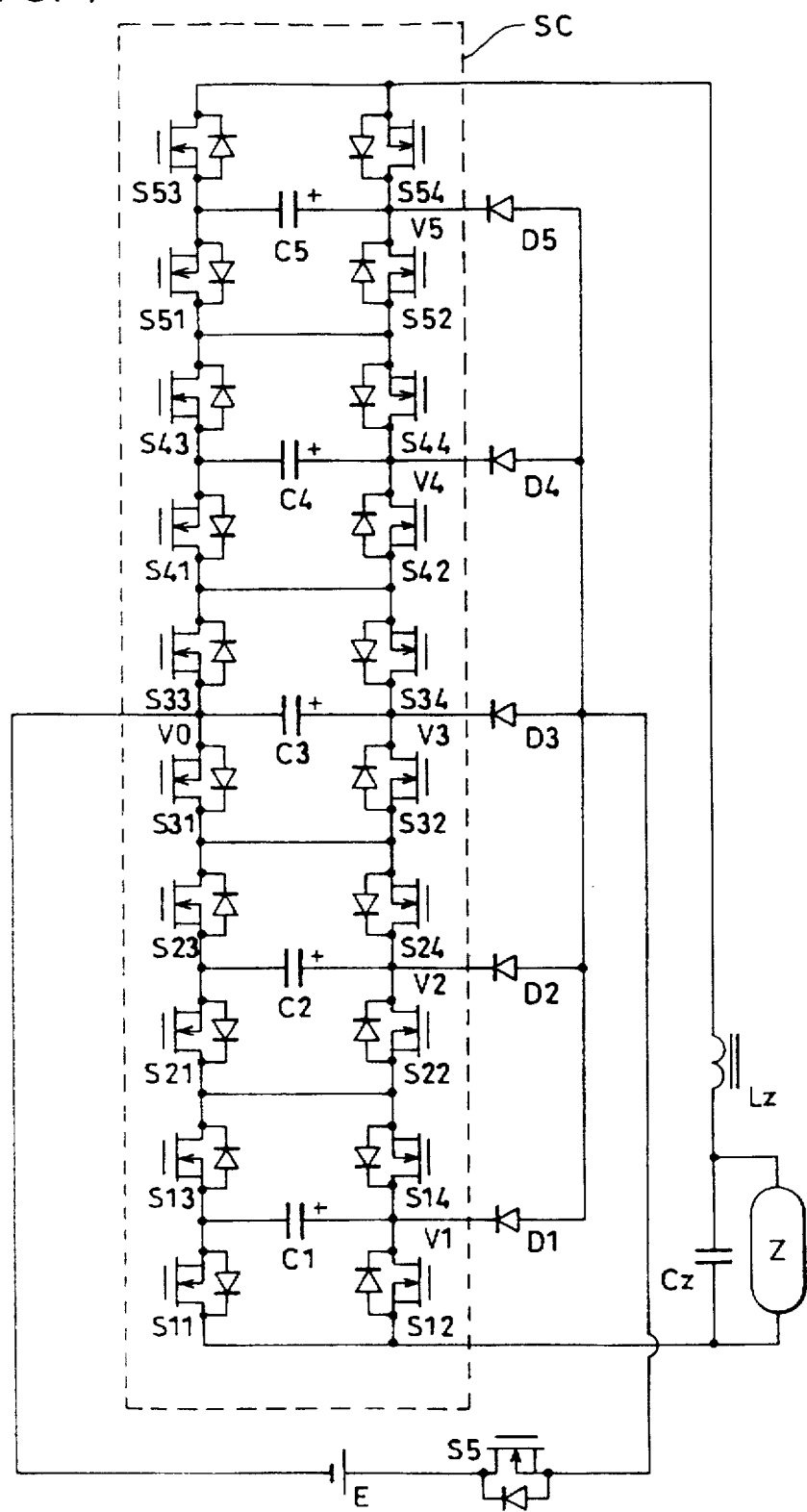
FIG. 7 is a circuit diagram of a power converter in accordance with a second embodiment of the present invention.

Next shown in FIG. 7 is a circuit diagram in accordance with a second embodiment of the present invention, wherein the switching elements in the first embodiment are implemented by MOSFETs having body diodes and diodes D1 to D5. In this case, the switching elements Sm1, Sm2 and Sm3, Sm4 of the MOSFETs in the respective cells are connected in series so as to be connected at their drains to the plus sides of the respective capacitors Cm and at their sources to the minus sides of the capacitors Cm. When it is desired to turn ON and OFF the switching elements S15, S25, ... and S55 as the charging ones at the same time; as shown in FIG. 7, a single controllable switching element S5 is connected in series with the D.C. power source E, the diodes D1 to D5 for prevention of reverse charge currents toward the respective cells are connected at their cathodes to the plus sides of the associated capacitors, are commonly connected at their anodes, to which a series circuit of the D.C. power source E and switching element S5 is connected. Though the switching elements in the respective cells have been implemented by the MOSFETs having their body diodes in FIG. 7, the switching elements may be replaced by bipolar transistors without body diodes but connected with diodes in inverse parallel relation thereto, achieving substantially the same effects as in the foregoing embodiment.

In the present embodiment, the same operation as in the foregoing first embodiment can be realized by performing substantially the same control as the first embodiment during power supply to the load. In the capacitor charging mode, however, the switch column A is previously fully turned ON as in the first embodiment, but when only the switching element S5 is turned ON in place of turning ON the switching elements S15, S25, ... and S55, all the capacitors can be charged at the same time.

The circuit system of the present second embodiment is featured in that the switched capacitor circuit SC can output voltages of -5E to +5E but the switching elements Smn (m=1, 2, 3, 4 and 5, and n=1, 2, 3 and 4, in the present embodiment) in the switched capacitor circuit SC can respectively have only a withstand voltage corresponding to a cell capacitor voltage (voltage E). Accordingly, the withstand voltage of each of the switching elements still corresponds to the single capacitor voltage, and a high A.C. output voltage can be obtained by increasing the number of cells to be connected in series. In general, the chip area of a double diffused MOSFET tends to be proportional to about square of a withstand voltage BVds between its gate and source and to be inversely proportional to an ON resistance Ron, so long as a withstand voltage BVds between its drain and source is equal to or higher than a constant voltage BVdss (about 100V for an ordinary element currently available in the market). Further, the chip area tends to be not able to be reduced even when the breakdown drops down to the voltage BVdss or less. Therefore, when it is desired to provide a load voltage of A.C. 500V, some elements each having a withstand voltage of 500V usually become necessary and the chip area of these high-breakdown-voltage elements becomes considerably large. In the switched capacitor circuit of the present second embodiment, on the other hand, when the stage number is set at 5, the switched capacitor circuit can be configured with use of elements each having a withstand voltage of 100V and enabling a small chip area. The present second embodiment tends to increase the number of necessary switching elements when compared to that necessary in the prior art switched capacitor circuit. When the stage number of cells is selected so that the withstand voltage of each switching element becomes close to the voltage BVdss, however, the total chip area of all the switching elements can be made small. This becomes a great merit, in particular, when it is desired to make the switching elements in the form of an integrated circuit.

Assuming now that a voltage V0 appears between the minus terminal of the D.C. power source E an a junction point (of the switching elements S31 and S33) of the switched capacitor circuit SC, and the diodes D1, . . . and D5 have cathode voltages V1, . . . and V5 respectively, as shown in FIG. 7; then the withstand voltages of series circuits of the diodes in the charging circuit and the switching element S5 become (V1−V0−E), (V2−V0−E), . . . and (V5−V0−E), respectively. Accordingly, when a potential at the minus side of the capacitor C3 is V0, the withstand voltage becomes V5−V0−E=V1−V0−E=2E and V4−V0−E=V2−V0−E=E. If the capacitor side V0 is connected to the minus side of the capacitor C1, then the maximum withstand voltage becomes V5−V0−E=4E, requiring high-breakdown-voltage diodes. Therefore, the withstand voltage can be made minimum as viewed from the entire charging circuit, when the minus side of the D.C. power source E is connected to the middle point of the switched capacitor circuit SC.

Figure 8:
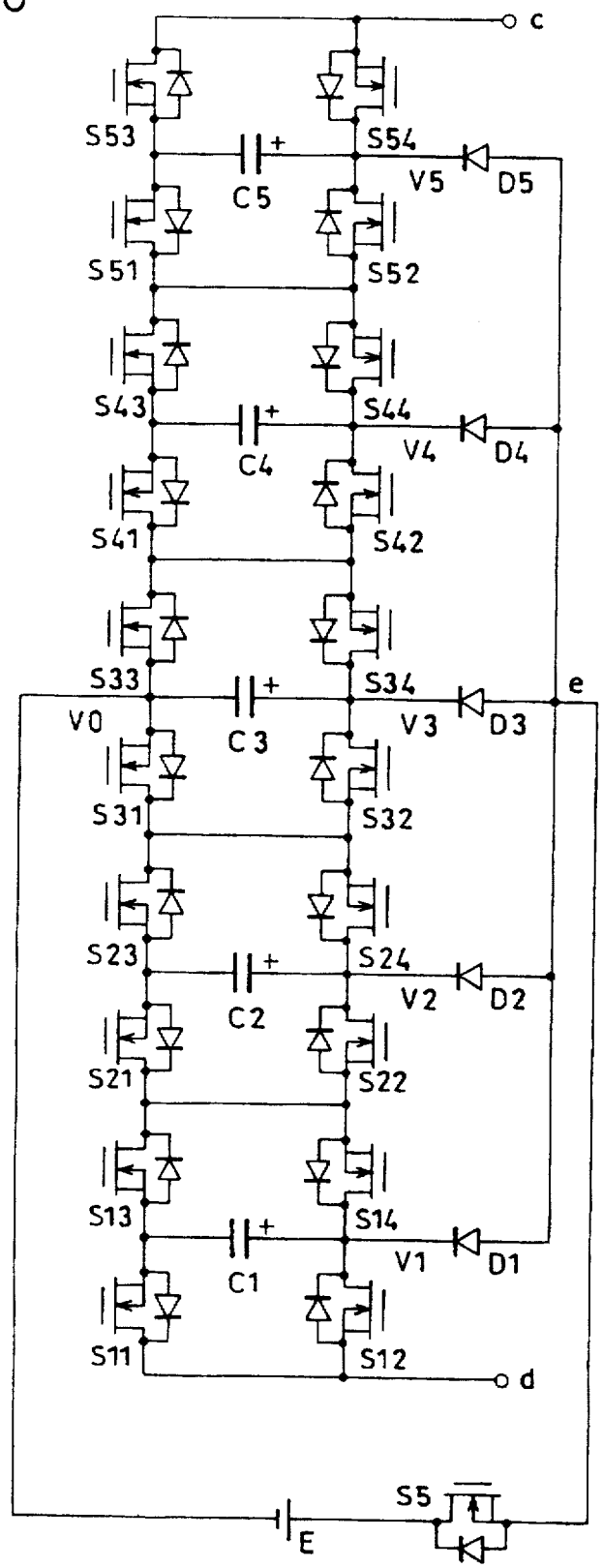
FIG. 8 is a circuit diagram of a power supply part in a third embodiment of the present invention.
Figure 9:
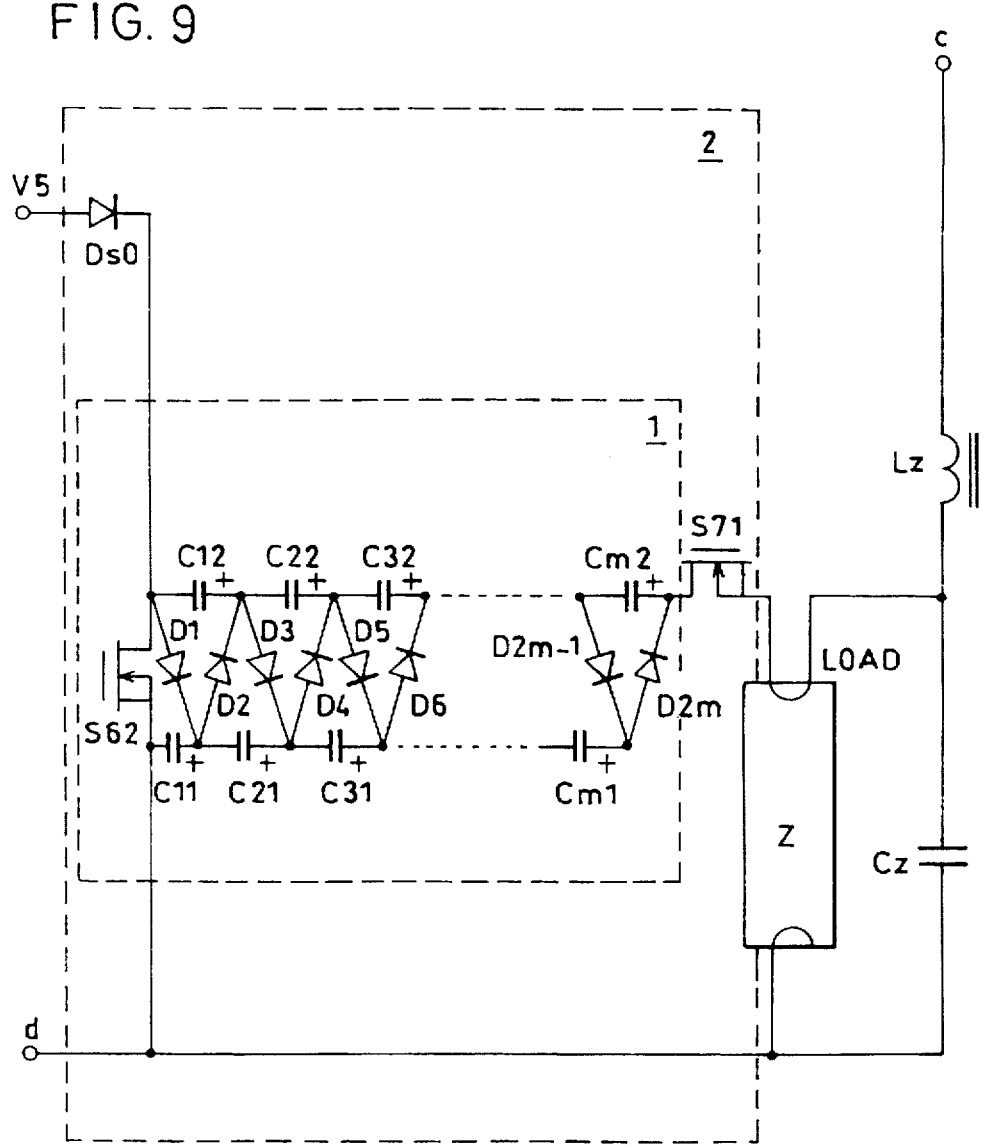
FIG. 9 is a circuit diagram of booster and load parts in the third embodiment of the present invention.

Shown in FIGS. 8 and 9 is a circuit diagram of a third embodiment of the present invention, in which terminals c and d in FIG. 9 are connected to terminals c and d in FIG. 8. A diode Ds0 in FIG. 9 is connected at its anode to a potential point V5 (junction point of the switching elements S52 and S54) in FIG. 8. In the present embodiment, the load Z in the foregoing second embodiment comprises a discharge lamp and in particular, a circuit (ignition circuit 2) is added for applying a high voltage at the time of igniting the discharge lamp. Incorporated in the ignition circuit 2 is a booster circuit 1 (Cockcroft circuit made up of capacitors Cn1, Cn2 (n=1, 2, 3, . . . and m) and diodes Di (i=1, 2, . . . and 2m), in the illustrated example), with series circuits of any number of capacitors connected in series in the power converter circuit as its power source. Thus, voltages corresponding to integer multiples (multiples of the series stage number) of the D.C. power source E are provided as the power source of the booster circuit 1.

Figure 10:
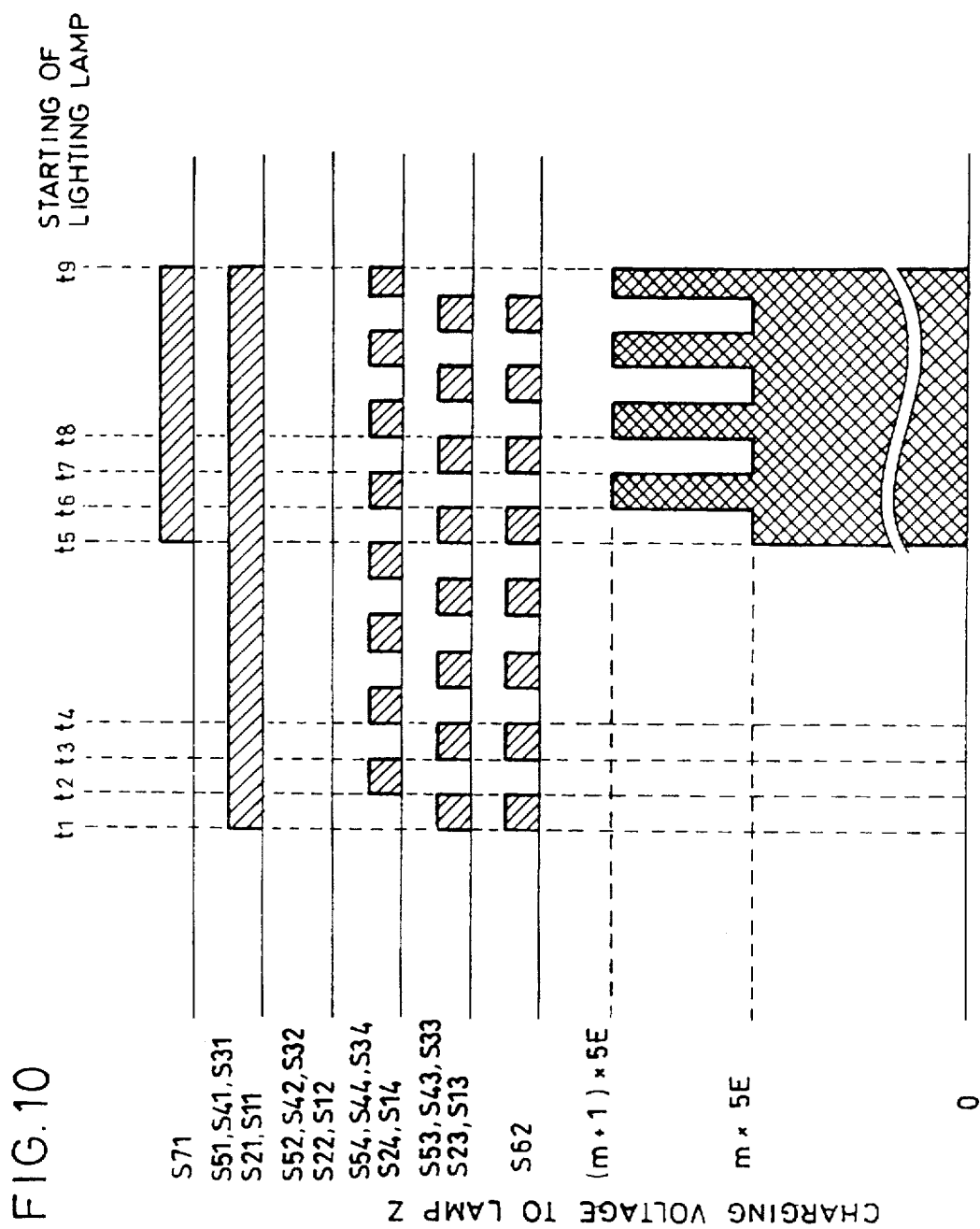
FIG. 10 is a diagram for explaining the operation of the third embodiment of the present invention.

Explanation will be made in detail as to the operation of the present third embodiment. The circuit operation of the third embodiment is shown in FIG. 10. As shown, in a time duration of from a time t1 to a time t2, when the switching elements S51, S41, S31, S21 and S11 and the switching elements S53, S43, S33, S23 and S13 are turned ON while the switching elements S52, S42, S32, S22 and S12 and the switching elements S54, S44, S34, S24 and S14 are turned OFF; the capacitors C1 to C5 are charged with the voltage E of the D.C. power source. Further, a switching element S62 is turned ON so that the series circuit of the capacitors Cn1 (n=1,2,3, . . . and m) is charged with the series circuit of the capacitors Cn1 (n=1,2,3, . . . and m) in the booster circuit 1. In a time duration of from the time t2 to a time t3, when the switching elements S53, S43, S33, S23 and S13 are turned OFF with the switching elements S51, S41, S31, S21 and S11 remaining in their ON state, while the switching elements S54, S44, S34, S24 and S14 are turned ON with the switching elements S52, S42, S32, S22 and S12 remaining in their OFF state; the capacitor C11 is charged with a power corresponding to k of ones of the capacitors C1 to C5 connected in series in the power converter circuit (k=5, in the third embodiment). In a time duration of from the time t3 to a time t4, the circuit operation is the same as that in the time duration of t1 to t2. When these operations are repeated, the respective capacitors Cn1, Cn2 (n=1, 2, 3, . . . and m) are charged with voltages of k×E (v).

Next at a time t5, when the capacitors Cn1, Cn2 (n=1, 2, 3, . . . and m) are charged to 5E, a switching element S71 is turned ON to ignite the discharge lamp. In a time duration of from the time t5 to a time t6, as in the time duration of t1 to t2, turning ON and OFF of the switching elements Sij (i=1 to 5; j=1 to 4) and switching element S62 respectively causes a voltage of m ×5E to be applied to the discharge lamp Z through a current path of the capacitors Cn1 (n=1, 2, 3, . . . and m), switching element S71 and discharge lamp Z. In a time duration of from the time t6 to a time t7, as in the time duration of t2 to t3, turning ON and OFF of the switching elements Sij (i=1 to 5; j=1 to 4) and switching element S62 respectively causes a voltage of (m+1)×5E to be applied to the discharge lamp Z through a current path of the switching element S11, capacitor C1, switching elements S14, S21, capacitor C2, switching elements S24, S31, capacitor C3, switching elements S34, S41, capacitor C4, switching elements S44, S51, capacitor C5, diode Ds0, capacitors C12, C22, C32, . . . , Cm2, switching element S71 and discharge lamp Z. The above operations are repeated to apply a high pulse voltage to the discharge lamp Z. When lamp lighting is carried out at a time t9, the switching elements S62 and S71 are turned OFF, the circuit operation is shifted to the circuit operation similar to that of the first embodiment to stabilize the lighting of the discharge lamp.

Figure 11:
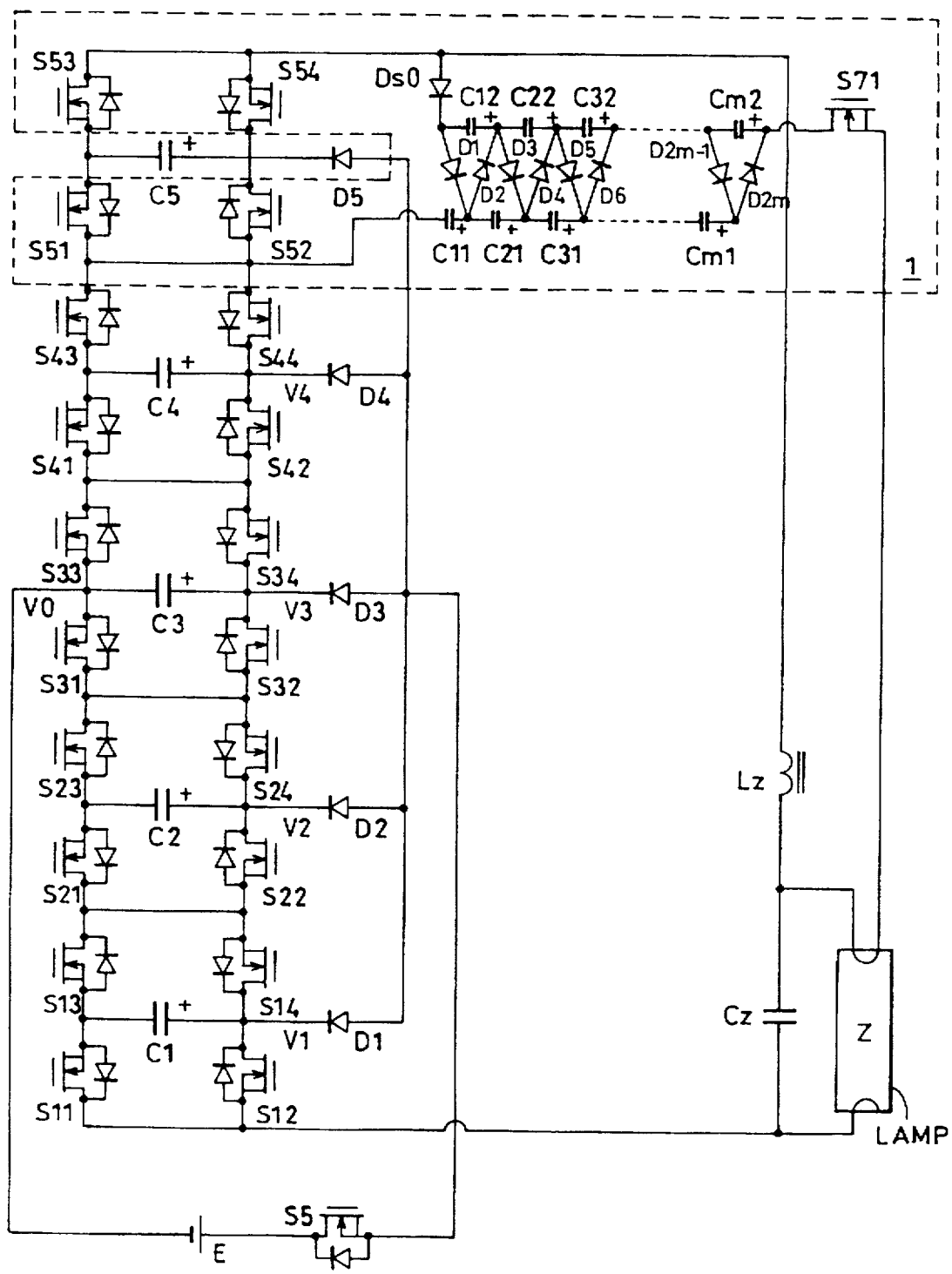
FIG. 11 is a circuit diagram of booster and load parts in a fourth embodiment of the present invention.
Figure 12:
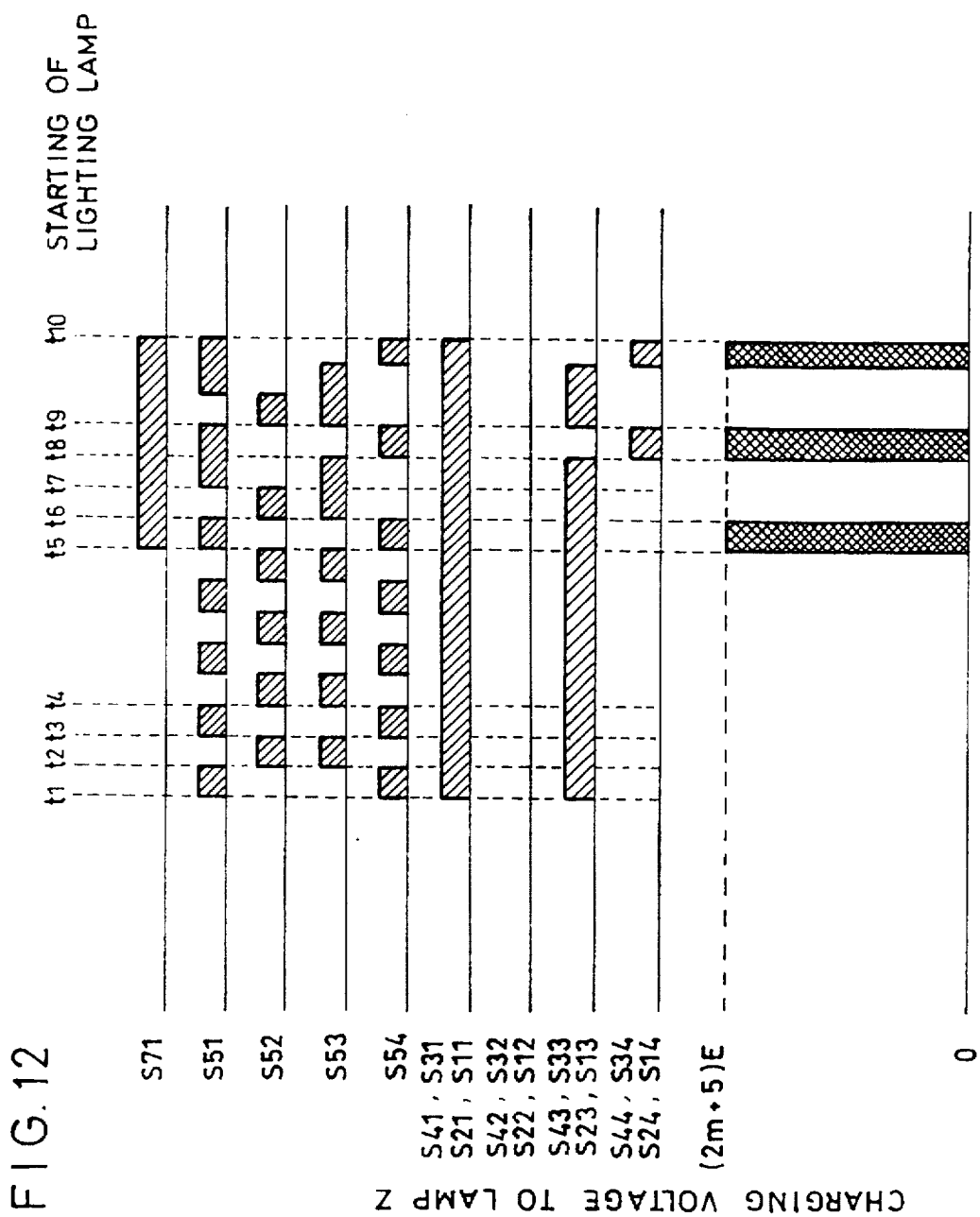
FIG. 12 is a diagram for explaining the operation of the fourth embodiment of the present invention.

A circuit diagram of a fourth embodiment is shown in FIG. 11 and the circuit operation thereof is shown in FIG. 12. In the circuit diagram of FIG. 11, the structure of its switched capacitor circuit is substantially the same as that of FIG. 8. In the foregoing third embodiment, the ignition voltage is generated by the booster circuit and D.C. power source; whereas, in the fourth embodiment, a booster circuit (including a Cockcroft circuit) and a power converter circuit are connected in series to apply a series voltage thereof to a lamp as its ignition voltage.

In the fourth embodiment, more specifically, the capacitors in the power converter circuit are used as power sources of the booster circuit, and the polarity inversion of the power sources is carried out through full-wave bridge circuits of the capacitors and switching elements to charge the capacitors in the booster circuit with a D.C. power source voltage (2E in the present embodiment) or more. Further, the switching elements of the power converter circuit (full-wave bridge circuits) are shared with those of the booster circuit.

The specific circuit operation of the fourth embodiment will be explained with reference to FIG. 12. In a time duration of from a time t1 to a time 5, the switching elements S43, S41, S33, S31, S23, S21, S13 and S11 are turned ON and the switching elements S44, S42, S34, S32, S24, S22, S14 and S12 are turned OFF to charge the capacitors C1 to C4 with the voltage E from the D.C. power source. In a time duration of from the time t1 to a time t2, the switching elements S51 and S54 are turned ON and the switching elements S52 and S53 are turned OFF so that the capacitor CS is charged up to the voltage E a capacitor C11 is charged also to the voltage E. And the capacitors Cn1 (n=1, 2, . . . and m) are charged with the series circuit of the capacitor C5 and capacitors Cn2 (n=1, 2, . . . and m). In a time duration of from the time t2 to a time t3, turning OFF of the switching elements S51 and S54 and turning ON of the switching elements S52 and S53 cause the capacitor C5 to be charged up to the D.C. power source voltage E. The circuit operations of these time durations of t1 to t3 are repeated so that the capacitors C1 to C5 in the power converter circuit are charged up to the voltage E, the capacitor C11 in the booster circuit 1 is charged up to the voltage E, and the capacitors Cn1 (n=2, 3, . . . and m) and capacitors Cn2 (n=1, 2 . . . and m) are charged up to a voltage 2E.

Then at the time t5, the switching element S71 is turned ON to apply a lamp ignition voltage to the discharge lamp Z. In a time duration of from the time t5 to a time t6, the switching elements S51, S54, switching elements S41, S31, S21, S11 and switching elements S44, S34, S24, S14 are turned ON while the switching elements S52, S53, switching elements S44, S42, S34, S24, S14 and switching elements S43, S33, S23, S13 are turned OFF; whereby a voltage of (2m+5)×5is applied to the discharge lamp Z through a current path of the switching elements S11, S13, S21, S23, S31, S33, S41, S43, S51, capacitor C5, switching element S54, capacitors C12, C22, C32, . . . , Cm2, switching element S71 and discharge lamp Z.

In a time duration of from the t6 to a time t7, the switching elements S52, S53, switching elements S41, S31, S21, S11, and switching elements S43, S33, S23, S13 are turned ON while the switching elements S51, S54, switching elements S42, S32, S22, S12, switching elements S44, S34, S24, S14 are turned OFF; so that the capacitors C1 to C4 are charged up to the D.C. power source voltage E.

In a time duration of from the t7 to a time t8, the switching elements S51, S53, S41, S31, S21, S11 and switching elements S43, S33, S23, S13 are turned ON, while the switching elements S52, S54, switching elements S42, S32, S22, S12 and switching elements S44, S34, S24, S14 are turned OFF; so that the capacitors C1 to C5 are charged up to the D.C. power source voltage E.

In a time duration of from the time t8 to a time t9, as in the time duration of t5 to t6, these operations are repeated so that, such high frequency pulses as shown in FIG. 12 are applied to the discharge lamp Z. When the discharge lamp Z is lighted at a time t10, the switching elements S62 and S71 are turned OFF, which results in that the circuit operation is shifted to the circuit operation of the foregoing first embodiment to stabilize the lighting of the discharge lamp.

Figure 13:
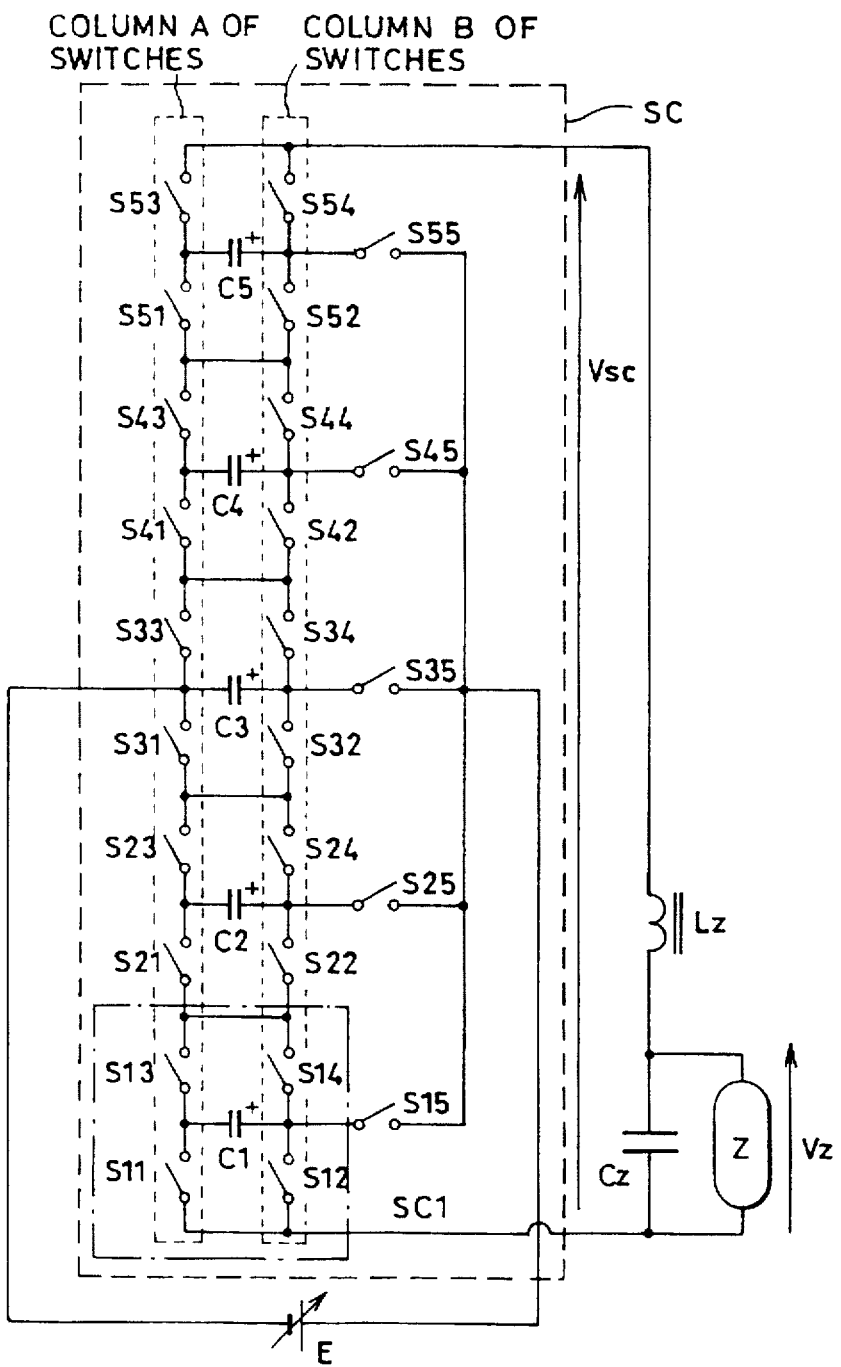
FIG. 13 is a circuit diagram of a fifth embodiment of the present invention.

Turning to FIG. 13, there is shown a circuit diagram of a fifth embodiment, in which, for the purpose of obtaining a high voltage for igniting a discharge lamp, such a special booster circuit as in the third and fourth embodiments is not utilized but the charging voltage of the capacitors C1 to C5 in the switched capacitor circuit SC is increased from the voltage E to E' (>E) to thereby raise the output of the switched capacitor circuit SC to a voltage 5E' as an ignition voltage. In the present fifth embodiment, no special circuit configuration is provided for igniting the discharge lamp, so that an increase in the number of necessary parts can be avoided but the withstand voltage of the switching elements in the switched capacitor circuit SC becomes E'.

Figure 14:
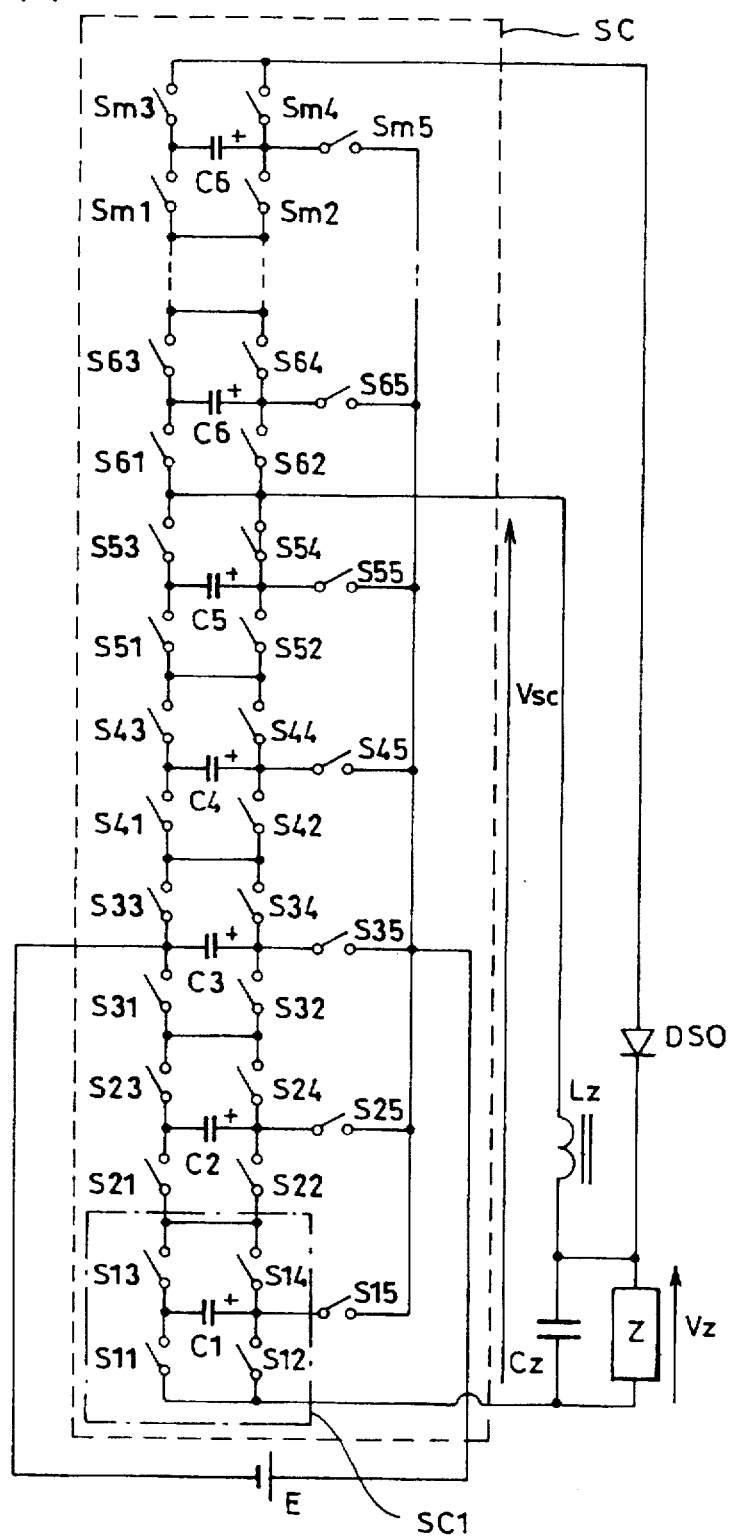
FIG. 14 is a circuit diagram of a sixth embodiment of the present invention.

Explanation will then be made as to a sixth embodiment of the present invention. The circuit configuration of the sixth embodiment, which is substantially the same as in that of the second embodiment of FIG. 7, is designed so that the stage number of capacitor cells to be used is set according to an intended output voltage and thus the output voltage is boosted or varied at the time of igniting. For example, in the case where the load is a fluorescent lamp, all the cells are connected in series to generate a high voltage for lamp ignition in the lamp ignite mode; a less number of the cells are operated in a full lamp light mode to light the lamp with a voltage lower than that in the lamp ignite mode. Further, as shown in FIG. 14, a pulsative voltage is applied directly to the discharge lamp through a diode DS0 not through the inductor Lz and capacitor Cz in the lamp ignite mode, whereby the lamp ignition can be effected more easily. A light sustaining voltage becomes higher in the dimming mode than that in the full light mode, whereby the cells larger in number than in the full lit mode are used for the dimming light. The present sixth embodiment can freely vary its output without providing a special output varying circuit or control circuit and without increasing the withstand voltage of each cell.

Figure 15:
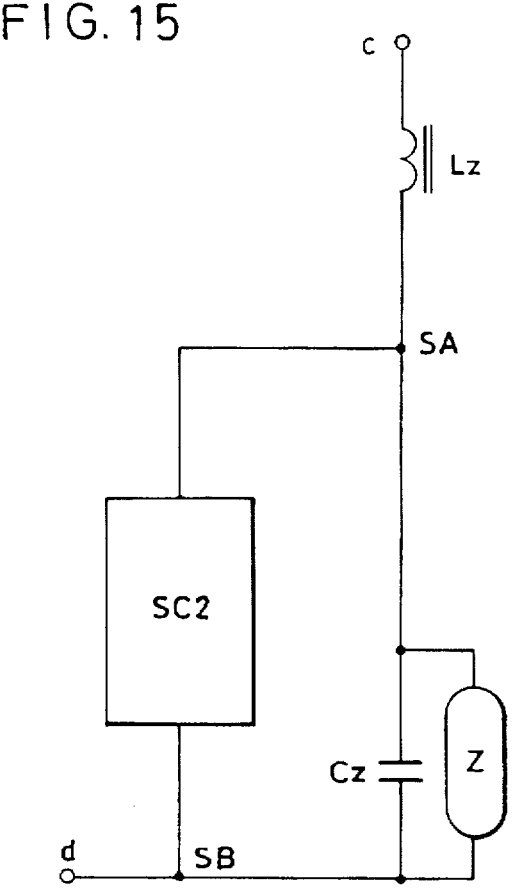
FIGS. 15 and 16 are circuit diagrams of a seventh embodiment of the present invention.
Figure 16:
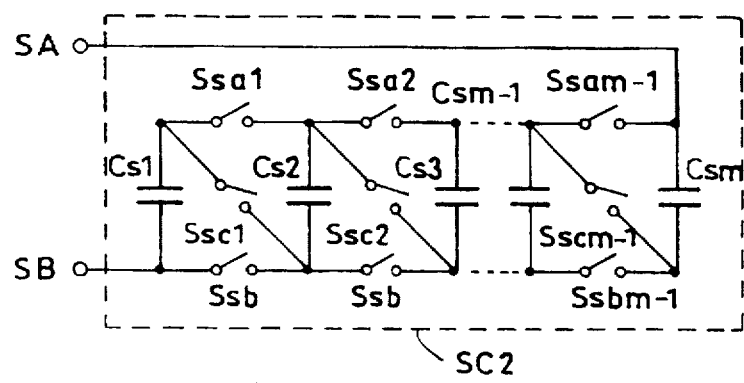

The circuit diagram of the seventh embodiment is shown in FIGS. 15 and 16 wherein terminals c and d are connected to terminals c and d in FIG. 8. In the seventh embodiment, for the purpose of obtaining a high voltage for igniting a discharge lamp, switched capacitor circuit SC2 of a parallel charge/series discharge type is connected in parallel to a load so that a boosted output of the switched capacitor circuit SC2 causes ignition of the discharge lamp. The switched capacitor circuit SC2 is made up of groups of switching elements Ssa1, . . . , Ssam−1, Ssb1, . . . and Ssbm−1 connected in parallel to m of capacitors Cs1, . . . and Csm and a group of switching elements Ssc1, . . . and Sscm−1 connected in series with the capacitors Cs1, . . . and Csm1.

In the operation of the seventh embodiment, when the switching elements Sscl, . . . and Sscm−1 are all turned OFF as well as the switching elements Ssa1, . . . , Ssam−1 and the switching elements Ssb . . . , Ssbm−1 are all turned ON; the m capacitors of the switched capacitor circuit SC2 are connected in parallel so that the switched capacitor circuit SC2 outputs a voltage +5 E and the capacitors Cs1, ... and Csm are charged with the voltage +5 E. Next, when the switching elements Ssc−1, . . . and Sscm−1 are all turned ON as well as the switching elements Ssa1, . . . , Ssam−1 and the switching elements Ssb, . . . , Ssbm−1 are all turned OFF; the m capacitors of the switched capacitor circuit SC2 are connected in series so that the switched capacitor circuit SC2 applies a voltage +5 mE to the load to ignite the discharge lamp as the load. In a normal light mode, all the switching elements of the switched capacitor circuit SC2 are turned OFF to be cut off from its load current path. In the seventh embodiment, since no new switching element is inserted in the load current path in the normal light mode, there is no ON loss of the switching elements in the normal light mode.

Figure 17:
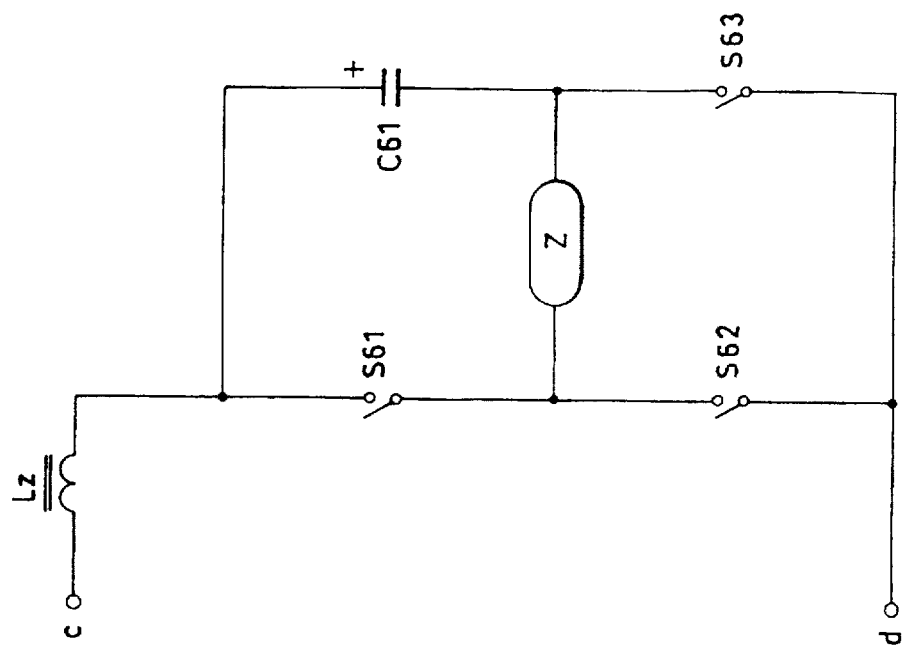
FIG. 17 is a circuit diagram of an eighth embodiment of the present invention.

A circuit diagram of an eighth embodiment is shown in FIG. 17 wherein terminals c and d are connected to the terminals c and d in FIG. 8.

In the present embodiment, for the purpose of obtaining a high voltage for igniting a discharge lamp, a capacitor previously charged with an output (+5E) of the switched capacitor circuit SC is connected in series with the switched capacitor circuit SC to apply an ignition voltage of +10E to the discharge lamp load Z.

In the configuration of the circuit diagram shown in FIG. 17, a series circuit of the filtering inductor Lz, capacitor C61 and switching element S63 is wired between the output terminals of the switched capacitor circuit SC, the switching elements S61 and S62 are wired in parallel to the capacitor C61 and switching element S63 so that the switching element S62 is positioned on the side of the switching element S63. Further, the discharge lamp Z as the load is provided between a junction point of the capacitor C61 and switching element S63 and a junction point of the switching element s S61 and S62.

In operation, prior to igniting the discharge lamp, the switching elements S61 and S62 are turned OFF and the switching element S63 is turned ON so that the switched capacitor circuit SC outputs a voltage +5E and the capacitor C61 is charged with the voltage +5E. When the output of the switched capacitor circuit SC is then inverted to −5E to turn ON the switching element S62 and to turn OFF the switching element S63, a voltage of −10E is applied to the discharge lamp load Z to ignite the lamp. After the lamp is lighted, the switching element S61 is turned ON.

Figure 18:
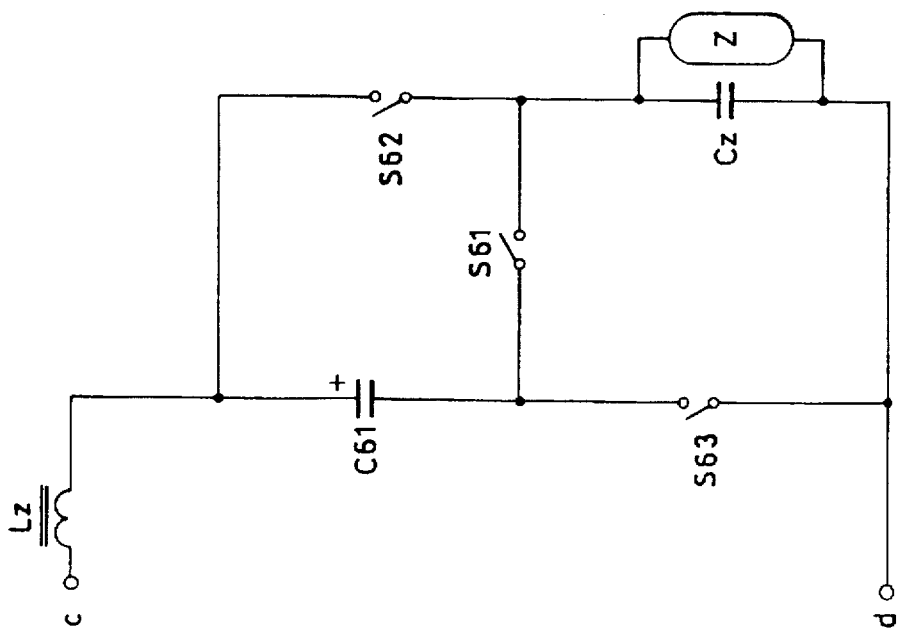
FIG. 18 is another circuit diagram of the eighth embodiment of the present invention.

Another form of the circuit diagram of the eighth embodiment is shown in FIG. 18 wherein the terminals c and d are connected to ther terminals c and d in FIG. 8. The pesent embodiment arranged in this way can produce substantially the same effect as the circuit diagram of FIG. 17.

Figure 19:
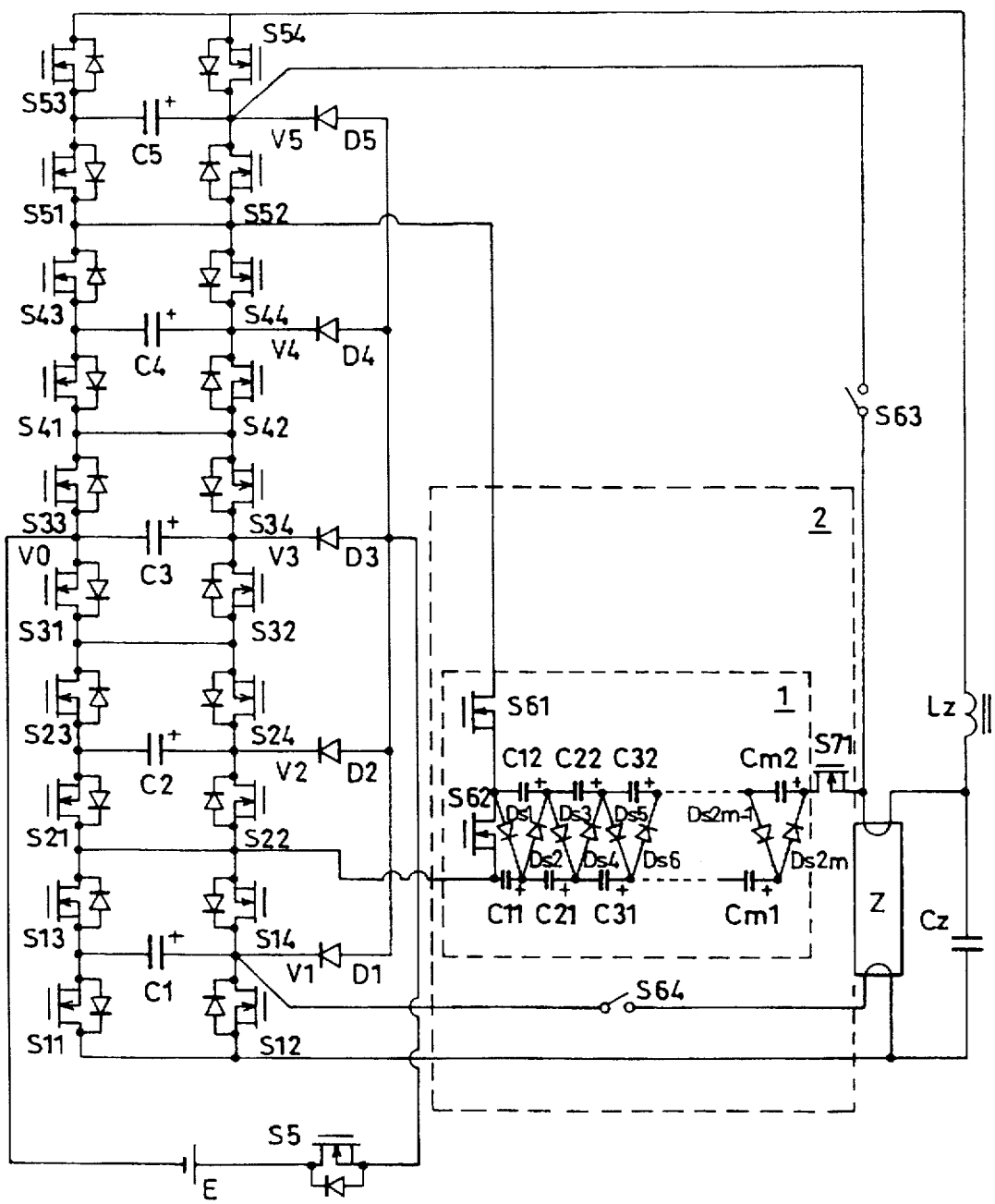
FIG. 19 is a circuit diagram of a ninth embodiment of the present invention.

A circuit diagram of a ninth embodiment is shown in FIG. 19 in which the power of the power input part of the ignition circuit 2 of the third embodiment is supplied from the capacitors C2, C3 and C4, and paths are provided to extend from the capacitors C1 and C5 to filaments of the discharge lamp for preheating the filaments of the discharge lamp. More specifically, provided as preheating circuits are a series circuit of the switching element S63, one of the filaments and filtering inductor Lz connected between a junction point of the switching elements S52 and S54 and a junction point of the switching elements S53 and S54 as well as a series circuit of the switching element S64 and the other filament connected between a junction point of the switching elements S12 and S14 and a junction point of the switching elements S11 and S12. In the ignition circuit, an output of the switching element S71 is connected to a junction point between the switching element S63 and one filament. The filament preheating is carried out when the switching elements S63 and S64 are turned OFF to charge the capacitors C1 and C5 with the voltage E and the switching elements S63 and S64 are turned ON. At the same time, the capacitors C2, . . . and C5 are connected in series to turn ON the switching element S61 to charge the capacitors C1, . . . and Cm2 through the igniting booster circuit 1. After completion of the filament preheating, the switching elements S63 and S64 are turned OFF and the switching element S71 is turned ON to ignite the lamp.

Figure 20:
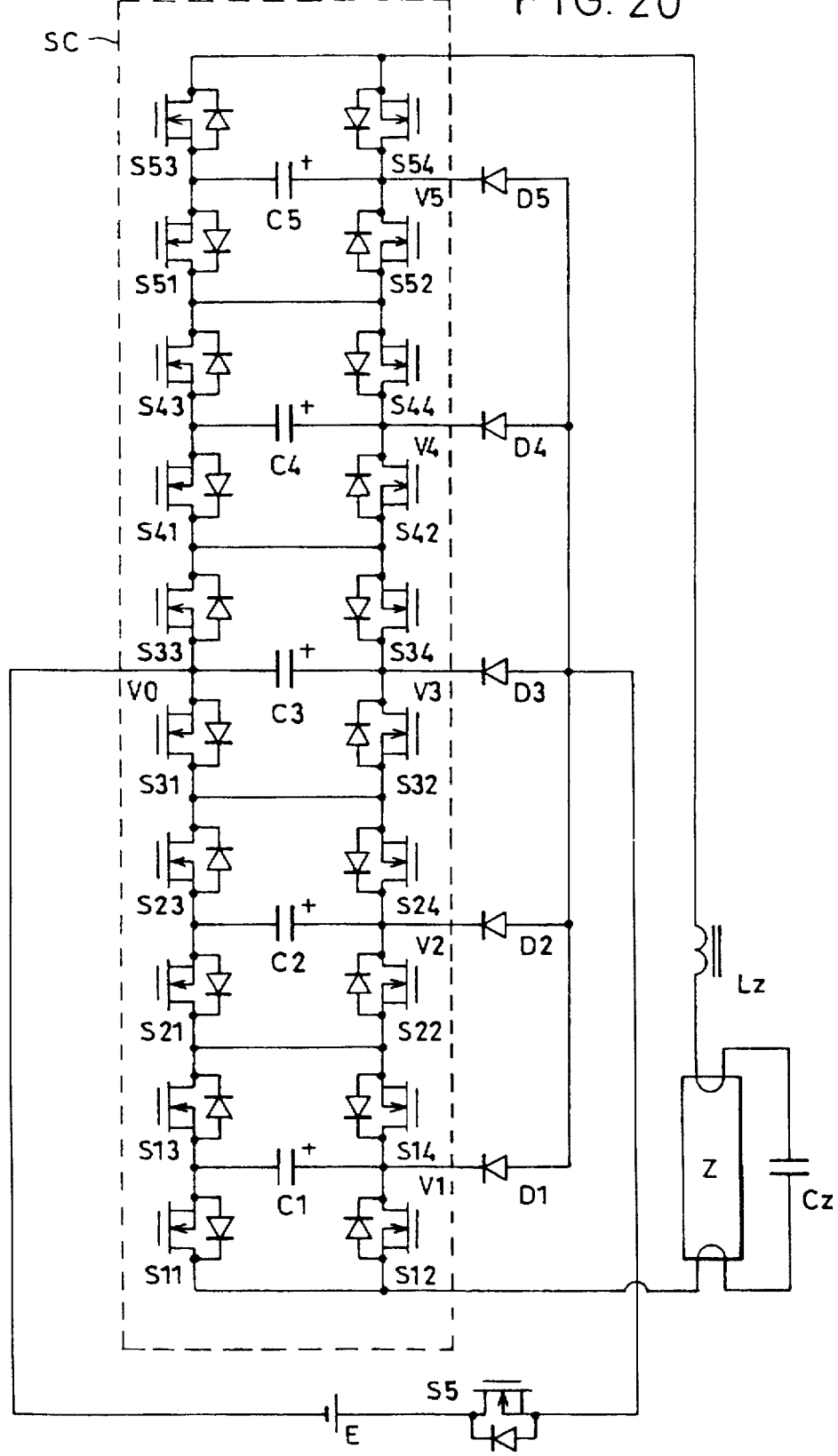
FIG. 20 is a circuit diagram of a tenth embodiment of the present invention.

Shown in FIG. 20 is a circuit diagram of a tenth embodiment which is substantially the same as that of FIG. 7 except the discharge lamp load Z and capacitor Cz. In the tenth embodiment, a resonance circuit is formed including the discharge lamp as the load so that the frequency f or step-like waveform shape of a high frequency A.C. output of the switched capacitor circuit SC is varied to adjust the load power. The resonance circuit also has a filtering function of smoothing the step-like waveform of the output. In the arrangement of the tenth embodiment, such a load circuit is provided to the output side of the switched capacitor circuit SC that the inductor Lz and the discharge lamp Z are connected in series and the capacitor Cz is provided between the filaments of the discharge lamp load Z. The inductor Lz and capacitor Cz in the tenth embodiment are considerably large in size, when compared to the filtering inductor Lz and filtering capacitor Cz having the filtering function in the foregoing embodiments.

Assume that the load circuit has a resonance frequency fo. Then if the frequency f of the output of the switched capacitor circuit SC is equal to fo, the load power Win becomes maximum (Wmax). Prior to igniting the discharge lamp Z, the power consumption Wz of the discharge lamp corresponds to only the filament preheating and satisfies a relation Win>Wz, whereby a voltage across the capacitor Cz is increased. When the voltage across the capacitor Cz becomes higher than the ignition voltage of the discharge lamp Z, the discharge lamp Z ignites. After the discharge lamp Z is lighted, the frequency f of the output of the switched capacitor circuit SC can be set away from the resonance frequency fo to adjust the load power Win for dimming. By varying the waveform of the output of the switched capacitor circuit SC, the load power Win can be changed. For example, the load power Win can be decreased by setting the peak voltage at 4E or less, or can be increased not by making the A.C. output of the switched capacitor circuit SC during its one period a step-like waveform close to a sinusoidal wave but by making the A.C. output a rectangular wave having two values of +5E and −5E. As has been explained in the foregoing, in the circuit of the tenth embodiment, since the resonance circuit is used as the load circuit, the lamp igniting and dimming can be realized by varying the power applied to the discharge lamp load.

Explanation will then be made as to an eleventh embodiment. The eleventh embodiment has substantially the same circuit configuration as the first embodiment, but is designed so that all the capacitors are connected in series with their plus and minus polarities inverted, and a multi-level voltage is supplied to a load part, and such control is carried out that a total capacitance of the switched capacitor circuit SC remains constant.

Figure 21:
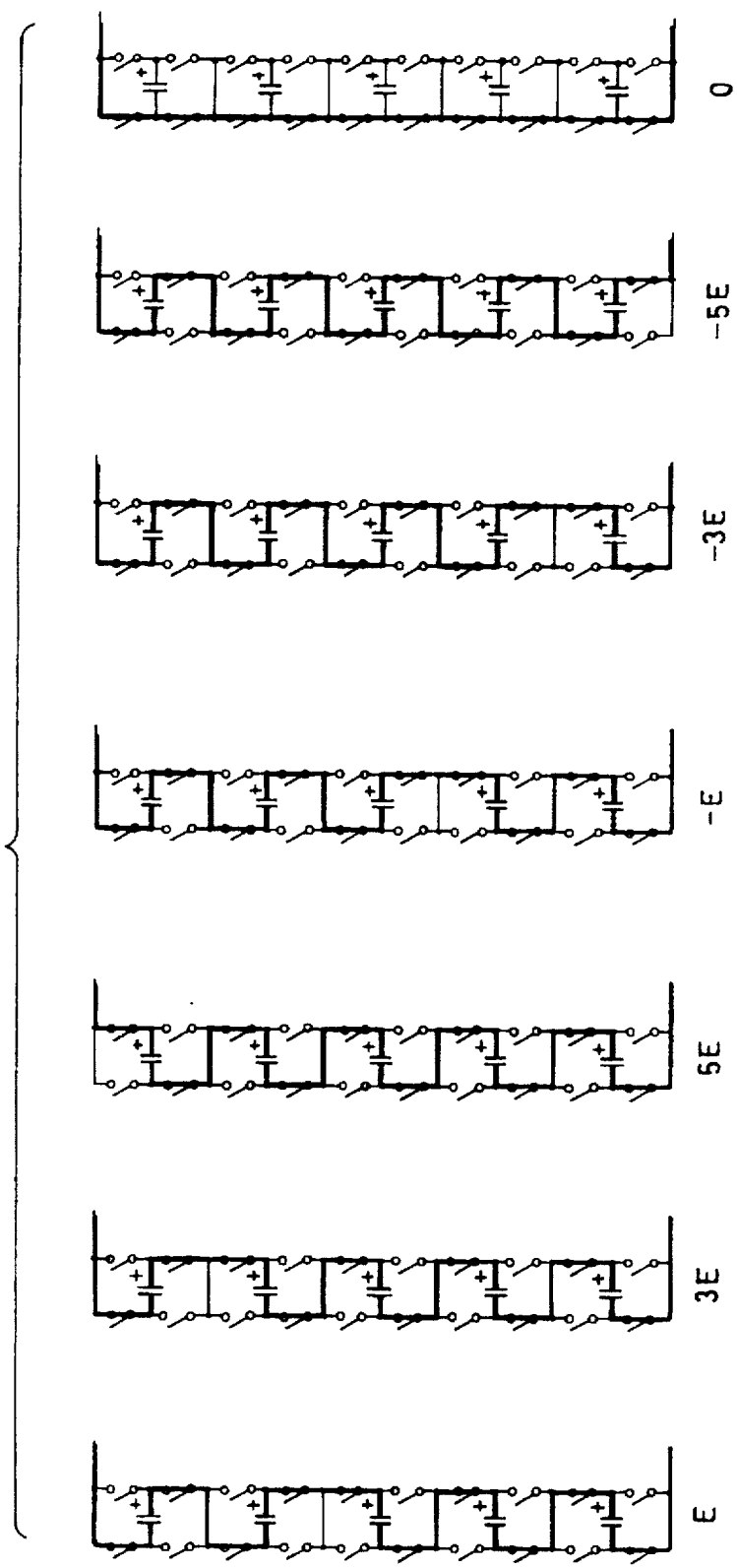
FIG. 21 is a circuit diagram of an eleventh embodiment of the present invention.

A control arrangement of supplying an A.C. voltage to the load will be explained in connection with FIG. 21. In the drawing, switching elements corresponding to paths shown by thick lines are turned ON to supply voltages of E, 3E, −5E, −E, −3E and −5E to the load part. For example, when it is desired to supply the voltage E to the load, as shown by the operational explanation diagram, the capacitors C1, C2 and C3 are connected in series with the load with the same polarity while the capacitors C4 and C5 are connected in series with the load with the inverted polarity to supply the voltage E to the load. When it is desired to supply the voltage 3E to the load, the capacitors C1, C2, C3 and C4 are connected in series with the load with the same polarity while the capacitor C5 is connected in series with the load with the inverted polarity to supply the voltage 3E to the load. In this way, the total capacity of the switched capacitor circuit SC is made constant so that multi-level voltage can be supplied to the load.

The voltages of E, 3E, 5E, 3E, E, 0, −1E, −3E, −5E, −3E, −E and 0 are sequentially applied to the load in this order so that the step-like nearly sinusoidal wave applied to the load is filtered by the inductor Lz and capacitor Cz, and thus an A.C. voltage having a nearly sinusoidal wave is supplied to the load. As a result, the total capacitance of the switched capacitor circuit SC becomes constant so that, in the case where the load is of an inductive type such as an inductor or of a resonance type, parameter design can be advantageously facilitated. The respective connection paths shown in FIG. 21 are merely an example when supplying the respective voltages to the load. Thus, it goes without saying that, when the number of capacitors to be connected with their polarity inverted is determined, the respective voltage levels can be obtained as the voltages across the load by connecting any number of the capacitors in series with their polarity inverted.

Figure 22:
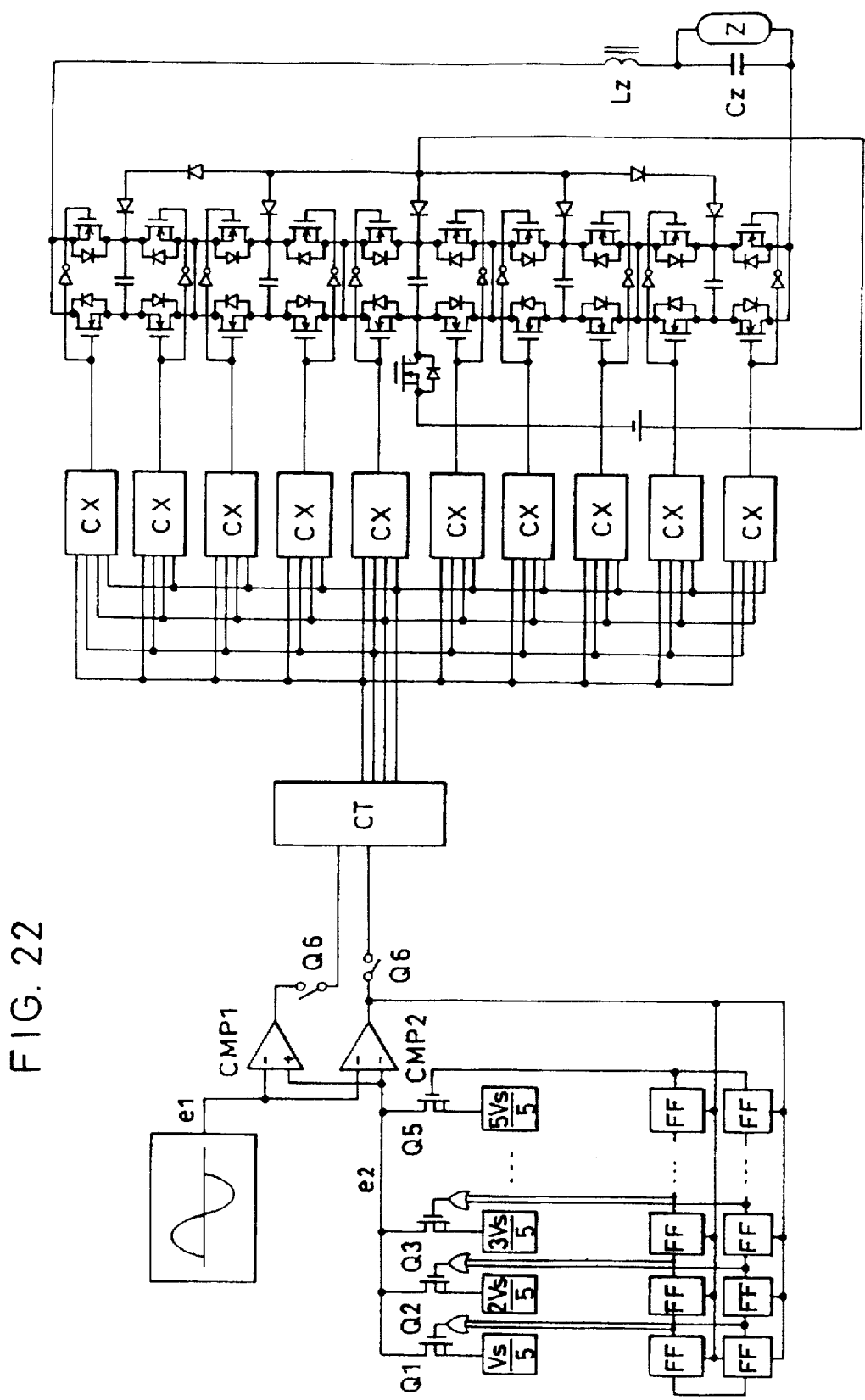
FIG. 22 is a circuit diagram of a twelfth embodiment of the present invention.

Next shown in FIG. 22 is a twelfth embodiment of the present invention. The present embodiment is directed to a control circuit which smooths the output waveform of the switched capacitor circuit to reduce noise and, more particularly, which adjusts a division time of one period, i.e., a time corresponding to each stage voltage to approach the output waveform to a sinusoidal wave.

The twelfth embodiment includes a circuit for generating a reference voltage e1 of a sinusoidal waveform having a reference frequency, a circuit for dividing a value Vs slightly smaller than the peak voltage of the reference voltage e1 by the stage number (n=5 in the example of FIG. 28) of the switched capacitor circuit into voltages of Vs/n, 2Vs/n, . . . and nVS/n to output one of these division voltages as a reference voltage e2, comparators CMP1 and CMP2 for comparing the reference voltages e1 and e2, a counter CT for counting the number of intersections of the reference voltages e1 and e2 of the comparators CMP1 and CMP2, switching elements Q1 to Q5 and flip-flops FF for sequentially outputting optimum one of the plural reference voltages e2, and a driver circuit CX for controlling the switching operation of the switched capacitor circuit on the basis of outputs from the counter CT.

Figure 23:
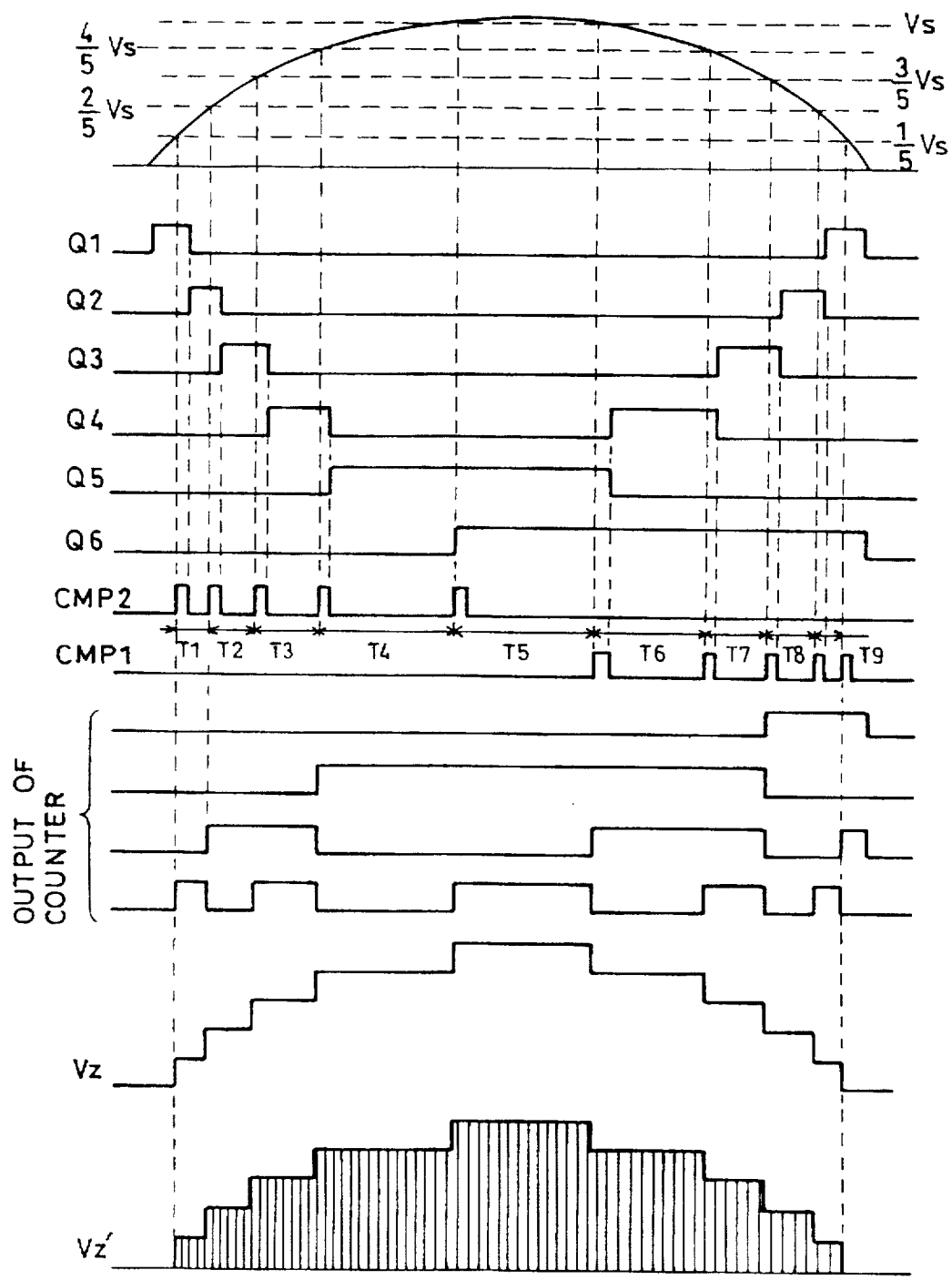
FIG. 23 is a diagram for explaining the operation of the twelfth embodiment of the present invention.

In the operation of the twelfth embodiment, FIG. 23 shows waveforms of signals appearing in the embodiment. First of all, the switching element Q1 is in the ON state while the switching elements Q2, . . . and Q5 are in the OFF state. When the reference voltage e1 exceeds Vs/5, the output of the comparator CMP2 has a high level. The high-level output of the comparator CMP2 causes the flip-flops FF to turn OFF the switching element Q1 and to turn ON the switching element Q2. When the reference voltage e2 is switched to 2Vs/5, the output of the comparator CMP2 again has a low level; whereas, when the reference voltage e1 exceeds 2Vs/5, the comparator output again has a high level. In this way, such switching is sequentially carried out to 5Vs/5 so that, each time the reference voltage e1 exceeds the reference voltage e2, the comparator CMP2 issues a high-level output. When the reference voltage e1 exceeds Vs, the comparator CMP1 counts the moment that the reference voltage e1 becomes smaller than the reference voltage e2. The counter CT for counting rectangular waves received from the comparators CMP1 and CMP2 has such output waveforms as shown in FIG. 23. The respective control circuits CX of the switched capacitor circuit, when receiving the outputs from the counter CT, control the respective switching elements to obtain an output voltage Vz. This control enables the output waveform to approach more closely to a sinusoidal wave than the switching of the stages at intervals of an equal time. This method enables noise in the output waveform to be reduced.

Figure 24:
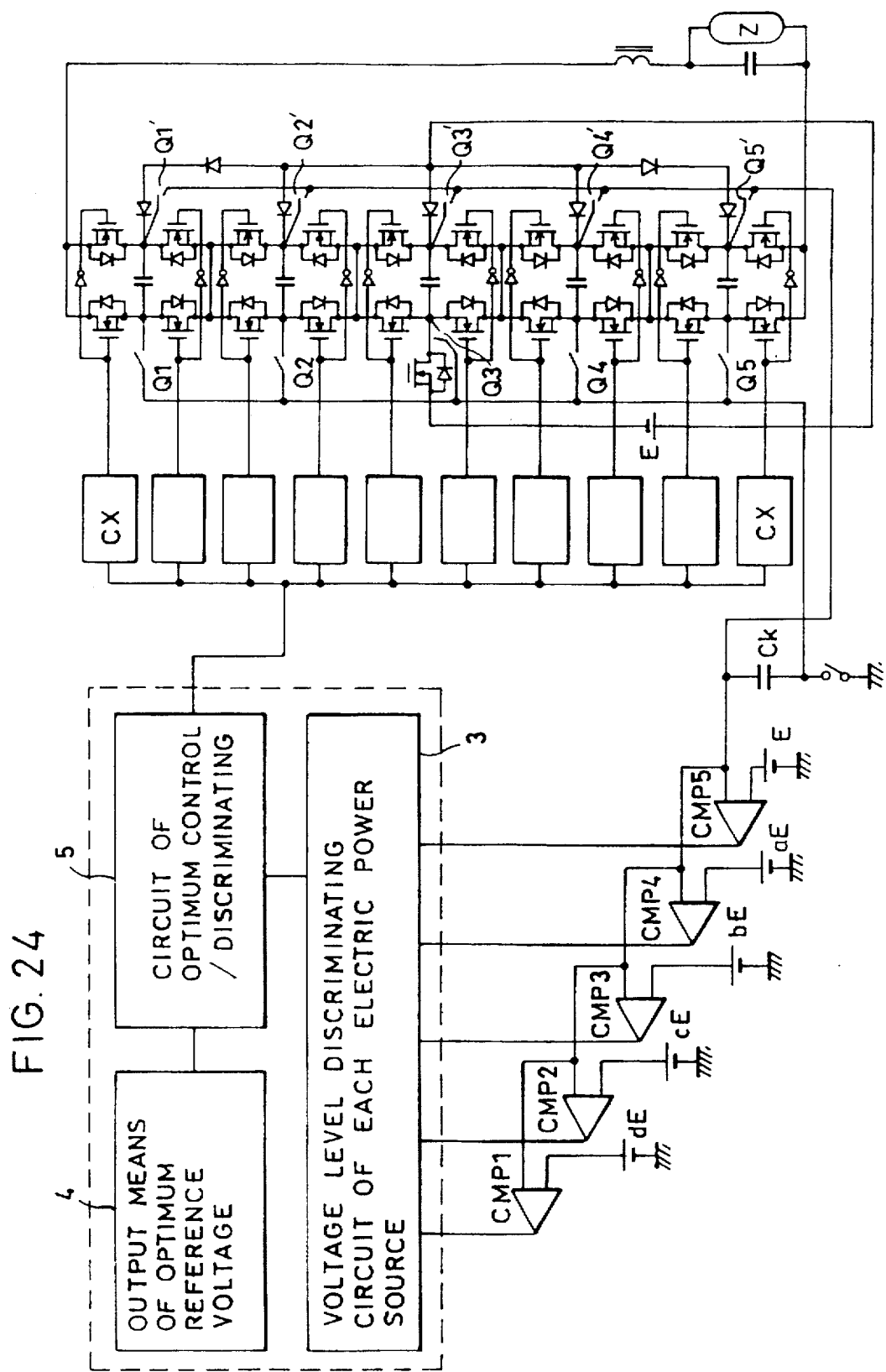
FIG. 24 is a circuit diagram of a thirteenth embodiment of the present invention.
Figure 25:
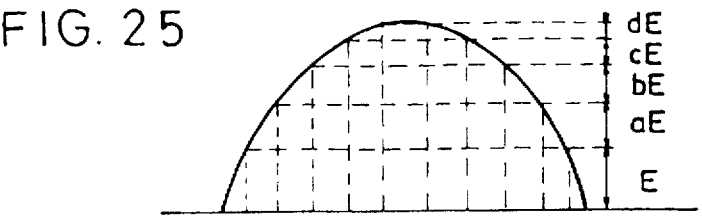
FIGS. 25 and 26 are diagrams for explaining the operation of the thirteenth embodiment of the present invention.

A thirteenth embodiment of the present invention is shown in FIG. 24. The present embodiment, unlike the twelfth embodiment, is arranged so that division of a time corresponding to one period is equally carried out (switching of the stage switches is carried out at intervals of an identical time, the respective voltage outputs are adjusted as shown in FIG. 25, whereby the output waveform of the switched capacitor circuit approaches to a sinusoidal wave. In FIG. 25, voltages represented by intersections of the output waveform with the sinusoidal wave when the sinusoidal wave is divided by equal times are denoted by E, aE, bE, cE and dE respectively. That is, the output waveform is made to approach to the sinusoidal wave by adjusting the voltage values of the respective capacitors. This twelfth embodiment is possible even when the capacitors of the switched capacitor circuit have such a value as not to cause an abrupt voltage change. In the present embodiment, however, for the purpose of basically charging the switched capacitor circuit with an equal voltage E, the capacitors are set to have such a small capacitance value as to provide a voltage change in order to cause the voltage value of the capacitors to vary.

Figure 26:
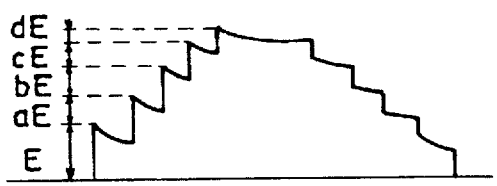

In the operation of the thirteenth embodiment, such switching elements Q1, Q1', . . . , Q5 and Q5' as shown in FIG. 24 are sequentially turned ON to sequentially charge the capacitors C1, . . . and C5. Then a voltage across a capacitor Ck is sequentially compared with the reference voltages E, . . . and dE by the comparators CMP1, . . . and CMP5 so that a source voltage level judgement circuit 3 always judges the voltage levels of the respective capacitors in the switched capacitor circuit. Meanwhile, an optimum reference voltage output circuit 4 outputs one of these voltages closest to a sinusoidal wave at that time. An optimum control judgement circuit 5 compares an output of the optimum reference voltage output circuit 4 with an output of the voltage level judgement circuit 3 to select a capacitor series connection in the switched capacitor circuit such that the output becomes the optimum voltage value at that time. Since the switched capacitor circuit is used to adjust the voltage level in the present embodiment, the output waveform can be made to approach to the sinusoidal wave. The output waveform of the present embodiment is shown in FIG. 26.

Figure 27:
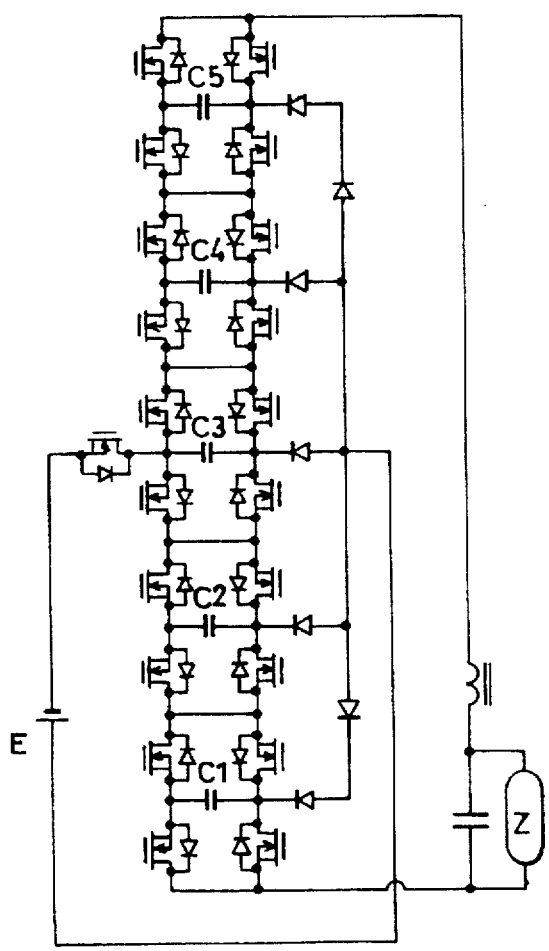
FIG. 27 is a circuit diagram of a fourteenth embodiment of the present invention.
Figure 28:
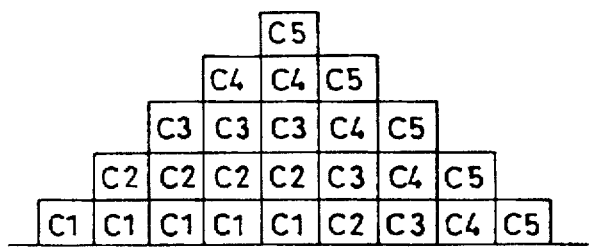
FIG. 28 is a diagram for explaining a discharging order of capacitors in the thirteenth embodiment of the present invention.
Figure 29:
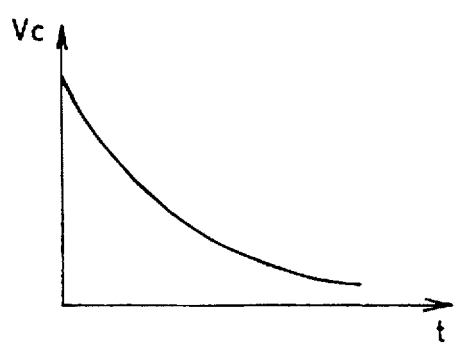
FIG. 29 is a diagram showing a variation in a voltage across a capacitor in a fourteenth embodiment of the present invention.
Figure 30:
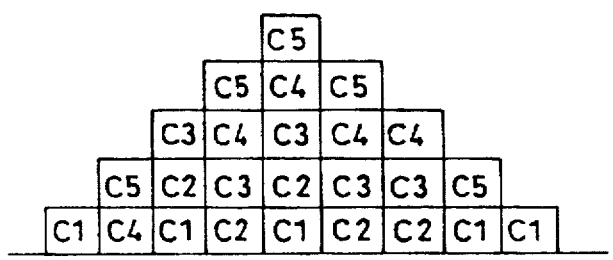
FIG. 30 is a diagram for explaining another discharging order of capacitors in the fourteenth embodiment of the present invention.

Explanation will next be made as to a fourteenth embodiment of the present invention. In the present embodiment, as in the thirteenth embodiment, the output voltage of the switched capacitor circuit is made irregular to cause the output waveform to approach to the sinusoidal wave. As shown in FIG. 27, the capacitors C1, . . . and C5 are provided in the switched capacitor circuit. Although the voltage value has been selectively output to provide always the optimum voltage in the thirteenth embodiment, such a connection order of the capacitors as to be optimum is determined for control in the present fourteenth embodiment. In the fourteenth embodiment, each capacitor is charged once for half period. In FIG. 28, each capacitor is used by the same frequency in half period and whenever the capacitors are stacked in series, the capacitors not discharged yet are added one by one. With such a structure, since the voltage across the capacitor C1 decreases as shown in FIG. 29, the voltage is decreased little by little as shown in FIG. 26 as the number of series connections increases. In the case where the voltage increases in such an order as shown in FIG. 30, the capacitors not discharged yet are used when the number of series connections is small, while the capacitors already discharged are used when the number of series connections is large, whereby the voltage can be approximated as such a waveform as shown in FIG. 26. That is, through this capacitor discharging order, such a waveform as shown in FIG. 26 is output.

Figure 31:
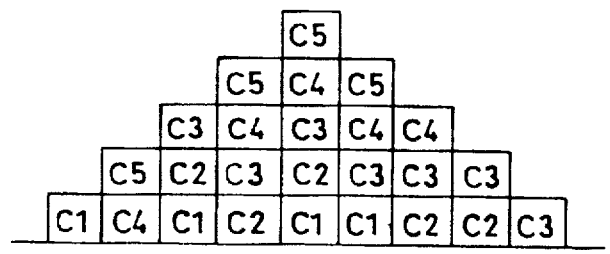
FIG. 31 is a diagram for explaining another discharging order of capacitors in the fourteenth embodiment of the present invention.

Since the switched capacitor circuit shown in FIG. 27 is charged from its central part, the capacitor C3 is charged to its maximum extent and the charged amount of the capacitor C1 or C5 is small. For the purpose of making equal the charged and discharged amounts of each capacitor, the discharging frequency of the capacitor C3 is made high and the discharging frequency of the capacitor C1 or C5 is made low, which discharging order is shown in FIG. 31. In this way, such discharging orders as shown in FIGS. 28, 30 and 31 enable approximation of the output waveform to the sinusoidal waveform.

Figure 33:
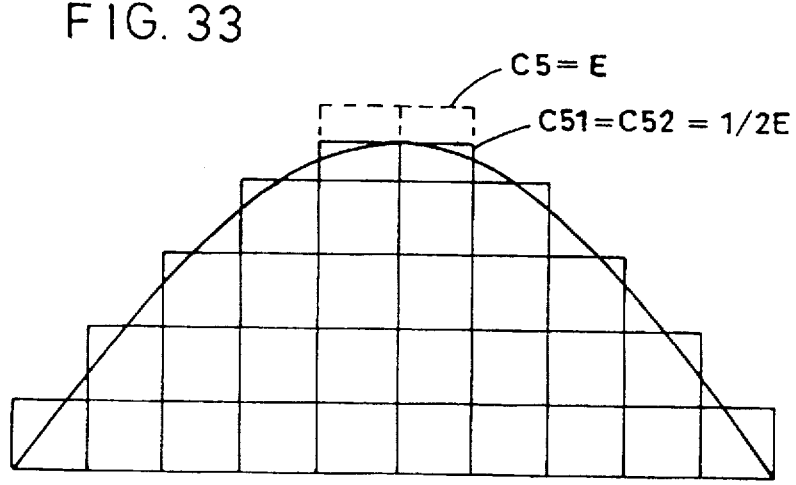
FIG. 33 is a diagram for explaining the operation of the fifteenth embodiment of the present invention.
Figure 32:
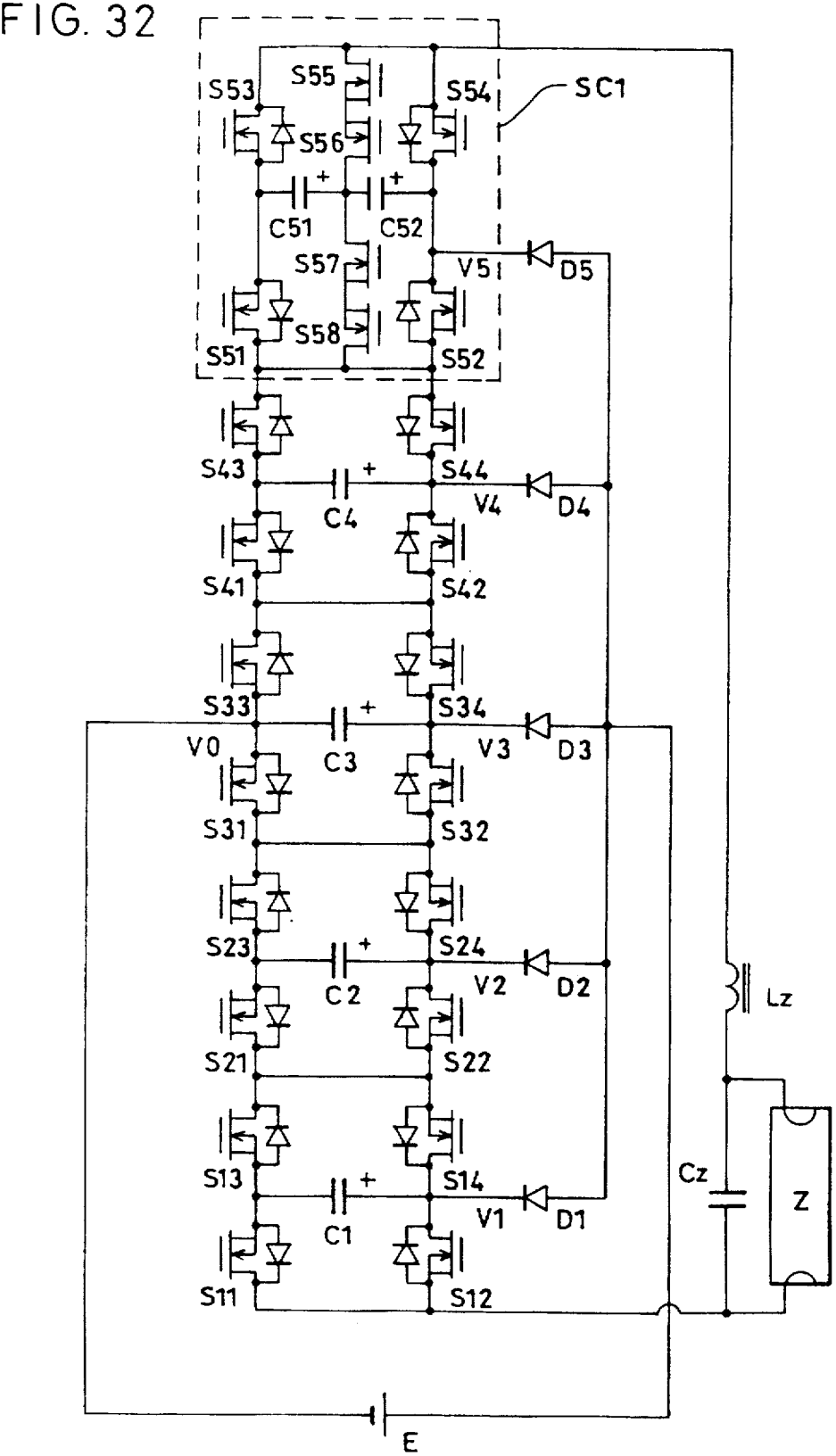
FIG. 32 is a circuit diagram of a fifteenth embodiment of the present invention.
Figure 34A:
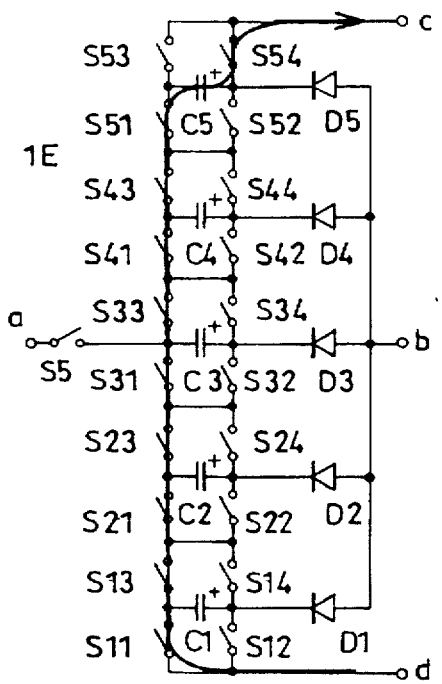
FIGS. 34A–34D, 35A–35D, 36A–36D, 37A–37D, and 38A–38D are diagrams for explaining load current paths in a sixteenth embodiment of the present invention.
Figure 34B:
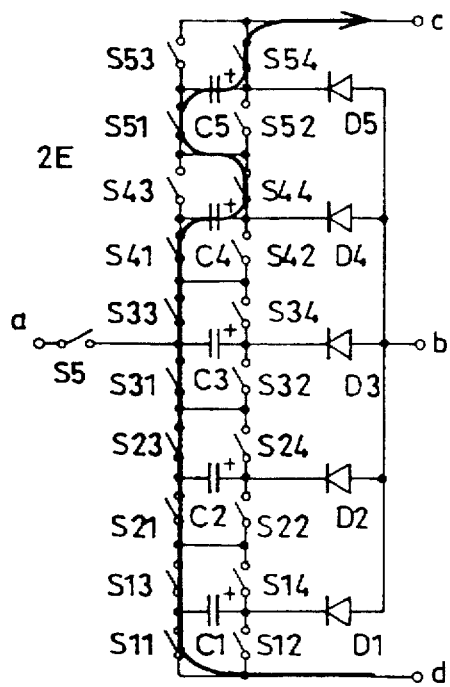
Figure 34C:
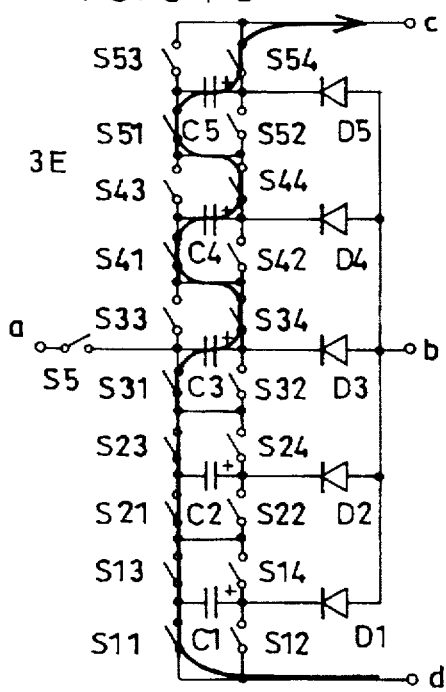
Figure 34D:
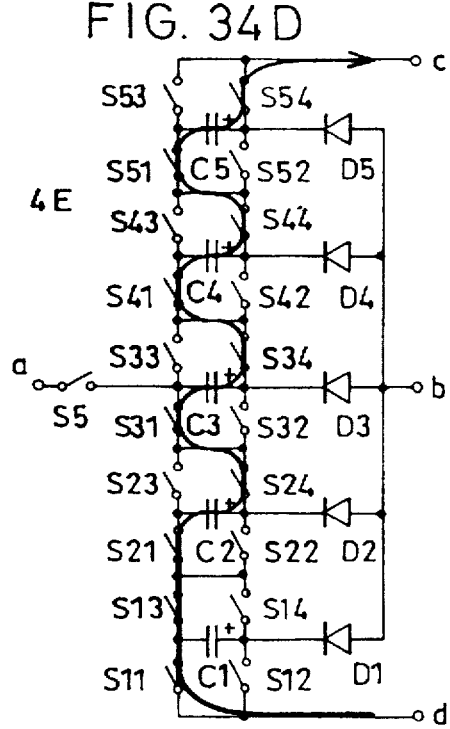
Figure 35A:
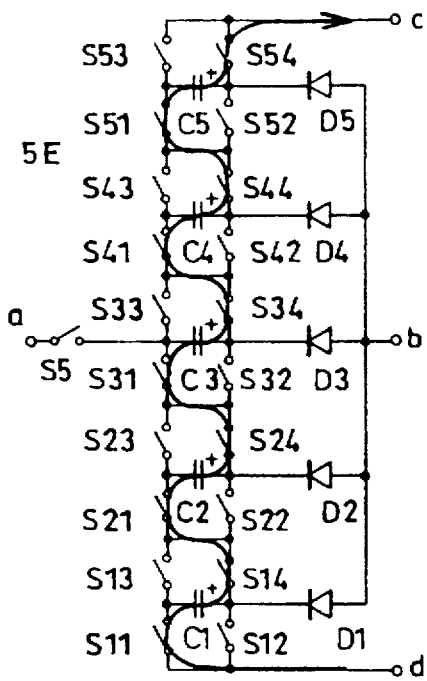
Figure 35B:
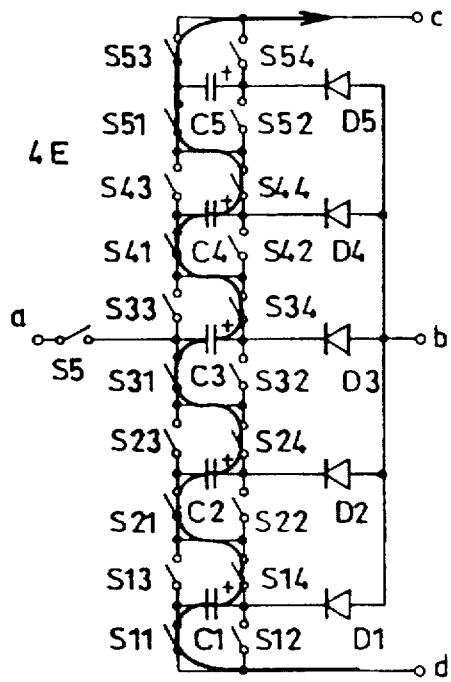
Figure 35C:
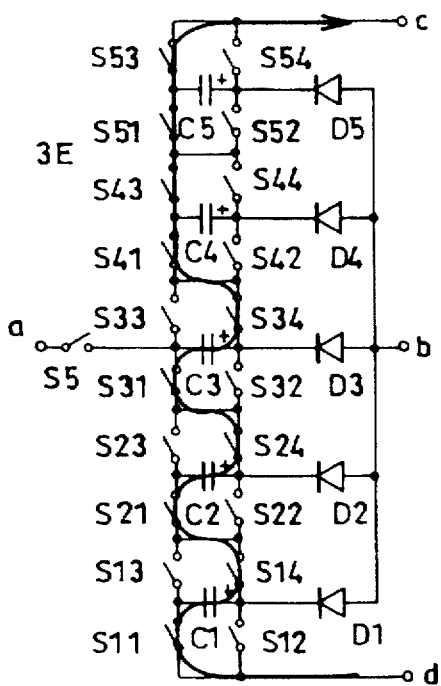
Figure 35D:
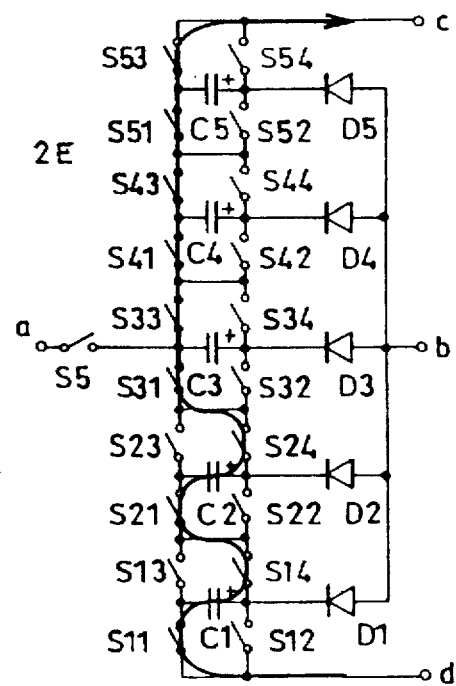
Figure 36A:
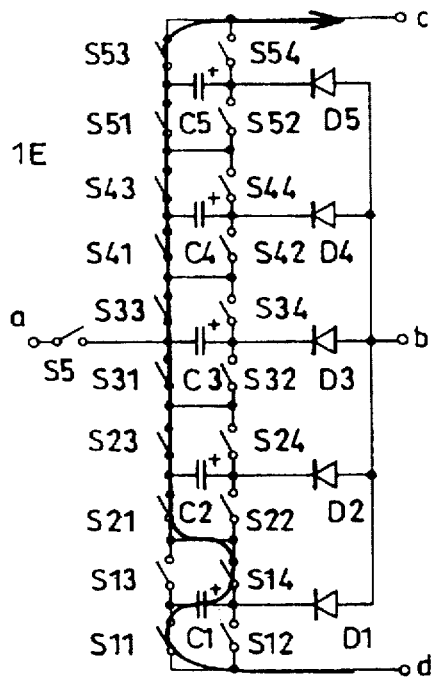
Figure 36B:
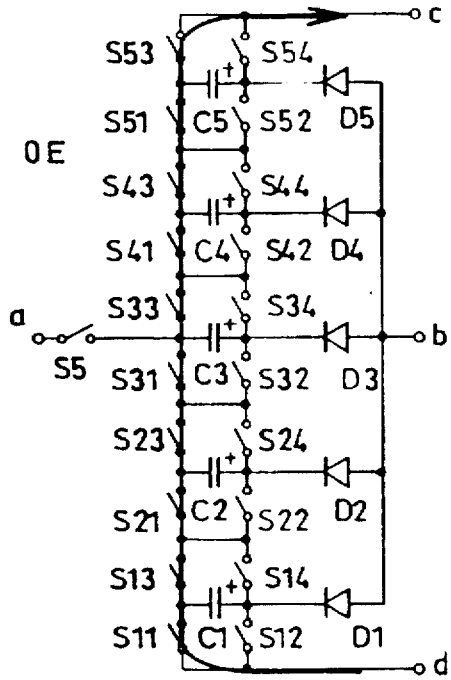
Figure 36C:
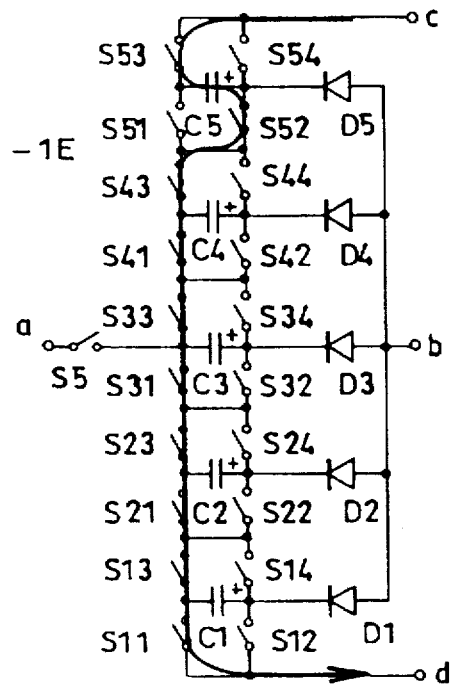
Figure 36D:
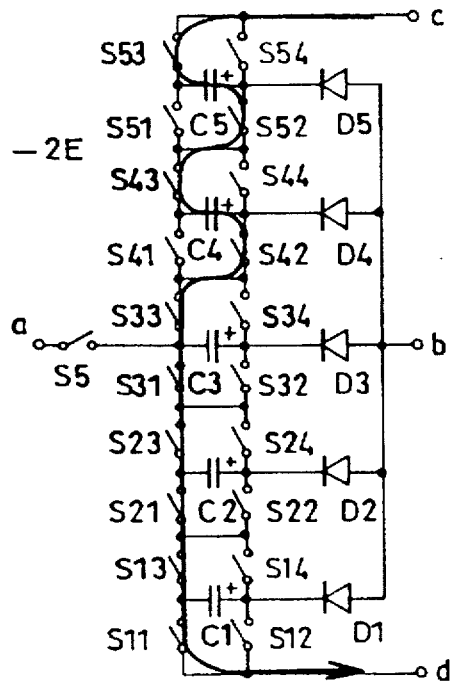
Figure 37A:
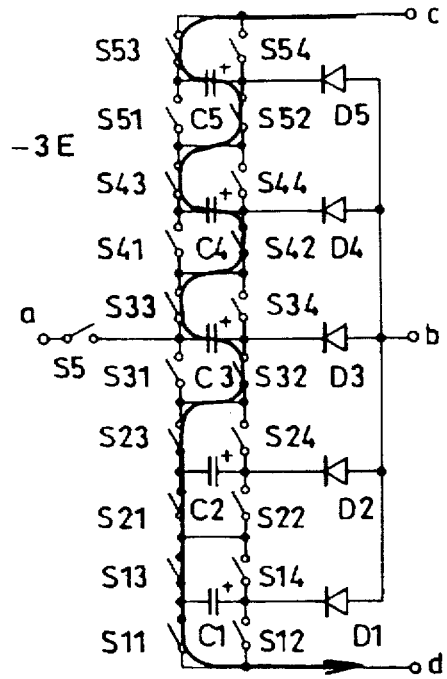
Figure 37B:
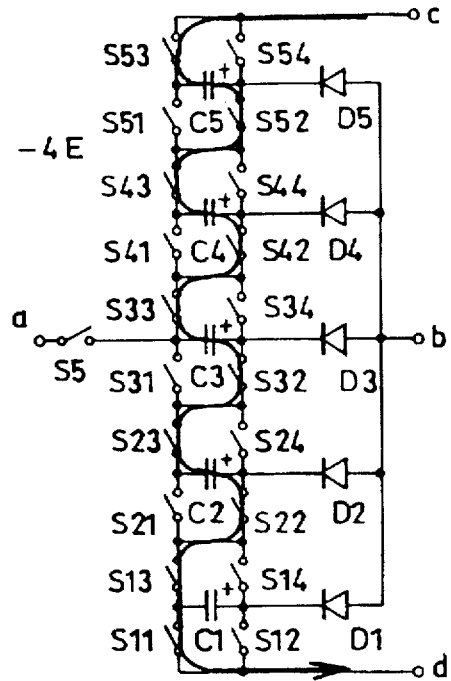
Figure 37C:
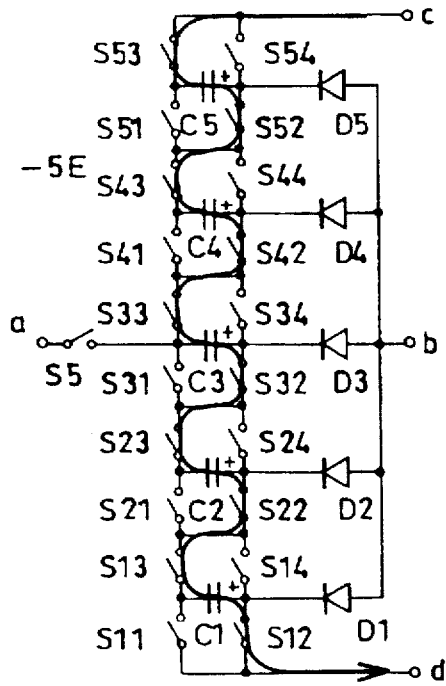
Figure 37D:
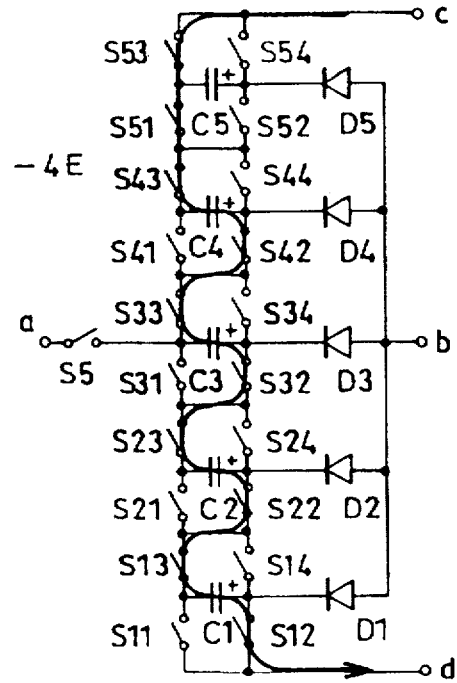
Figure 38A:
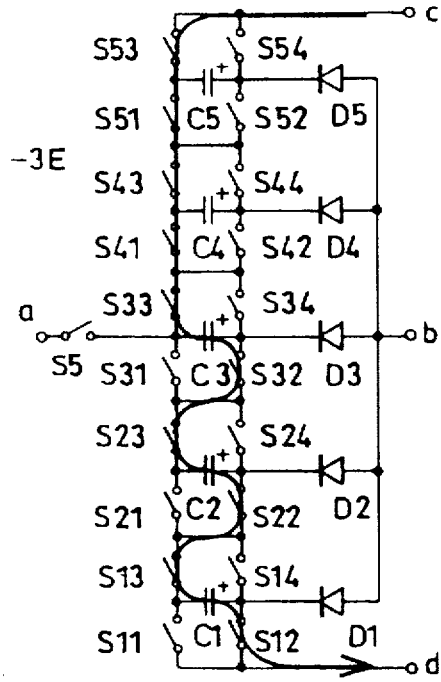
Figure 38B:
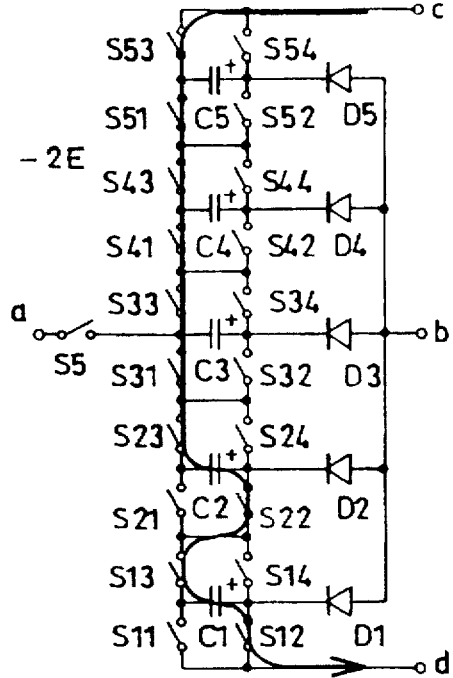
Figure 38C:
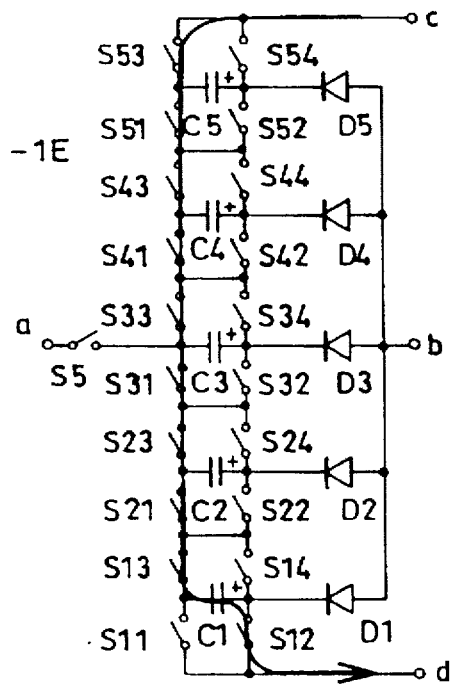
Figure 38D:
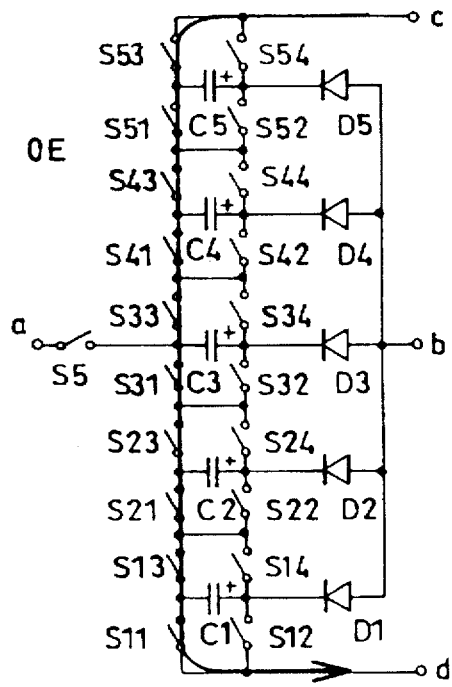

A circuit configuration of a fifteenth embodiment is shown in FIG. 32. A switched capacitor circuit SC1 in the present invention outputs a step-like voltage waveform, the voltage output waveform is waveform-shaped through a filter circuit of the inductor Lz and capacitor Cz and then applied to a load as a nearly sinusoidal waveform. In this connection, as the step-like output voltage waveform of the switched capacitor circuit SC1 is made to approach to the sinusoidal waveform, the values of the inductor Lz and capacitor Cz of the filter circuit can be made small. The sinusoidal voltage waveform has a shape feature that its voltage gradient is large in the vicinity of zero and is small in the vicinity of its maximum level. For this reason, in the present embodiment, the amplitude of the voltage corresponding to one step is made small in the vicinity of a peak value in such a step-like output waveform as shown in FIG. 33, whereby a voltage having a nearly-sinusoidal waveform can be supplied to the load.

As shown in FIG. 32, more in detail, the capacitor cells forming the full-wave bridge circuits in the foregoing embodiments are replaced by the switched capacitor circuit SC1 including the switching elements S51, S52, S53, S54, S55, S56, S57, S58, and capacitors C51 and C52. The capacitors C51 and C52 are connected in series in a charge mode to be charged each to E/2. In a discharge mode near to the peak value of the sinusoidal waveform, the switching elements S52 and S54 are turned OFF to cut off the switching element S52, the full-wave bridge circuits of the switching elements S51, S53, s55, S56, S57 and S58 are connected in series to connect the capacitors C1 to C4 and capacitor C51 in series, thereby supplying a voltage 4.5E to the load. In place of turning OFF the switching elements S52 and S54 to cut off the capacitor C52, when the switching elements S51 and S53 are turned OFF to use the full-wave bridge circuits of the capacitor C52 and switching elements S52, S54, S55, S56, S57 and S58, the capacitors C51 and C52 may be alternately used.

The capacitor having the voltage of 0.5E is used at the time of application of the maximum voltage as has been mentioned above, the voltage 4.5E can be applied to the load in the vicinity of its peak, the step-like waveform can be made to approach to the sinusoidal waveform, and a nearly-sinusoidal waveform voltage can be supplied to the load with small filtering circuits.

Figure 39:
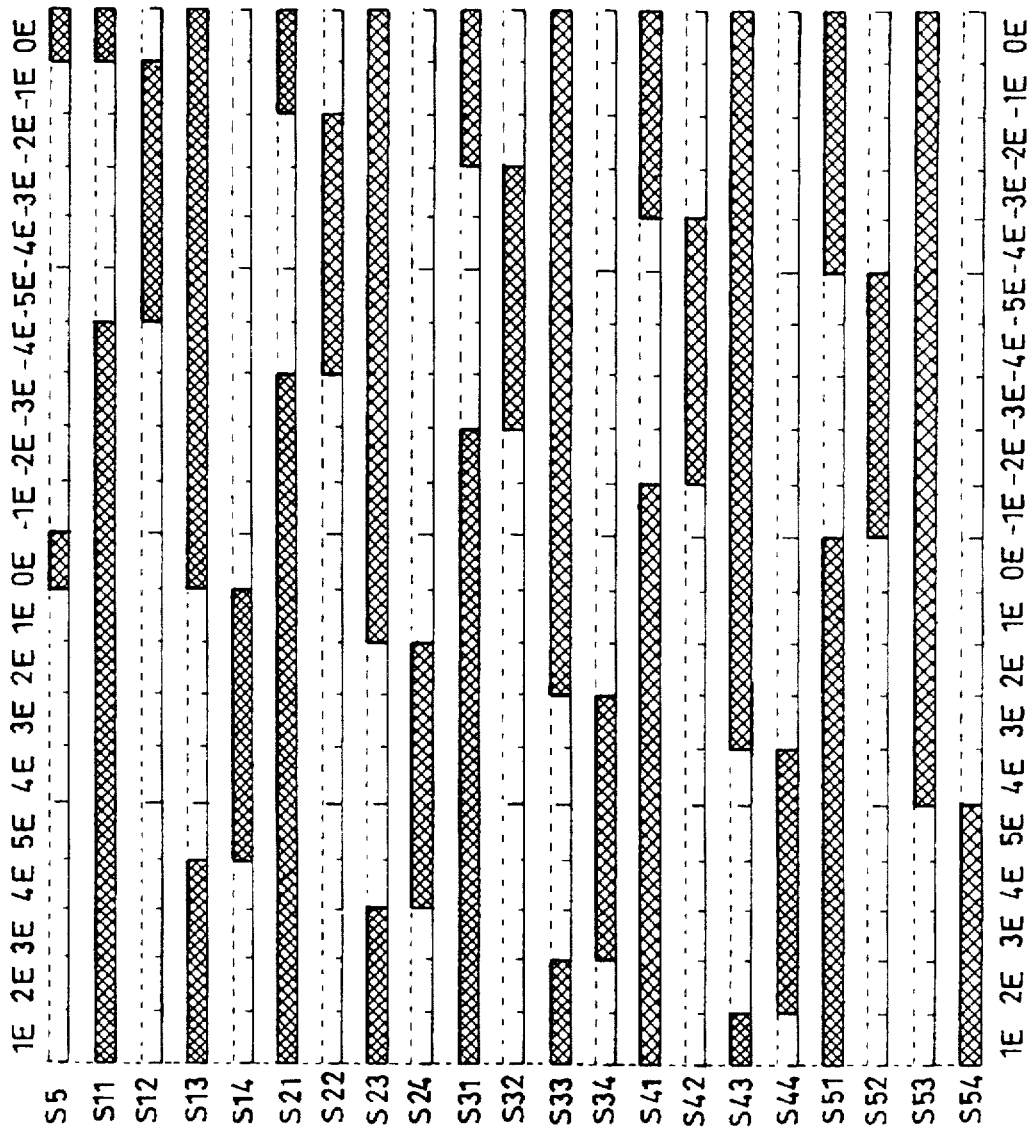
FIG. 39 is a diagram for explaining the operation of the sixteenth embodiment of the present invention.
Figure 40:
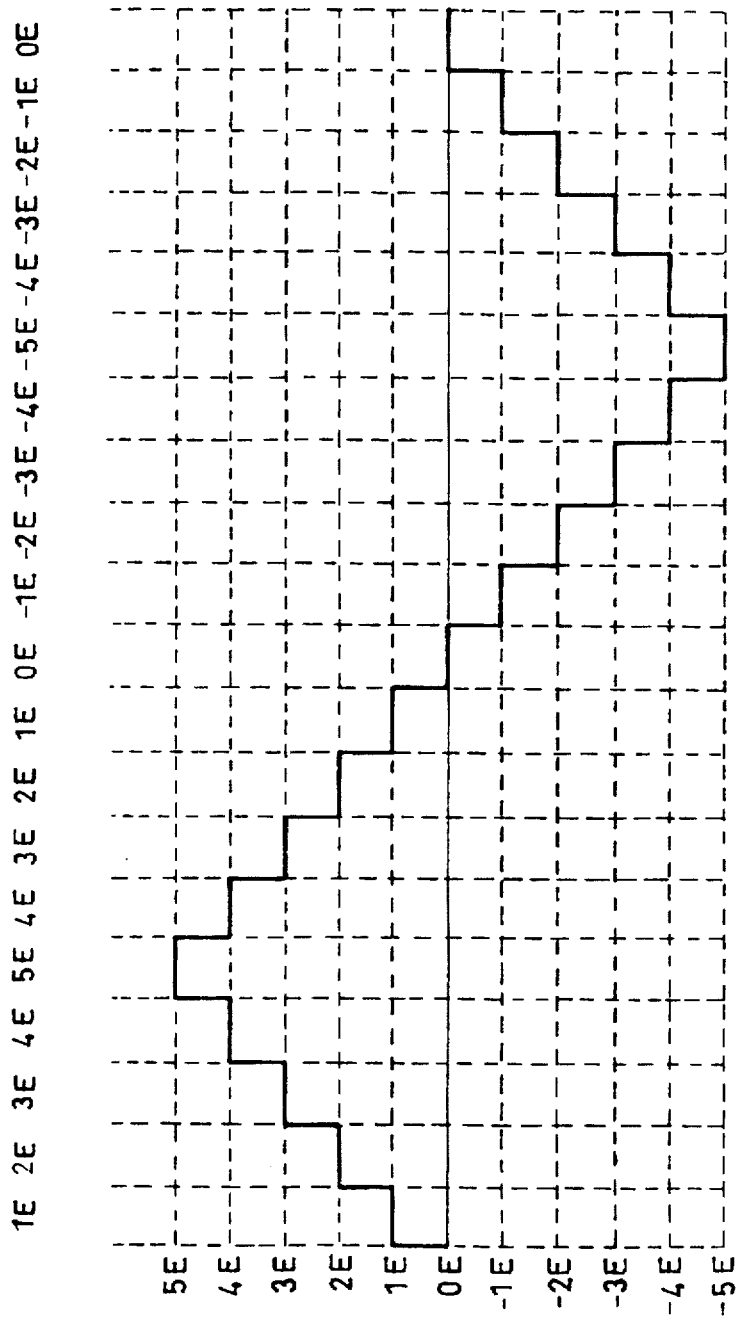
FIG. 40 shows a waveform of an output voltage of the sixteenth embodiment of the present invention.

Next, explanation will be made as to a sixteenth embodiment. The present embodiment is directed to how to control connection and charging of the respective capacitors to the load. The present embodiment has substantially the same configuration as the second embodiment of FIG. 7. More specifically, load current paths in the switched capacitor circuit SC are shown in FIGS. 34 to 38, input signals to the respective switching elements are shown in FIG. 39, and an output voltage waveform of the switched capacitor circuit SC is shown in FIG. 40. Capacitors to be connected to the load is shown in Table I. In the present sixteenth embodiment, the current paths in the respective circuit operational states are selected so as to pass preferably through minus sides of the capacitors, thus enabling twice charging operation of each capacitor during one period.

In the operation of the sixteenth embodiment, as shown in Table I below, the capacitors are sequentially connected in series in order one by one, starting with the capacitor C5 and ending in the capacitor C1, a step-like voltage waveform of +E, +2E, +3E, +4E and +5E is output. Thereafter, one capacitor is sequentially cut off from the series circuit of the capacitors C1 to C5 and load part on a one-by-one basis starting with the capacitor C5 and ending in the capacitor C1, thus stepwise lowering the voltage to +4E, +3E, +2E, +E and 0. After this, the respective switching elements are operated so as to invert the polarities of the capacitors, one capacitor is sequentially connected to the load part one by one, starting with the capacitor C5 and ending in the capacitor C1, whereby the voltages of -E, -2E, -3E, -4E and -5E are applied to the load part. Thereafter, one capacitor is cut off one by one from the series circuit of the capacitors C5 to C1 and load part, starting with the capacitor C1 and ending in the capacitor C5, which results in that the output voltage is subtracted sequentially by E down to zero. The above operation is repeated so that the step-like A.C. voltage is continuously supplied to the load part, subjected to a filtering operation by the filter circuit of the inductor Lz and capacitor Cz, and then supplied to the load Z in the form of a nearly-sinusoidal waveform.

TABLE I

|    | 1E | 2E | 3E | 4E | 5E | 4E | 3E | 2E | 1E | 0E | -1E | -2E | -3E | -4E | -5E | -4E | -3E | -2E | -1E | 0E |
|----|----|----|----|----|----|----|----|----|----|----|-----|-----|-----|-----|-----|-----|-----|-----|-----|----|
| C5 | o  | o  | o  | o  | o  |    |    |    |    |    | o   | o   | o   | o   | o   |     |     |     |     |    |
| C4 |    | o  | o  | o  | o  | o  |    |    |    |    |     | o   | o   | o   | o   | o   |     |     |     |    |
| C3 |    |    | o  | o  | o  | o  | o  |    |    |    |     |     | o   | o   | o   | o   | o   |     |     |    |
| C2 |    |    |    | o  | o  | o  | o  | o  |    |    |     |     |     | o   | o   | o   | o   | o   |     |    |
| C1 |    |    |    |    | o  | o  | o  | o  | o  |    |     |     |     |     | o   | o   | o   | o   | o   |    |

In the sixteenth embodiment, as shown in FIGS. 34 to 38 by load current path circuits, the switching elements are controlled so that the current paths in the respective circuit operational states pass through the minus sides of the capacitors, whereby each capacitor can be charged twice (a state 0E in FIG. 36 and a state 0E in FIG. 38) during one period of the load output. In the control method of the present embodiment, since each capacitor is charged once in ½ period, a voltage drop across each capacitor can be made small and the breakdown current of the switching element for control of charging operation can be made small.

Figure 41:
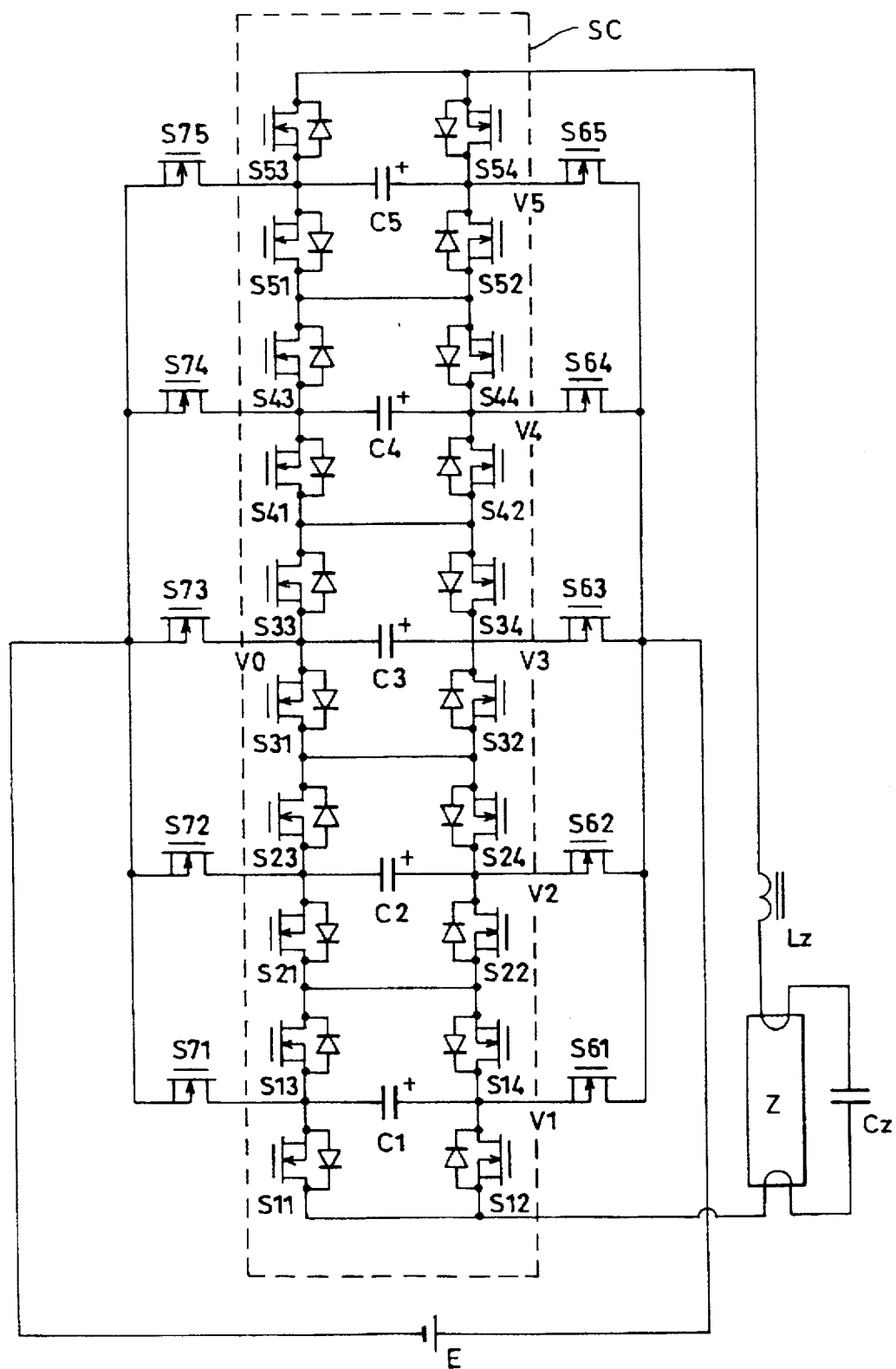
FIG. 41 is a circuit diagram of a seventeenth embodiment of the present invention.

Shown in FIG. 41 is a circuit diagram of a seventeenth embodiment which is designed to improve the charging timing of the capacitors restricted by the output operation of the switched capacitor circuit SC. In the circuit configuration of the present embodiment, switching elements S6n and S7n (n=1, ... and 5) are connected in series with capacitors Cn in the power converter circuit (switched capacitor circuit SC) to form series circuits, between both ends of which the D.C. power source E is connected. Therefore, when the switching elements S6n and S7n (n=1, ... and 5) are turned ON, any of the capacitors Cn (n=1, ... and 5) not connected to the load is charged with the D.C. power source E at a given time.

Figure 42:
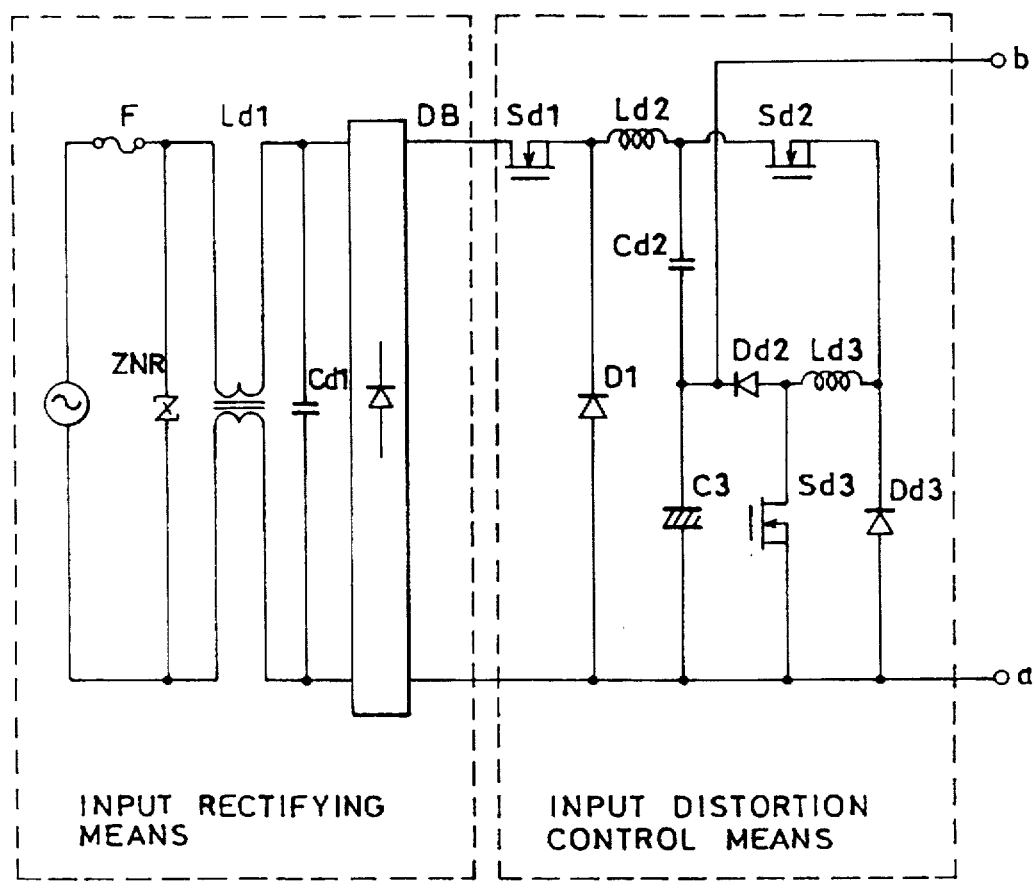
FIG. 42 is a circuit diagram of a power input part in an eighteenth embodiment of the present invention.
Figure 43:
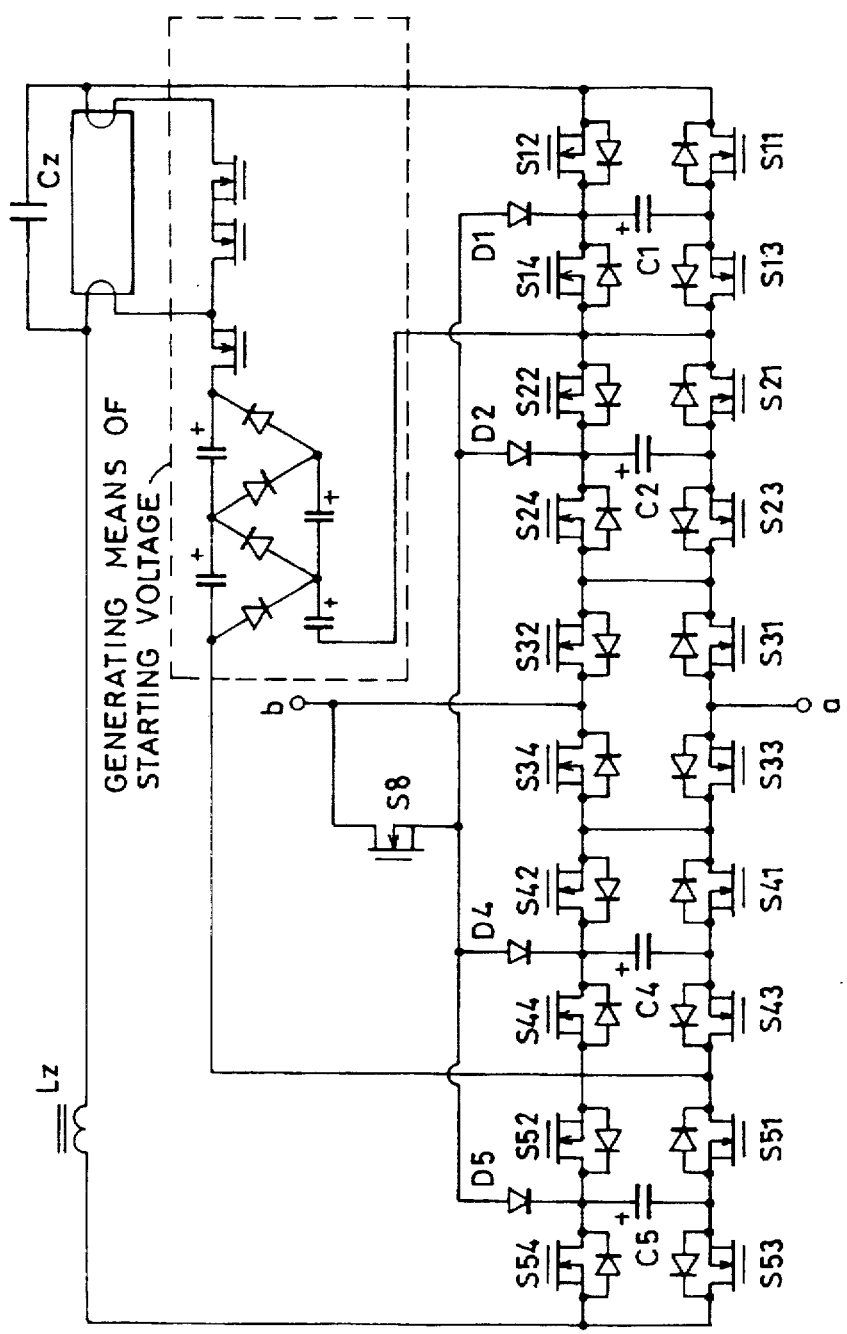
FIG. 43 is a circuit diagram of a discharge-lamp lighting circuit in the eighteenth embodiment of the present invention.

Next shown in FIGS. 42 and 43 is a circuit diagram of an eighteenth embodiment wherein terminals a and b in the both drawings are connected each other. In the present embodiment, the capacitor C3 in the switched capacitor circuit in FIG. 41 and the capacitor in an input distortion control means in FIG. 42 are commonly used. The charging operation of the capacitors C1, C2, C4 and C5 within the switched capacitor circuit, as in the sixteenth embodiment, is carried out through the capacitor C3 and switching element S8 when the capacitors are connected at their minus sides to the grounding side of the D.C. power source E. As a result, any capacitors in the input distortion control means and in the power converter circuit can be commonly used, thus enabling reduction of the number of necessary parts.

Explanation will next be made as to an nineteenth embodiment. The present embodiment is designed to always control connection of the capacitor C3 commonly used as a power supply and also as a power conversion capacitor to the load circuit during a period other than charging the other capacitors C1, C2, C4 and C5, and has substantially the same circuit configuration as the eighteenth embodiment of FIGS. 42 and 43. In this case, as shown in Table II below, the time duration of the capacitor C3 connected to the load is set to be the same as that of the capacitor C1, C2, C4 or C5. In the circuit system of the eighteenth embodiment, when the above circuit operational control is carried out, the energies used by the capacitors C1, C2, C4 and C5 are made more uniform during one period of the output, the peak values of currents flowing through the capacitors C1, C2, C4 and C5 from the capacitor C3 during the charging operation of the capacitors C1, C2, C4 and C5 are reduced, which results in that the peak value of a current flowing through the entire switched capacitor circuit during the charging operation of the capacitors C1, C2, C4 and C5 can be lowered. Further, the breakdown current of the switching element S8 can also be made small.

Figure 44A:
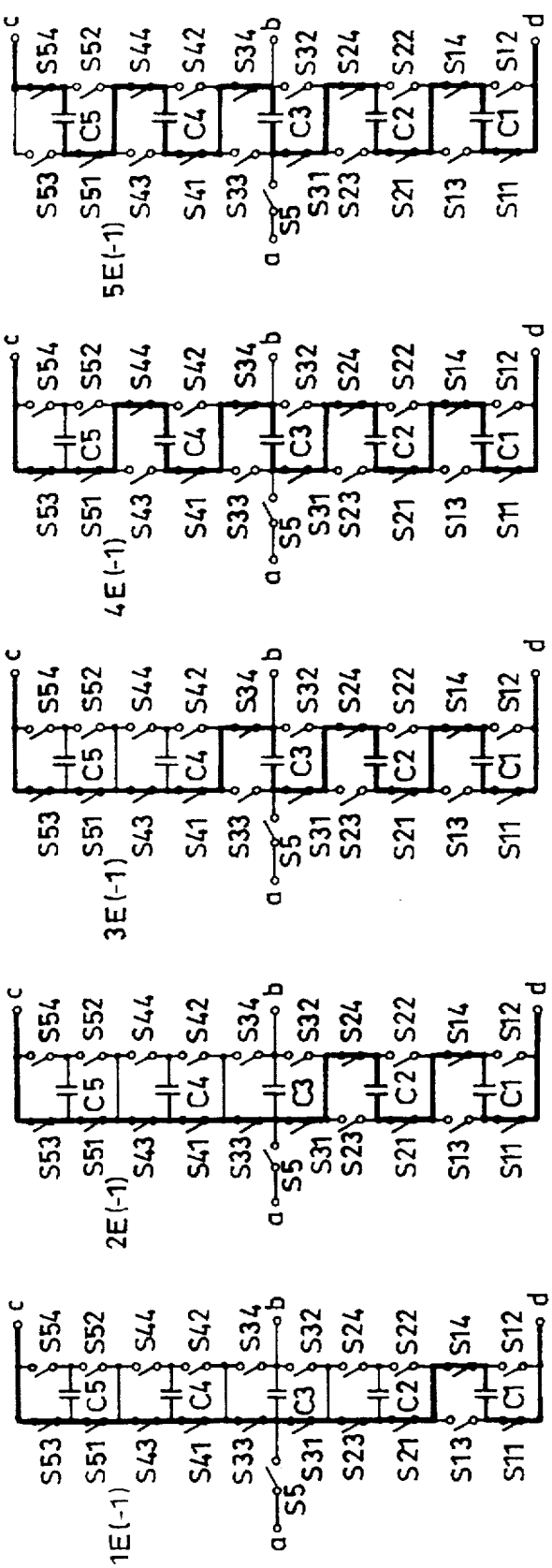
FIGS. 44A, 44B, 45A, and 45B are diagrams for explaining load current paths in a twentieth embodiment of the present invention.
Figure 44B:
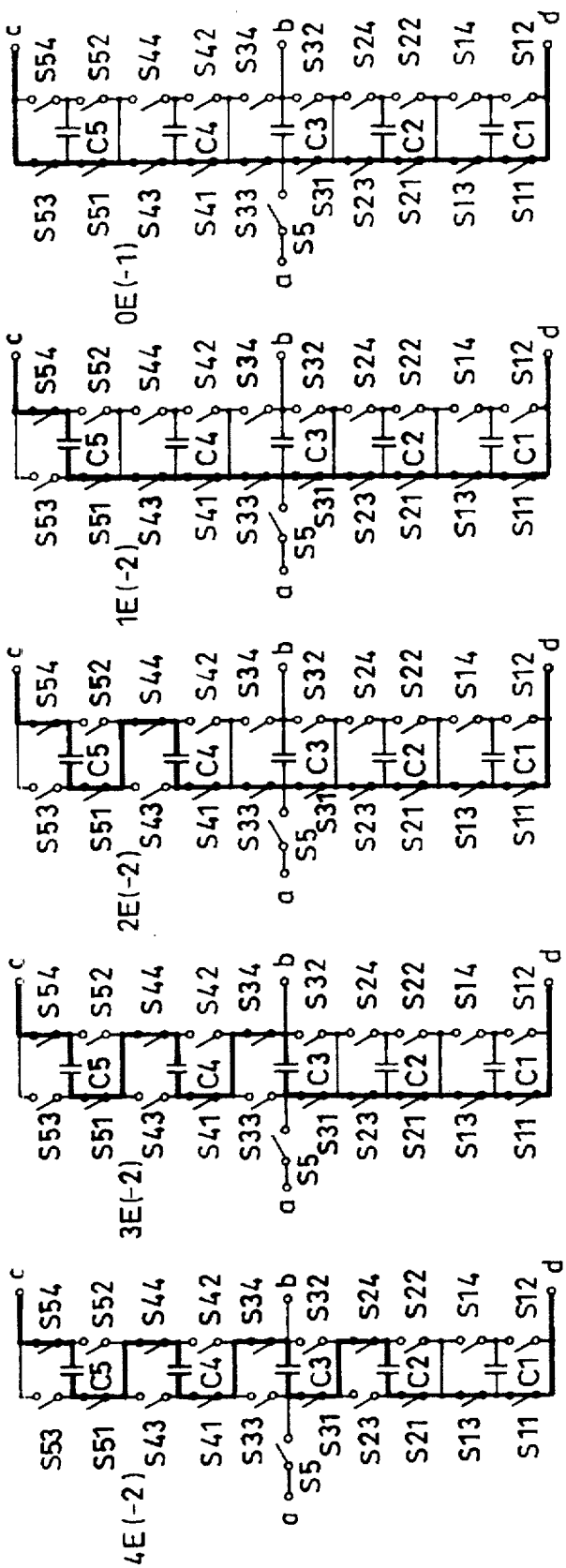

(−2) of FIG. 44B, the capacitors C1, C2, C3 and C4 are charged during the state 2E(−2) of FIG. 44B, and the capacitors C1, C2, C3, C4 and C5 are charged with the states 1E(−2) and 0E(−1) of FIG. 44B. Further, the capacitors C5, C4 and C3 are charged during the state −3E(−2) of FIG. 45B, the capacitors C5, C4, C3 and C2 are charged during the state −2E(−2) of FIG. 45B, and the capacitors C1, C2, C3, C4 and C5 are charged during the states −1E(−2) and 0E(−2) of FIG. 45B.

With such a control arrangement as mentioned above, when a single charging switch is provided and when the switching elements are turned ON in the duration wherein the grounding level of the power source is equal to the minus side of the load, the chargeable capacitors can be charged with the power source E, thus increasing the charging timing of the respective capacitors. Further, the breakdown current of the switching element S5 can be made small. Furthermore, even when the positions of the diodes D1 to D5 and power source E are symmetrically replaced by each other with respect to the power source, the arrangement of

TABLE II

|    | 1E | 2E | 3E | 4E | 5E | 4E | 3E | 2E | 1E | 0E | -1E | -2E | -3E | -4E | -5E | -4E | -3E | -2E | -1E | 0E |
|----|----|----|----|----|----|----|----|----|----|----|-----|-----|-----|-----|-----|-----|-----|-----|-----|----|
| C5 |    |    | o  | o  | o  | o  | o  |    |    |    |     |     |     | o   | o   | o   |     |     |     |    |
| C4 |    | o  | o  | o  | o  | o  | o  | o  |    |    |     |     |     |     | o   |     |     |     |     |    |
| C3 | o  | o  | o  | o  | o  | o  | o  | o  | o  |    |     | o   | o   | o   | o   | o   | o   | o   | o   |    |
| C2 |    |    |    | o  |    |    |    |    |    |    |     |     | o   | o   | o   | o   | o   | o   | o   |    |
| C1 |    | o  | o  | o  |    |    |    |    |    |    |     |     |     | o   | o   | o   | o   | o   |     |    |

Explanation will next be made as to a twentieth embodiment. The present twentieth embodiment has substantially the same circuit configuration as the second embodiment of FIG. 7. Load current paths are shown in FIG. 44A to 45B and input signals for switching elements are shown in FIG. 46. Further, capacitors to be connected to a load part are given in Table III below. There still remains in the sixteenth embodiment a problem that the chargeable duration of each capacitor is once for half period and also only duration of the capacitor not connected to the load, thus leading to the fact that the breakdown current of the switching element S5 becomes large. The present embodiment, on the other hand, is the same as the sixteenth embodiment with respect to the number of switching elements for charging of the capacitors, whereby the charging duration can be made longer than that in the sixteenth embodiment.

the twentieth embodiment can be realized. Furthermore, when the present twentieth embodiment, as in the eighteenth embodiment, uses the capacitor C3 also as a power source, the capacitors C1, C2, C4 and C5 can be charged with the capacitor C3, in place of charging the capacitors C1, C2, C3, C4 and C5 with the power source, thus providing substantially the same effect.

Figure 52:
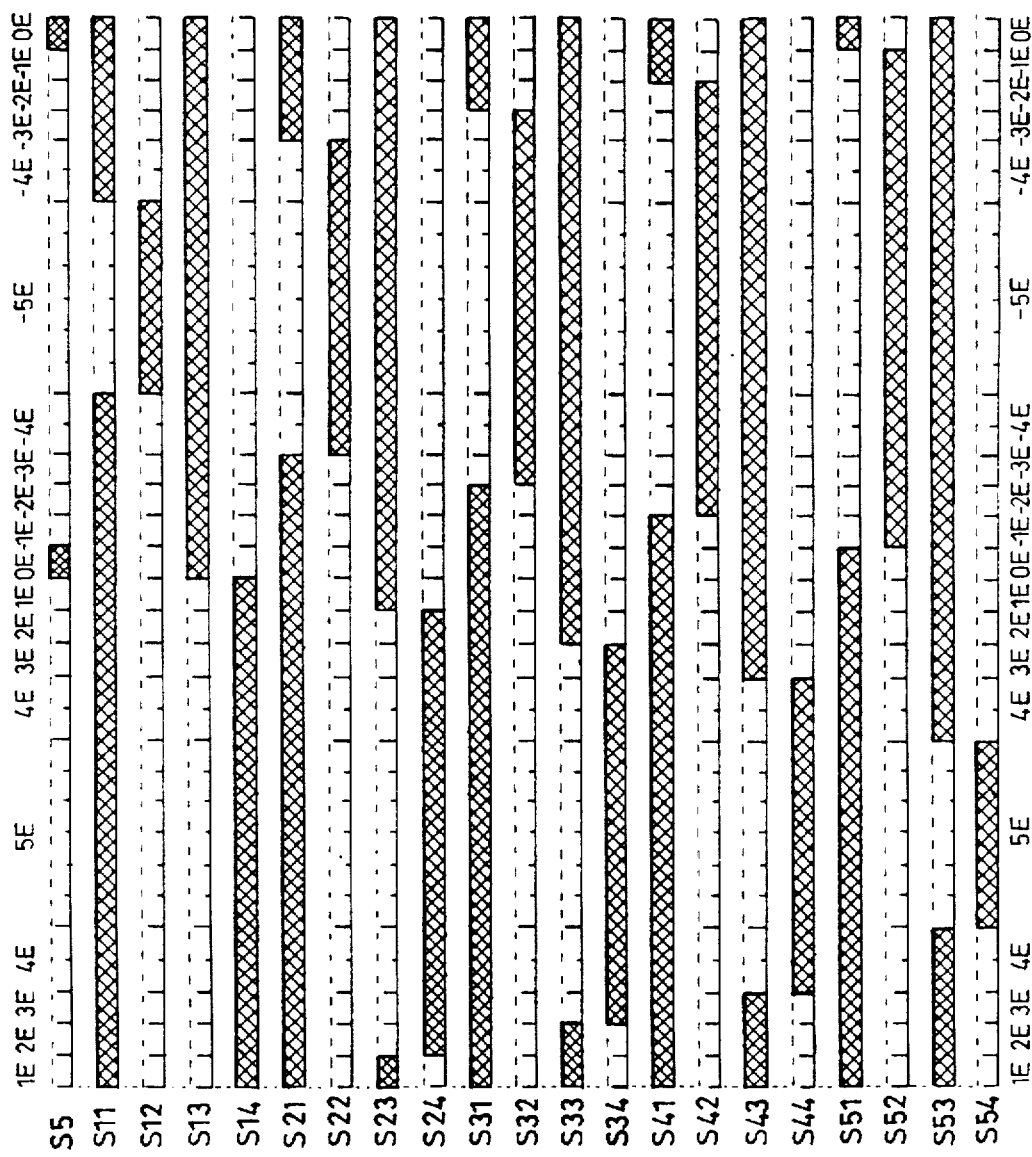
FIG. 52 are waveforms of input signals of switching elements in a twenty-first embodiment of the present invention.
Figure 53:
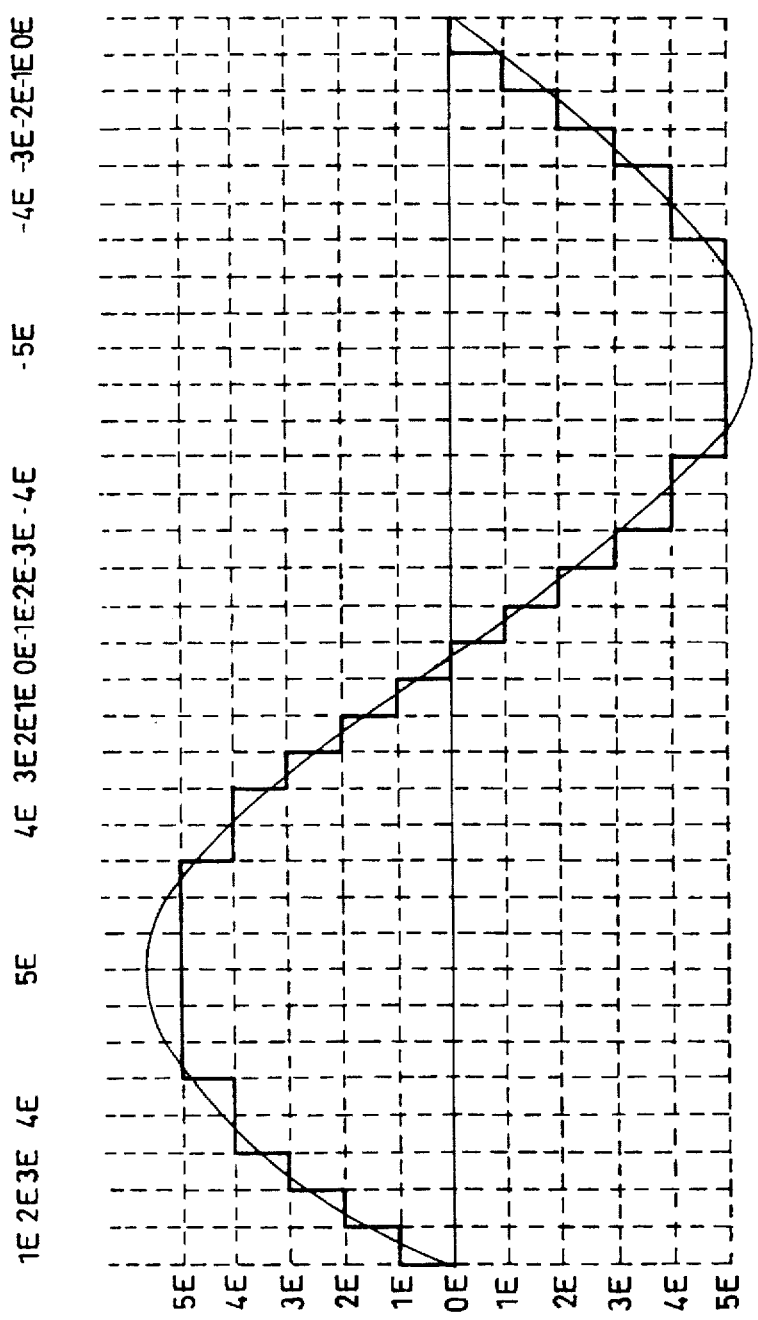
FIG. 53 is a waveform of an output voltage of the twenty-first embodiment of the present invention.

Explanation will next be made as to a twenty-first embodiment which circuit configuration is substantially the same as that of the second embodiment of FIG. 7. In the twenty-first embodiment, the operational principle of the switched capacitor circuit SC is shown in FIGS. 47 to 51, input signals of the switching elements are shown in FIG. 52, and a waveform of a voltage applied across a load is shown in FIG. 53. Capacitors connected to the load are given in Table IV below. In the present twenty-first embodiment,

TABLE III

|    | 1E | 2E | 3E | 4E | 5E | 4E | 3E | 2E | 1E | 0E | -1E | -2E | -3E | -4E | -5E | -4E | -3E | -2E | -1E | 0E |
|----|----|----|----|----|----|----|----|----|----|----|-----|-----|-----|-----|-----|-----|-----|-----|-----|----|
| C5 |    |    |    |    | o  | o  | o  | o  | o  |    | o   | o   | o   | o   | o   |     |     |     |     |    |
| C4 |    |    |    | o  | o  | o  | o  | o  |    |    |     | o   | o   | o   | o   | o   |     |     |     |    |
| C3 |    |    | o  | o  | o  | o  | o  |    |    |    |     |     | o   | o   | o   | o   | o   |     |     |    |
| C2 |    | o  | o  | o  | o  | o  |    |    |    |    |     |     |     | o   | o   | o   | o   | o   |     |    |
| C1 | o  | o  | o  | o  | o  |    |    |    |    |    |     |     |     |     | o   | o   | o   | o   | o   |    |

Figure 45A:
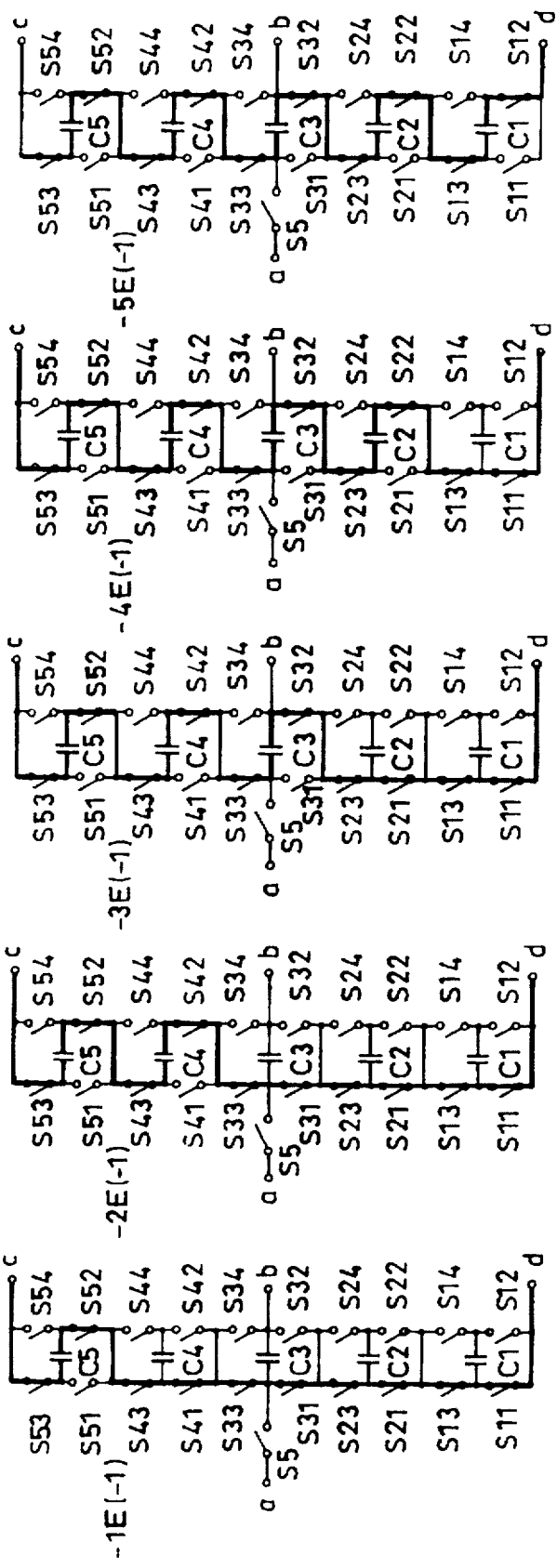
Figure 45B:
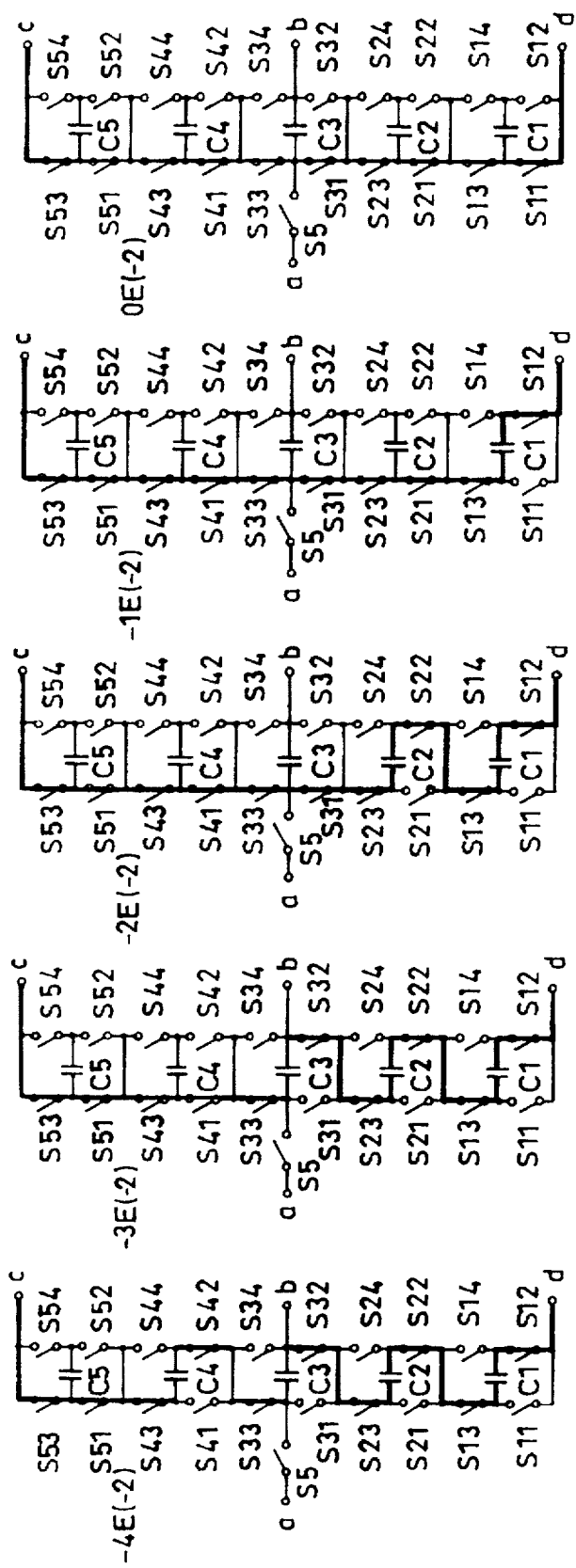
Figure 46:
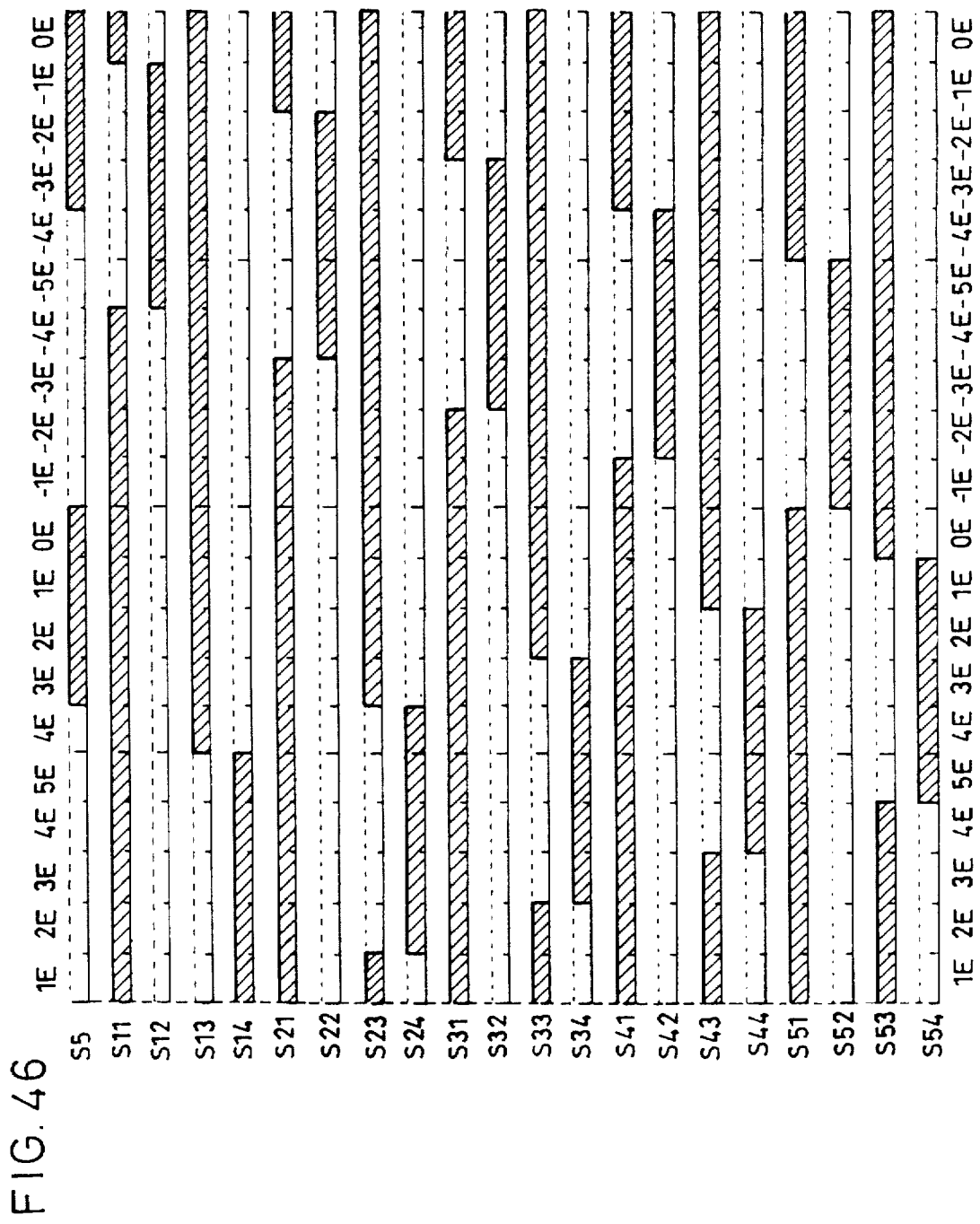
FIG. 46 shows waveforms of input signals of switching elements in a twentieth embodiment of the present invention.
Figure 47A:
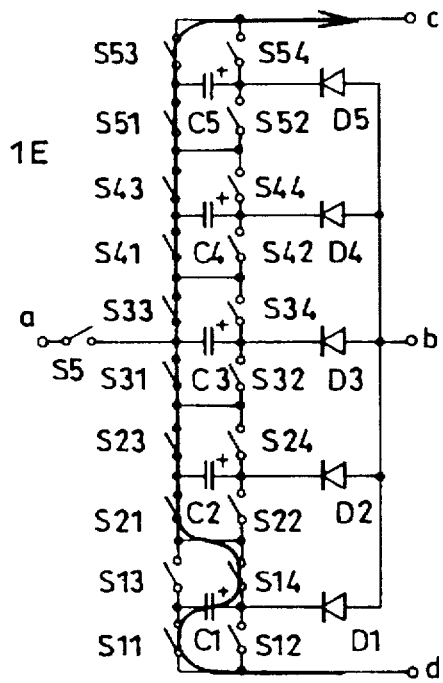
FIGS. 47A–47D, 48A–48D, 49A–49D, 50A–50D, and 51A–51D are diagrams for explaining load current paths in a twenty-first embodiment of the present invention.
Figure 47B:
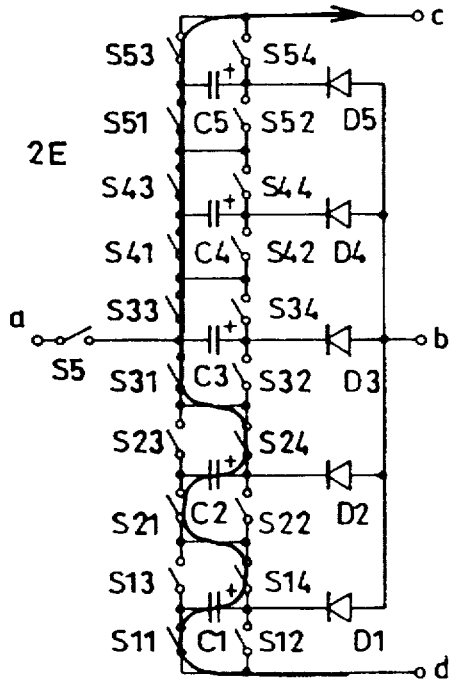
Figure 47C:
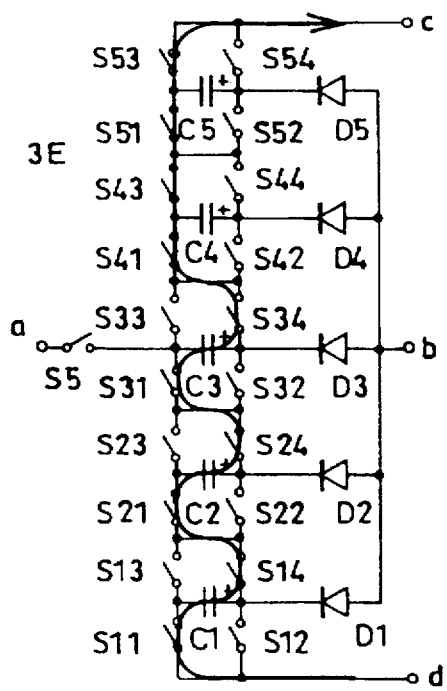
Figure 47D:
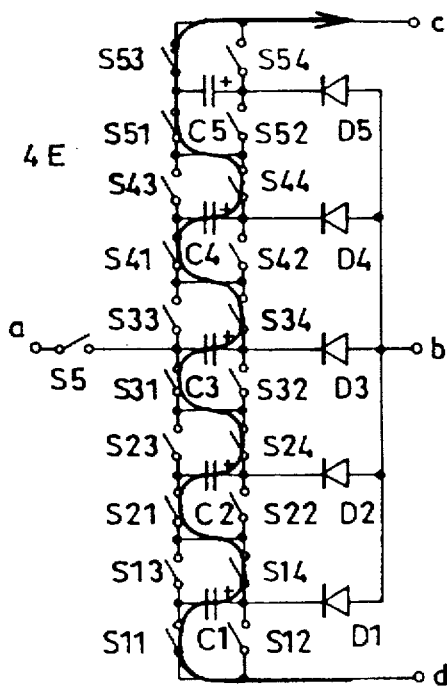
Figure 48A:
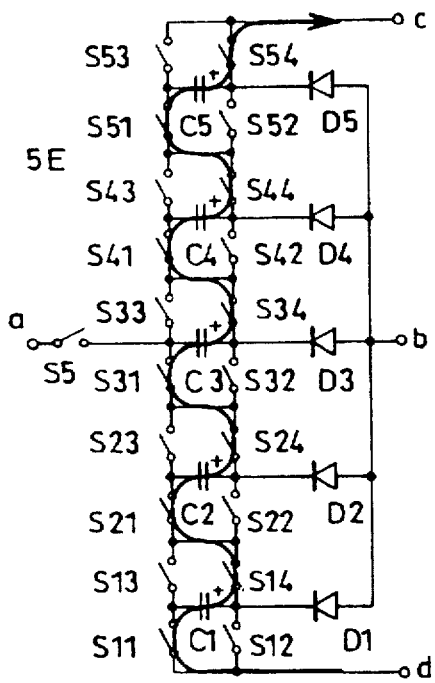
Figure 48B:
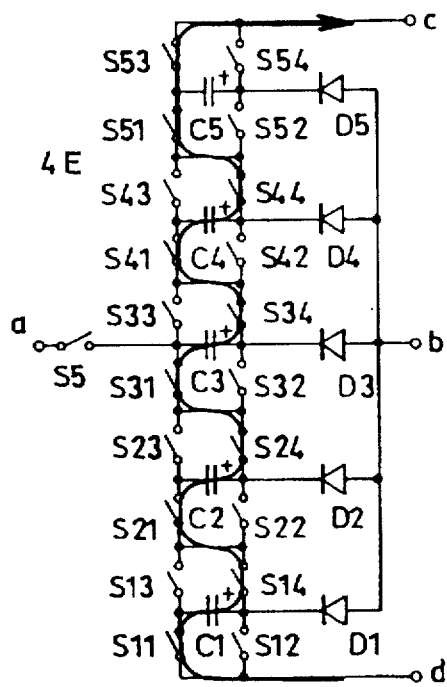
Figure 48C:
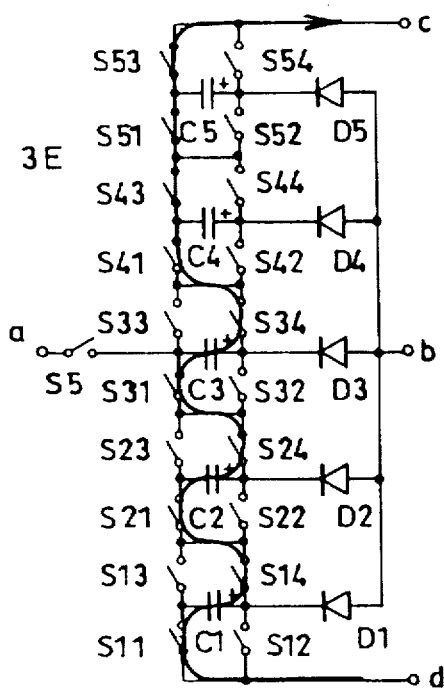
Figure 48D:
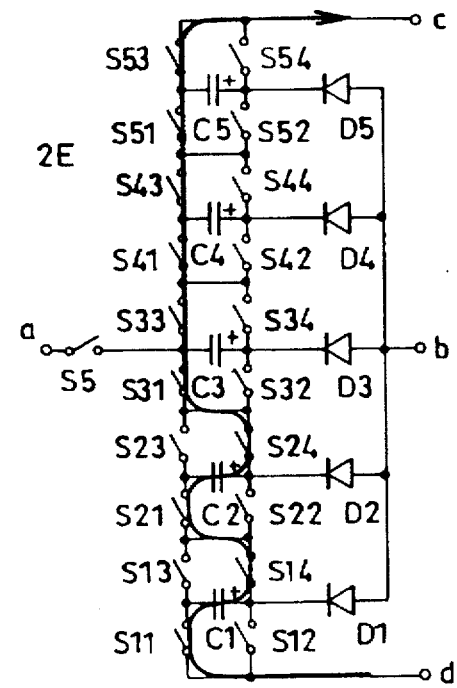
Figure 49A:
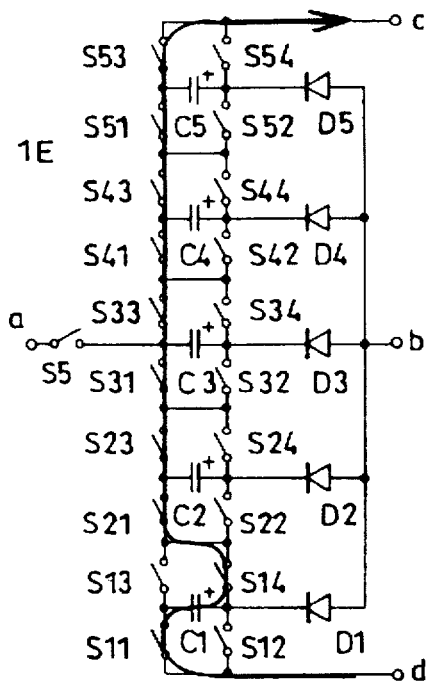
Figure 49B:
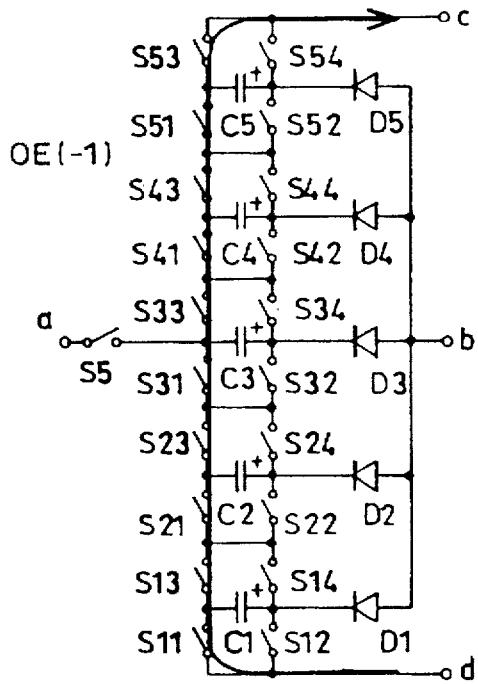
Figure 49C:
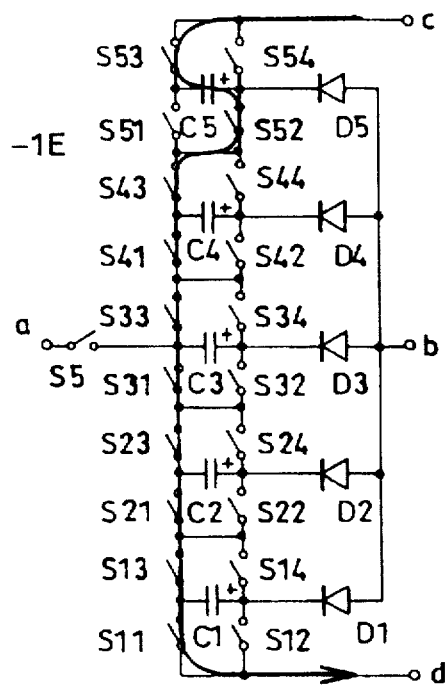
Figure 49D:
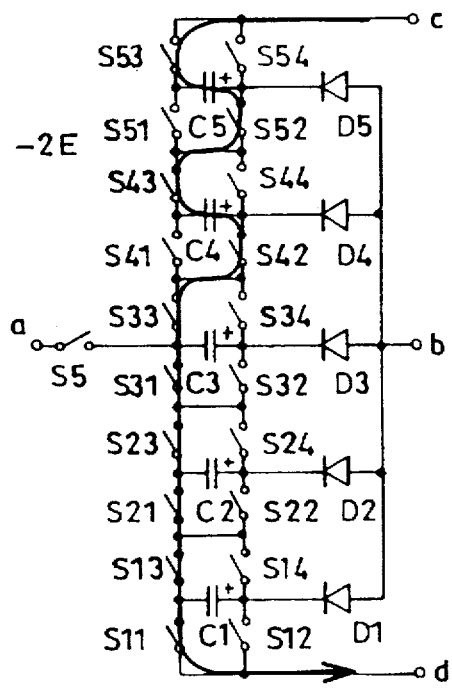
Figure 50A:
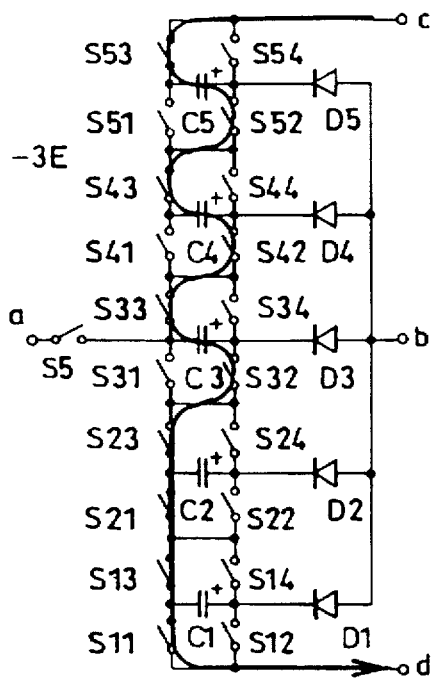
Figure 50B:
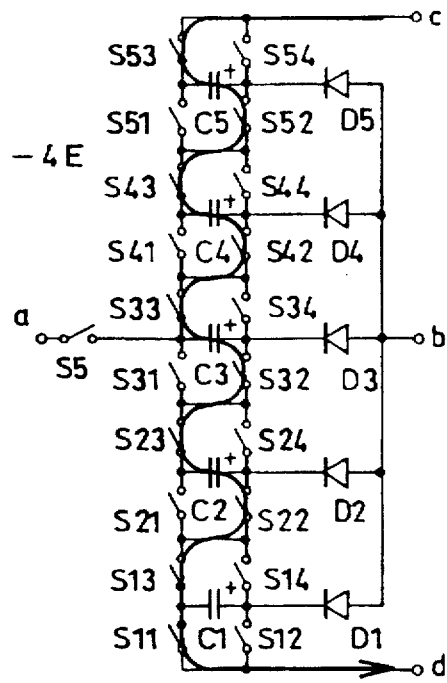
Figure 50C:
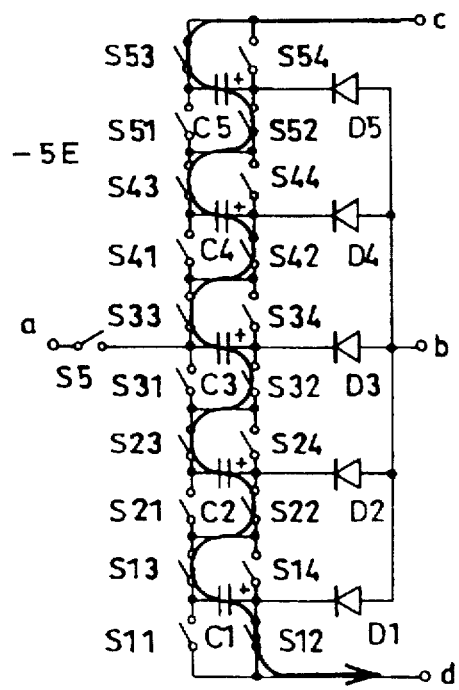
Figure 50D:
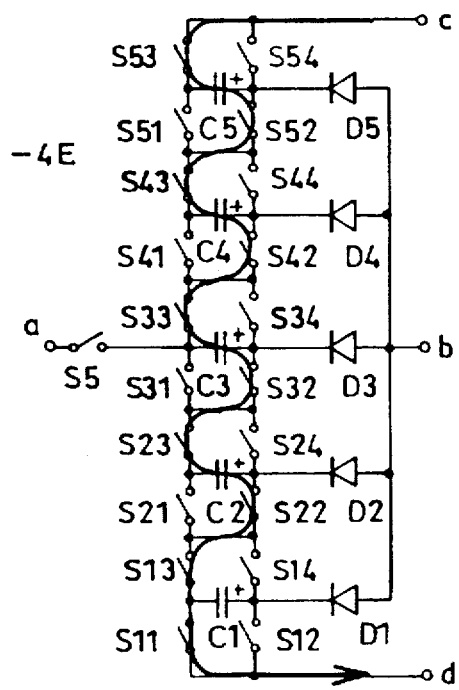
Figure 51A:
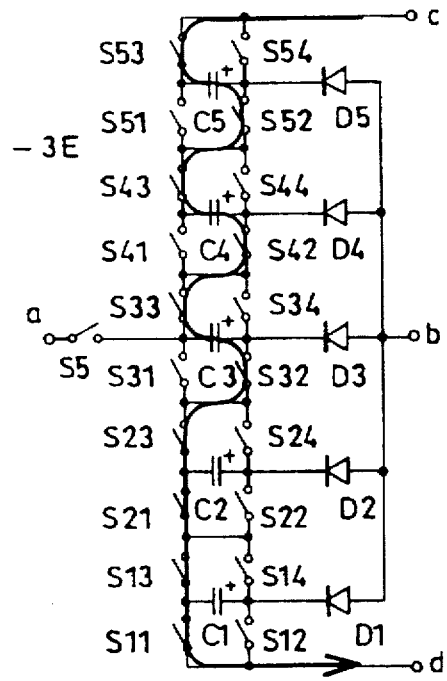
Figure 51B:
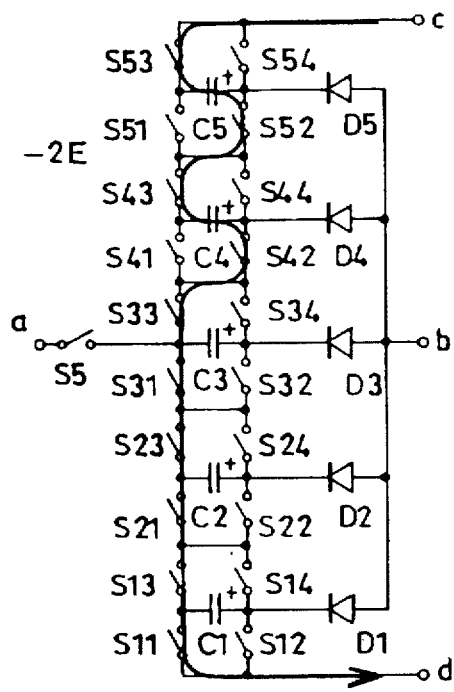
Figure 51C:
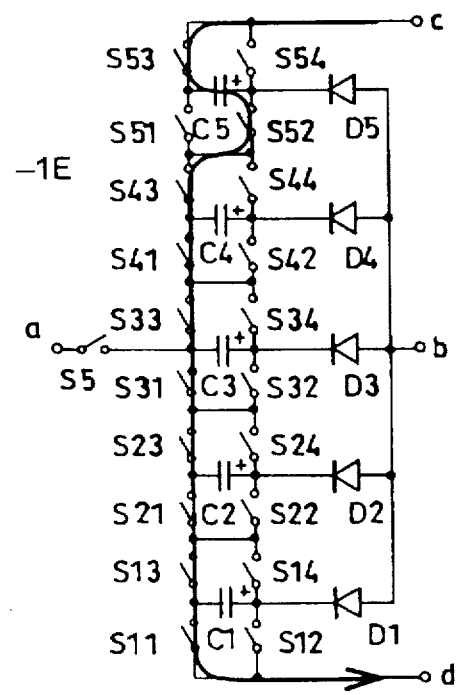
Figure 51D:
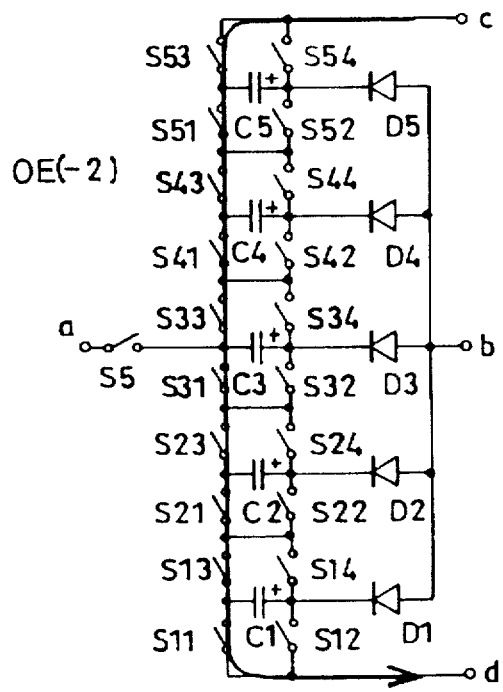
Figure 54:
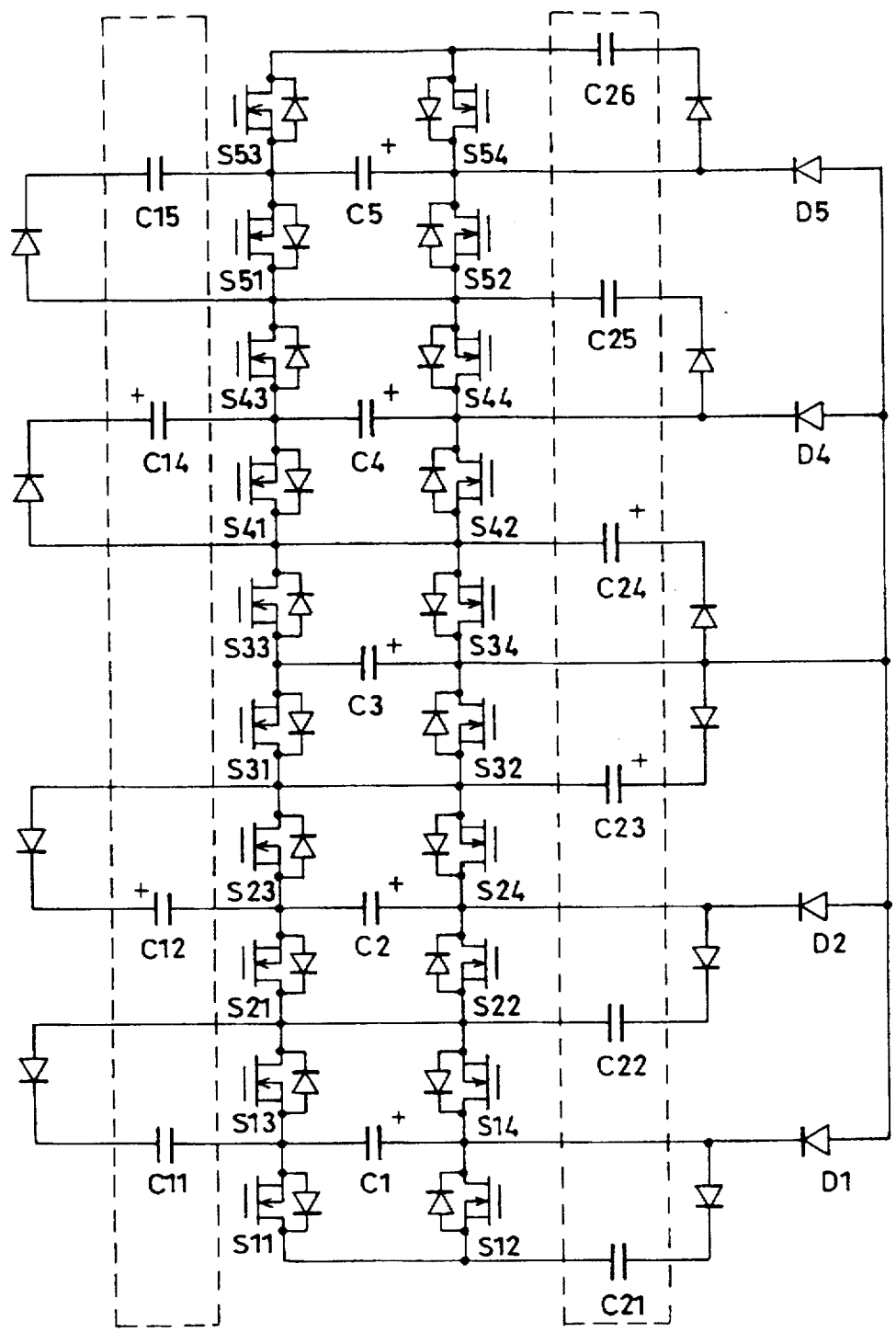
FIG. 54 is a circuit diagram of a twenty-second embodiment of the present invention.

In the operation of the twentieth embodiment, in durations (states 4E to 0E and −4E to 0E of the circuits of FIGS. 44A, 44B and FIGS. 45A, 45B) wherein the number of capacitors connected to the load part is decreased and in durations (states 3E(−2) to 0E(−1) and −3E(−2) to 0E(−2) of the circuits of FIGS. 44B and FIG. 45B) wherein the grounding level of the power source becomes equal to the minus side of the load; when the switching element S5 is turned ON, the capacitors C1, C2 and C3 are charged during the state 3E in durations (E1→E5→E1) wherein the polarity of the voltage applied to the load circuit becomes positive in FIG. 53, the capacitor C1 is used when the application voltage is E or more, the capacitor C2 is used when the application voltage is 2E or more, the capacitor C3 is used when the application voltage is 3E or more, the capacitor C4 is used when the application voltage is 4E or more, and the capacitor C5 is used when the application voltage is 5E or more. Further, with respect to the durations during which the respective voltage levels (0E to 5E) are supplied to the load, the higher the voltage level to be supplied is, the longer the voltage level supply duration is. As a result, as the step-like voltage waveform is made to approach to the sinusoidal waveform, a current having a waveform closer to the sinusoidal waveform can be easily supplied to the load circuit of the inductor Lz, capacitor Cz and discharge lamp, i.e., to the discharge lamp. Since a difference between the capacitors C1 and C5 is not so big in their used time and a difference between the capacitors C1 and C5 is also not so long in their discharging capacitance, enough charging operation can be realized during the state 0E(-1).

power supply capacitors. Also connected between the drains and sources of the other MOSFETs are the high-side power supply capacitors (illustrated as enclosed by dotted lines) through diodes and voltage adjustment circuits. In FIG. 54, in this connection, the voltage adjustment circuits are omitted.

Explanation will be made as to an arrangement of charging the high-side power supply capacitors at the time of starting the circuit. The switching elements S31 and S33 are driven by utilizing the power supply capacitor C3. First, the switching elements S31 and S33 are turned ON to charge the capacitors C23 and C24 with the power supply capacitor C3

TABLE IV

| | 1E | 2E | 3E | 4E | 5E | 4E | 3E | 2E | 1E | 0E | -1E | -2E | -3E | -4E | -5E | -4E | -3E | -2E | -1E | 0E |
|---|---|---|---|---|---|---|---|---|---|---|---|---|---|---|---|---|---|---|---|---|
| C5 | | | | | ●●●●●● | | | | | | ● | ● | ● | ● | ●●●●●●●● | ● | ● | ● | ● | |
| C4 | | | | ● | ●●●●●●●● | ● | | | | | | ● | ● | ● | ●●●●●●●● | ● | ● | ● | | |
| C3 | | | ● | ● | ●●●●●●●● | ● | ● | | | | | | ● | ● | ●●●●●●●● | ● | ● | | | |
| C2 | | ● | ● | ● | ●●●●●●●● | ● | ● | ● | | | | | | ● | ●●●●●●●● | ● | | | | |
| C1 | ● | ● | ● | ● | ●●●●●●●● | ● | ● | ● | ● | | | | | | ●●●●●● | | | | | |

Further, in durations (-E1→-E5→-E1) wherein the polarity of the voltage applied to the load circuit becomes negative, the capacitor C5 is used when the application voltage is -E or less, the capacitor C4 is used when the application voltage is -2E or less, the capacitor C3 is used when the application voltage is -3E or less, the capacitor C2 is used when the application voltage is -4E or less, and the capacitor C1 is used when the application voltage is -5E or less. Further, with respect to the durations during which the respective voltage levels (0E to -5E) are supplied to the load, the lower the voltage level to be supplied is, the longer the voltage level supply duration is. As a result, the step-like voltage waveform can be made to approach to the sinusoidal waveform. At this time, as in the above embodiment, since a difference between the capacitors C1 and C5 is not so big in their used time and a difference between the capacitors C1 and C5 is also not so long in their discharging capacitance, enough charging operation can be realized during the state 0E(-2).

The charging of the capacitors C1 to C5 can be carried out when the switching element S5 is turned ON during the time wherein the voltage to be applied to the load from the power converter circuit becomes zero or the switching elements Snm (n=1 to 5; m=1, 3) at the minus potential sides of the respective capacitors are all in the ON state. In the twenty-first embodiment, the above control arrangement enables the step-like output voltage waveform of the switched capacitor circuit to approach to the sinusoidal waveform, with the result that a current closer to the sinusoidal waveform can be easily supplied to the load circuit of the inductor Lz, capacitor Cz and discharge lamp, i.e., to the discharge lamp. The control arrangement of the twenty-first embodiment 21 can be used in the capacitor connection system shown in the sixteenth embodiment without problems, exhibiting substantially the same effects as in the foregoing embodiment.

Explanation will then be made as to a twenty-second embodiment. The twenty-second embodiment provides an effective arrangement of charging the power supply capacitors of the high-side drive circuits of the switching elements at the time of starting the circuit of the first embodiment. Shown in FIG. 54 is a circuit configuration of the twenty-second embodiment, in which the MOSFETs whose source terminals are commonly connected in the circuit of the second embodiment of FIG. 7 share the common high-side via the associated diodes. At the same time, the capacitor C2 is charged through the diode D2 and the parasitic diode of the switching element S23, and the capacitor C4 is also charged through the diode D4 and the parasitic diode of the switching element S41. The charged capacitor C23 enables the switching elements S24 and S32 to be driven, whereas the charged capacitor C24 enables the switching elements S34 and S42 to be driven, which operation is called operation (A).

Turning OFF the switching elements S31 and S33 and turning ON the switching elements S24 and S42 enables the capacitor C12 to be charged with the capacitor C2 and the capacitor C14 to be charged with the capacitor C4. As a result, the switching elements S21, S23, S41 and S43 can be driven, which is called operation (B).

Further, the switching elements S24 and S42 is turned OFF and the switching elements S21, S23, S31, S33, S41 and S43 are turned ON. This causes, in addition to the above operation (A), appearance of a charging loop from the capacitor C2 to the capacitor C22 and a charging loop from the capacitor C4 to the capacitor C25. The capacitor C1 is charged with the power supply capacitor C3 via the diode D1 and the parasitic diode of the switching element S13, while the capacitor C5 is charged therewith via the diode D5 and the parasitic diode of the switching element S51. In this way, the switching elements S14, S22, S44 and S52 can be driven, which is called operation (C).

And the switching elements S21, S23, S31, S33, S41 and S43 are turned OFF and the switching elements S14, S24, S42 and S52 are turned ON to charge the capacitors C11 to C15. This enables the switching elements S11, S13, S51 and S53 to. be driven, which is called operation (D).

Thereafter, when the switching elements S14, S24, S42 and S52 are turned OFF and a left-side column of switching elements are all turned ON, the capacitor C21 is charged with the capacitor C1 while the capacitor C26 is with the capacitor C5, in addition to the above operation (C). The then operation and the above operation (D) are alternately repeated until a voltage across the capacitors C1, C2, C4 and C5 becomes equal to a voltage across the power supply capacitor C3.

Explanation has been made in the foregoing as to the detailed arrangement of charging the high-side power supply capacitors and associated capacitors for the switching elements at the time of starting the circuit. Although the twenty-second embodiment has been explained in connection with the case where the stage number of the capacitors is 5, it will be appreciated that, even when the stage number is increased, the same arrangement can be implemented, i.e., the circuit operation can be repeated as in the foregoing embodiment to charge the respective capacitors.

What is claimed is:

1. A discharge lamp lighting apparatus comprising:

a plurality of cells respectively comprising a capacitor as a voltage source, and a bridge circuit of switching elements for inverting a polarity of said capacitor;

a switched capacitor circuit of one or more sets of said cells connected in series;

a discharge lamp connected as a load to output terminals of said switched capacitor circuit;

means for controlling said bridge circuits to charge the capacitors of said cells in parallel with voltage from a D.C. voltage source; and means for connecting said capacitors in series to discharge said capacitors to supply a sinusoidal A.C. voltage to said discharge lamp;

wherein an output voltage of said switched capacitor circuit is controlled to achieve a light sustaining value and thereby stably light the discharge lamp and, wherein each of the capacitors of said switched capacitor circuit is capable of being charged for an arbitrary period of time.

2. The apparatus as set forth in claim 1, wherein a multi-level voltage is applied to a load part, and the capacitors of said switched capacitor circuit are combined as mixed in their positive and negative polarities to cause a total capacitance of the capacitors of the switched capacitor circuit to be constant as viewed from said load part.

3. The apparatus as set forth in claim 1, wherein switch change-over in each stage is carried out at equal intervals of time, and voltage drops developed across the capacitors of the switched capacitor circuit connected to said discharge lamp are utilized to output a voltage close to a sinusoidal waveform.

4. The apparatus as set forth in claim 1, wherein the capacitors within said switched capacitor circuit are charged with respectively different charging voltages to output a waveform close to a sinusoidal waveform upon discharging said capacitors.

5. The apparatus as set forth in claim 1, wherein current paths within said switched capacitor circuit are controlled to pass through minus sides of the capacitors of the switched capacitor circuit and to be able to simultaneously charge all the capacitors of the switched capacitor circuit.

6. The apparatus as set forth in claim 5, wherein the capacitors of said switched capacitor circuit are capable of being used in any order.

7. The apparatus as set forth in claim 5, wherein, when a multi-level voltage is applied to a load part through said switched capacitor circuit, a time during which the voltage is applied to said load part is varied to output a waveform similar to a sinusoidal waveform.

8. The apparatus as set forth in claim 1, wherein the capacitor in the cells used as a power source of a drive circuit on high potential sides of the switching elements in the cells of said switched capacitor circuit is charged with a single D.C. source at the time of starting the circuit.

9. The apparatus as set forth in claim 1, wherein said apparatus has a circuit state such that one or more capacitors of said switched capacitor circuit are capable of being charged simultaneously with power conversion of the capacitors of the switched capacitor circuit.

10. The apparatus as set forth in claim 1, wherein any one of the capacitors of said switched capacitor circuit is capable of being used as a D.C. voltage source for charging other capacitors of the switched capacitor circuit.

11. The apparatus as set forth in claim 10, wherein a use duration of each of the capacitors of said switched capacitor circuit other than said D.C. voltage source capacitor is made constant.

12. The apparatus as set forth in claim 1, wherein the capacitors in the cells of said switched capacitor circuit are shared with those in a Cockcroft circuit to charge the capacitors of said switched capacitor circuit independently of circuit operation of a power conversion part.

13. The apparatus as set forth in claim 1, wherein is a circuit for filtering a discontinuous output voltage of said switched capacitor circuit is connected between said switched capacitor circuit and said discharge lamp.

14. The apparatus as set forth in claim 1, further comprising a booster circuit for applying a high pulse voltage to said discharge lamp when igniting the discharge lamp.

15. The apparatus as set forth in claim 14, wherein said booster circuit boosts an output voltage of said switched capacitor circuit.

16. The apparatus as set forth in claim 15, wherein an ignition voltage is applied to said discharge lamp through a circuit of said switched capacitor circuit and said booster circuit which are connected in series when igniting said discharge lamp.

17. The apparatus as set forth in claim 14, wherein a filtering LC circuit for filtering a discontinuous output voltage of said switched capacitor circuit is connected between said switched capacitor circuit and the discharge lamp, the high pulse voltage of said booster circuit being applied between said discharge lamp and an inductor of said filtering circuit to cause said inductor to prevent transmission of said high pulse voltage to said switched capacitor circuit.

18. The apparatus as set forth in claim 1, wherein a charging voltage or voltages of of one or more capacitors of said switched capacitor circuit are varied to cause an output voltage of said switched capacitor circuit to become an ignition voltage of said discharge lamp.

19. The apparatus as set forth in claim 18, wherein a voltage of the capacitor within each of said cells is set to be a charging voltage in a stable lit mode or more to apply said ignition voltage to said discharge lamp when igniting said discharge lamp, whereas the charging voltage of the capacitor within each cell is set to be lower than the ignition voltage when igniting the discharge lamp to supply power to the discharge lamp when stably lighting the discharge lamp.

20. The apparatus as set forth in claim 1, wherein said cells are connected in multiple stages to cause an ignition voltage of said discharge lamp to be applied to said discharge lamp, said multiple stages of cells being connected in series to apply the ignition voltage in a lamp ignition mode, a smaller number of the cells than a number of cells used in the ignition mode being connected to supply power in a stable lit mode.

21. The apparatus as set forth in claim 1, wherein said cells are provided in multiple stages, said multiple stages of cells being used when dimming said discharge lamp to apply a voltage higher than that in a stable lit mode to the discharge lamp and thereby causing said discharge lamp to be dimmed.

22. The apparatus as set forth in claim 1, wherein an ignition circuit is inserted between said switched capacitor circuit and said discharge lamp, said switched capacitor circuit and said ignition circuit being connected in series when igniting said discharge lamp to apply an ignition voltage to said discharge lamp.

23. The apparatus as set forth in claim 1, wherein switch means for causing an output of said switched capacitor circuit to be passed through filaments of said discharge lamp is provided to preheat the filaments of said discharge lamp.

24. The apparatus as set forth in claim 1, wherein a resonance circuit is inserted between said switched capacitor circuit and said discharge lamp, a frequency of a high frequency A.C. output of said switched capacitor circuit being set at a resonance frequency of said resonance circuit to cause an ignition voltage to be applied to said discharge lamp when igniting said discharge lamp.

25. The apparatus as set forth in claim 1, wherein said switching elements of said bridge circuit are double diffusion type MOSFETS, a charging voltage of said capacitor being set to be 100V or less to minimize a chip area ratio to a withstand voltage of each of said double diffusion type MOSFETS, and a stage number of said cells connected in series being set to be closest to a value obtained by dividing a maximum voltage to be supplied to said discharge lamp by a charging voltage of a capacitor.

26. A power converter for a discharge lamp, the power converter comprising:

a switched capacitor circuit that includes one or more series-connected cells, each of which cells includes:
  a voltage source in the form of a capacitor,
  a bridge circuit comprising a plurality of switching elements for inverting a polarity of the capacitor;

means for controlling each bridge circuit to charge capacitors within a cell in parallel from a D.C. voltage source for charging other capacitors of the switch capacitor circuit, at least one of the capacitors in a cell being capable of operating as a D.C. voltage source; and means for connecting the capacitors in series whereby an output produced thereby is in the form of a sinusoidal A.C. voltage that is applied to the discharge lamp.

* * * * *